US012637827B2

(12) United States Patent
Yamamoto et al.

(10) Patent No.: US 12,637,827 B2
(45) Date of Patent: May 26, 2026

(54) WORK MACHINE AND CONTROL DEVICE FOR WORK MACHINE

(71) Applicant: SUMITOMO HEAVY INDUSTRIES, LTD., Tokyo (JP)

(72) Inventors: Yasuhiro Yamamoto, Kanagawa (JP); Kazunori Hiranuma, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 276 days.

(21) Appl. No.: 18/316,789

(22) Filed: May 12, 2023

(65) Prior Publication Data

US 2023/0279634 A1 Sep. 7, 2023

Related U.S. Application Data

(63) Continuation of application No. PCT/JP2021/045018, filed on Dec. 7, 2021.

(30) Foreign Application Priority Data

Dec. 7, 2020 (JP) ................................ 2020-202965
Mar. 31, 2021 (JP) ................................ 2021-062374
Mar. 31, 2021 (JP) ................................ 2021-062436

(51) Int. Cl.
*E02F 3/43* (2006.01)
*B66C 1/44* (2006.01)
(Continued)

(52) U.S. Cl.
CPC ................ *E02F 3/435* (2013.01); *B66C 1/44* (2013.01); *E02F 3/425* (2013.01); *E02F 9/26* (2013.01);
(Continued)

(58) Field of Classification Search
CPC ......... E02F 3/425; E02F 3/435; E02F 9/2228; E02F 9/2285; E02F 9/2292
See application file for complete search history.

(56) References Cited

U.S. PATENT DOCUMENTS 4,677,579 A * 6/1987 Radomilovich .......... E02F 9/26 73/862.56
5,067,572 A * 11/1991 Kyrtsos ................... E02F 9/264 177/25.14
(Continued)

FOREIGN PATENT DOCUMENTS

CN 109680738 4/2019
JP 2002-004337 1/2002
(Continued)

OTHER PUBLICATIONS

International Search Report for PCT/JP2021/045018 mailed on Feb. 8, 2022.

*Primary Examiner* — Saul Rodriguez
*Assistant Examiner* — Brendan P Tighe
(74) *Attorney, Agent, or Firm* — IPUSA, PLLC

(57) ABSTRACT

A work machine is provided that includes: an attachment attached on an upper rotating body and including at least a boom, an arm attached on an end of the boom, and an end attachment attached on an end of the arm; and a control device, wherein the control device compensates for a torque, which causes the boom to rotate, based on either or both of a centrifugal force on the arm and an inertial force on the arm, and calculates a weight of a conveyance object conveyed by the attachment based on the torque for which the compensation is performed.

17 Claims, 22 Drawing Sheets

(51) Int. Cl.

| | |
|---|---|
| ***E02F 3/42*** | (2006.01) |
| ***E02F 9/26*** | (2006.01) |
| *E02F 3/32* | (2006.01) |
| *E02F 3/96* | (2006.01) |
| *E02F 9/22* | (2006.01) |

(52) U.S. Cl.

CPC ................. *E02F 3/32* (2013.01); *E02F 3/963* (2013.01); *E02F 9/2228* (2013.01); *E02F 9/2285* (2013.01); *E02F 9/2292* (2013.01)

(56) References Cited

U.S. PATENT DOCUMENTS

| | | | | |
|---|---|---|---|---|
| 8,666,613 | B2 * | 3/2014 | Choi | E02F 9/2058 180/336 |
| 8,788,155 | B2 * | 7/2014 | Claxton | E02F 9/267 37/379 |
| 9,915,054 | B2 * | 3/2018 | Wu | E02F 9/2075 |
| 9,938,692 | B2 * | 4/2018 | Shatters | E02F 9/264 |
| 11,662,246 | B2 * | 5/2023 | Zimmerman | G01G 19/083 177/139 |
| 11,821,163 | B2 * | 11/2023 | Sano | E02F 9/2296 |
| 2009/0139119 | A1 * | 6/2009 | Janardhan | G01G 19/021 37/413 |
| 2014/0107897 | A1 | 4/2014 | Zhu et al. | |
| 2018/0274210 | A1 * | 9/2018 | Nishimura | G01G 19/083 |
| 2020/0232189 | A1 | 7/2020 | Yamanobe et al. | |
| 2020/0362532 | A1 * | 11/2020 | Shiratani | E02F 9/2267 |
| 2021/0010229 | A1 * | 1/2021 | Sano | E02F 9/2292 |
| 2022/0364336 | A1 * | 11/2022 | Ueta | E02F 9/265 |

FOREIGN PATENT DOCUMENTS

| | | |
|---|---|---|
| JP | 2010-089633 | 4/2010 |
| JP | 2011-508187 | 3/2011 |
| JP | 2020-165253 | 10/2020 |
| JP | 2020-165259 | 10/2020 |
| WO | 2018/087834 | 5/2018 |

* cited by examiner

WORK MACHINE AND CONTROL DEVICE FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2021/045018, filed on Dec. 7, 2021 and designating the U.S., which claims priority to Japanese Patent Application No. 2020-202965 filed on Dec. 7, 2020, Japanese Patent Application No. 2021-062374 filed on Mar. 31, 2021, and Japanese Patent Application No. 2021-062436 filed on Mar. 31, 2021. The entire contents of the foregoing applications are incorporated herein by reference.

BACKGROUND

Technical Field

The present disclosure relates to a work machine.

Description of Related Art

For example, a disclosed shovel calculates the weight of soil in a bucket based on a value measured by an angle sensor that detects a relative angle between an upper rotating body and a boom, a value measured by an angle sensor that detects a relative angle between the boom and an arm, a value measured by a pressure sensor that detects the pressure of an operating oil supplied to a boom cylinder, and a value measured by a pressure sensor that detects the pressure of an operating oil supplied to an arm cylinder.

SUMMARY

According to an aspect of the present invention, there is provided a work machine including: an attachment attached on an upper rotating body and including at least a boom, an arm attached on an end of the boom, and an end attachment attached on an end of the arm; and a control device, wherein the control device compensates for a torque, which causes the boom to rotate, based on either or both of a centrifugal force on the arm and an inertial force on the arm, and calculates a weight of a conveyance object conveyed by the attachment based on the torque for which the compensation is performed.

DETAILED DESCRIPTION

For example, pressures on actuators may vary during an operation of an attachment, such as during a boom raising operation. Hence, even if the weight of soil in the bucket is constant, the weight of soil to be calculated may vary due to disturbance.

Hence, it is desirable to provide a work machine that calculates the weight of a load accurately, and a control device for the work machine.

According to an aspect of the present invention, it is possible to provide a work machine that calculates the weight of a load accurately, and a control device for the work machine.

The modes for carrying out the invention will be described below with reference to the drawings.

[Outline of Shovel]

First, the outline of a shovel (work machine) 100 according to a first embodiment will be described with reference to FIG. 1.

Figure 1:
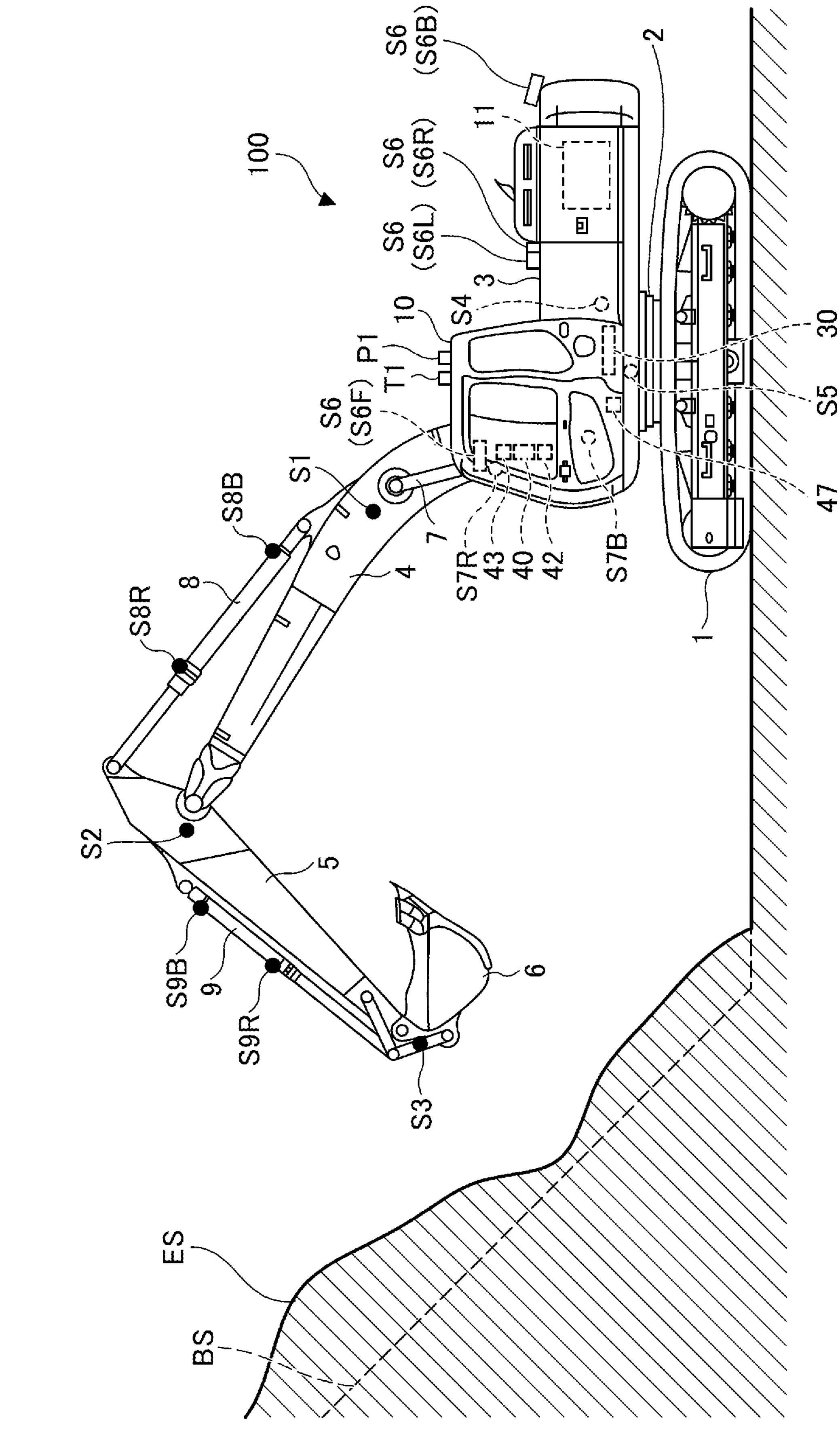
FIG. 1 is a side view of a shovel serving as an excavator according to one embodiment.

FIG. 1 is a side view of the shovel 100 serving as an excavator according to the first embodiment.

In FIG. 1, the shovel 100 is located on a horizontal surface facing an upward inclined surface ES, which is the target of working, and a backslope BS, which is an example of a work surface goal described below (i.e., the backslope representing a slope shape that will result from working of the upward inclined surface ES), is illustrated together. A cylindrical body (unillustrated) indicating a direction normal to the backslope BS, which is the work surface goal, is provided on the upward inclined surface ES, which is the target of working.

The shovel 100 according to the first embodiment includes: a lower running body 1; an upper rotating body 3 mounted on the lower running body 1 in a rotatable manner via a rotating mechanism 2; a boom 4, an arm 5, and a bucket 6 constituting an attachment (working body); and a cabin 10.

The lower running body 1 includes a pair of left and right crawlers, which are hydraulically driven by running hydraulic motors 1L and 1R (see FIG. 2 described below) respectively, to run the shovel 100. That is, the pair of running hydraulic motors 1L and 1R (which are an example of a running motor) drive the lower running body 1 (crawlers), which is a driving target part.

The upper rotating body 3 rotates relatively to the lower running body 1 by being driven by a rotation hydraulic motor 2A (see FIG. 2 described below). That is, the rotation hydraulic motor 2A is a rotation driving part that drives the upper rotating body 3, which is a driving target part, and can change the orientations of the upper rotating body 3.

The upper rotating body 3 may be electrically driven by an electric motor (hereinafter, "electric motor for rotation") instead of being driven by the rotation hydraulic motor 2A. That is, like the rotation hydraulic motor 2A, the electric motor for rotation is a rotation driving part that drives the upper rotating body 3, which is a driving target part, and can change the orientations of the upper rotating body 3.

The boom 4 is attached on the front center of the upper rotating body 3 pivotally such that the boom can be at an angle of depression or elevation. The arm 5 is attached on an end of the boom 4 pivotally such that the arm can pivot upward and downward. The bucket 6 serving as an end attachment is attached on an end of the arm 5 pivotally such that the bucket can pivot upward and downward. The boom 4, the arm 5, and the bucket 6 are hydraulically driven by a boom cylinder 7, an arm cylinder 8, and a bucket cylinder 9, which are hydraulic actuators, respectively.

The bucket 6 is an example of the end attachment. Instead of the bucket 6, any other attachment such as a bucket for a slope, a bucket for dredging, a breaker, a lifting magnet, a grapple, a fork, and a harvester including a chainsaw may be attached on the end of the arm depending on, for example, the content of the work.

The cabin 10 is a driving chamber in which by an operator is seated, and is mounted on the front left of the upper rotating body 3.

[Shovel Configuration]

Next, a specific configuration of the shovel 100 according to the first embodiment will be described with reference to FIG. 2 in addition to FIG. 1.

Figure 2:
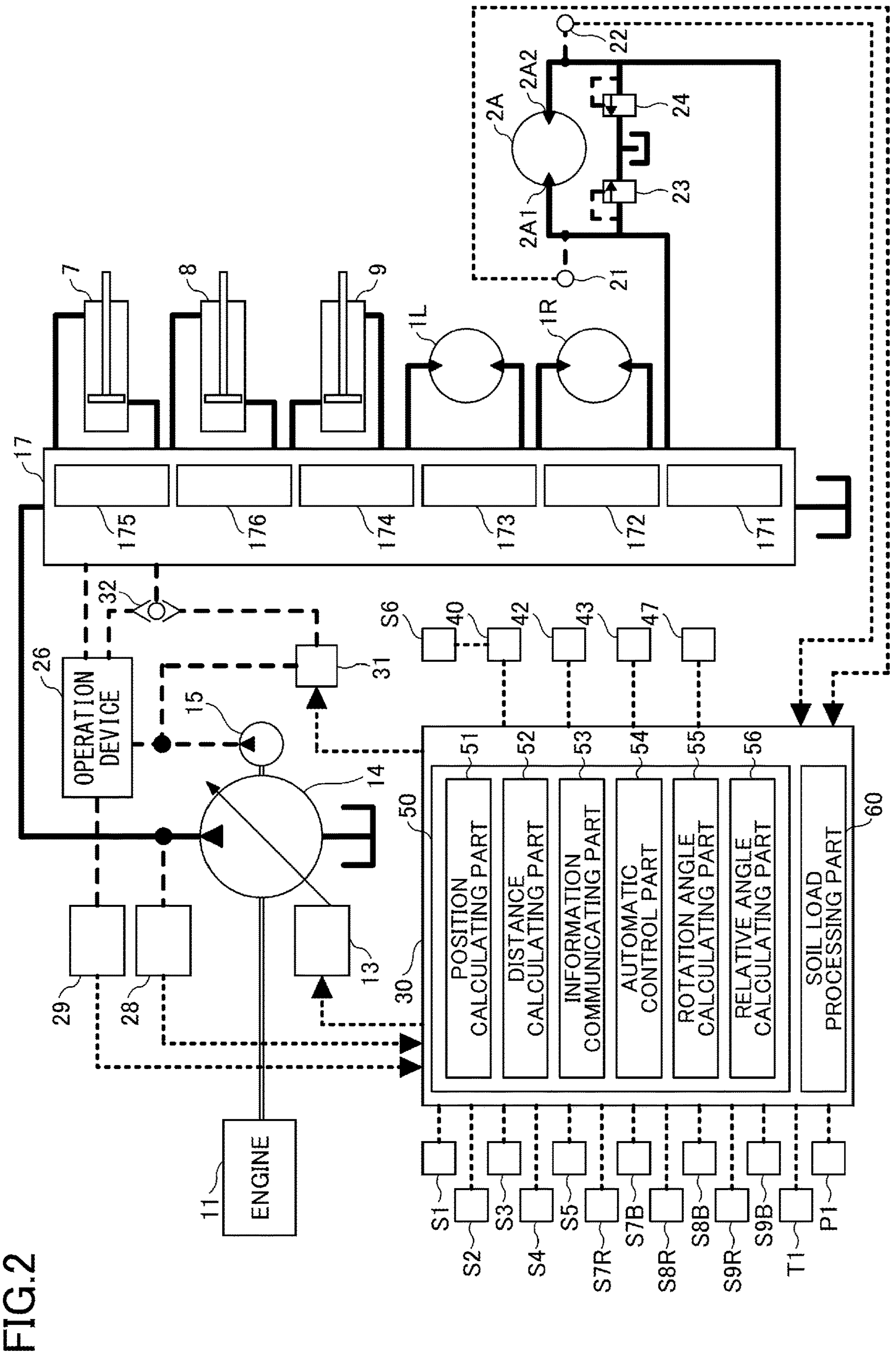
FIG. 2 is a view schematically illustrating an example of a configuration of a shovel according to one embodiment.

FIG. 2 is a view schematically illustrating an example of the configuration of the shovel 100 according to the first embodiment.

In FIG. 2, a mechanical power system, an operating oil line, a pilot line, and an electric control system are denoted by double lines, solid line, broken line, and dotted line, respectively.

A driving system of the shovel 100 according to the first embodiment includes an engine 11, a regulator 13, a main pump 14, and a control valve 17. A hydraulic driving system of the shovel 100 according to the first embodiment includes the hydraulic actuators such as the running hydraulic motors 1L and 1R, the rotation hydraulic motor 2A, the boom cylinder 7, the arm cylinder 8, and the bucket cylinder 9, which hydraulically drive the lower running body 1, the upper rotating body 3, the boom 4, the arm 5, and the bucket 6, respectively, as described above.

The engine 11 is a main power source for the hydraulic driving system, and is situated on, for example, a rear portion of the upper rotating body 3. Specifically, the engine 11 rotates constantly at a previously set target rotation number under direct or indirect control of a controller 30 described below and drives the main pump 14 and a pilot pump 15. The engine 11 is, for example, a diesel engine fueled by a light oil.

The regulator 13 controls the discharging amount of the main pump 14. For example, the regulator 13 regulates the angle (tilt angle) of a swash plate of the main pump 14 in accordance with a control instruction from the controller 30. The regulator 13 includes, for example, regulators 13L and 13R as described below.

The main pump 14 is situated on, for example, a rear portion of the upper rotating body 3 like the engine 11, and supplies an operating oil to the control valve 17 through a high-pressure hydraulic line. The main pump 14 is driven by the engine 11 as described above. The main pump 14 is, for example, a variable-capacity hydraulic pump, and the discharging flow rate (discharging pressure) of the main pump is controlled by its piston stroke length being adjusted by the tilt angle of its swash plate being regulated by the regulator 13 under control of the controller 30 as described above. The main pump 14 includes, for example, main pumps 14L and 14R as described below.

The control valve 17 is a hydraulic control device that is situated on, for example, a center portion of the upper rotating body 3, and controls the hydraulic driving system in response to an operation given to an operation device 26 by the operator. The control valve 17 is coupled to the main pump 14 through the high-pressure hydraulic line as described above, and supplies the operating oil supplied from the main pump 14 selectively to the hydraulic actuators (the running hydraulic motors 1L and 1R, the rotation hydraulic motor 2A, the boom cylinder 7, the arm cylinder 8, and the bucket cylinder 9) in accordance with conditions of operations given to the operation device 26. Specifically, the control valve 17 includes control valves 171 to 176 that control the flow rates and flow directions of the operating oil to be supplied from the main pump 14 to the respective hydraulic actuators. More specifically, the control valve 171 corresponds to the running hydraulic motor 1L, the control valve 172 corresponds to the running hydraulic motor 1R, and the control valve 173 corresponds to the rotation hydraulic motor 2A. The control vale 174 corresponds to the bucket cylinder 9, the control vale 175 corresponds to the boom cylinder 7, and the control valve 176 corresponds to the arm cylinder 8. The control valve 175 includes, for example, control valves 175L and 175R as described below, and the control valve 176 includes, for example, control valves 176L and 176R as described below. The details of the control valves 171 to 176 will be described below.

An operation system of the shovel 100 according to the first embodiment includes the pilot pump 15 and the operation device 26. The operation system of the shovel 100 also includes shuttle valves 32 as components involved in a machine control function by means of the controller 30 described below.

The pilot pump 15 is situated on, for example, a rear portion of the upper rotating body 3, and supplies a pilot pressure to the operation device 26 through the pilot line. The pilot pump 15 is, for example, a fixed-capacity hydraulic pump, and is driven by the engine 11 as described above.

The operation device 26 is an operation input part that is situated near a cockpit in the cabin 10 and by which the operator operates the respective moving components (e.g., the lower running body 1, the upper rotating body 3, the boom 4, the arm 5, and the bucket 6). In other words, the operation device 26 is an operation input part by which the operator operates the hydraulic actuators (i.e., the running hydraulic motors 1L and 1R, the rotation hydraulic motor 2A, the boom cylinder 7, the arm cylinder 8, and the bucket cylinder 9) that drive the respective moving components. The operation device 26 is coupled to the control valves 17 independently, directly through the pilot line on its secondary side, or indirectly via the shuttle valves 32 described below, which are situated on the pilot line on the secondary side. This allows inputting of pilot pressures into the control valves 17, where the pilot pressures match the conditions of how, for example, the lower running body 1, the upper rotating body 3, the boom 4, the arm 5, and the bucket 6 are operated via the operation device 26. Therefore, the control valves 17 can drive the corresponding hydraulic actuators in accordance with the conditions of operations given to the operation device 26. The operation device 26 includes, for example, a lever device by which the arm 5 (arm cylinder 8) is operated. The operation device 26 also includes, for example, lever devices 26A to 26C by which the boom 4 (boom cylinder 7), the bucket 6 (bucket cylinder 9), and the upper rotating body 3 (rotation hydraulic motor 2A) are operated respectively (see FIG. 4A to FIG. 4C). The operation device 26 also includes, for example, lever devices or pedal devices by which the pair of left and right crawlers (running hydraulic motors 1L and 1R) of the lower running body 1 are operated respectively.

The shuttle valves 32 each have two inlet ports and one outlet port, and cause the outlet port to output an operating oil that has the higher one of pilot pressures that are input into the two inlet ports. One of the two inlet ports of each shuttle valve 32 is coupled to the operation device 26, and the other is coupled to a proportional valve 31. The outlet port of each shuttle valve 32 is coupled to a pilot port of a corresponding control valve among the control valves 17 through the pilot line (for details, see FIG. 4A to FIG. 4C). Hence, each shuttle valve 32 can cause the higher one of the pilot pressure generated by the operation device 26 and the pilot pressure generated by the proportional valve 31 to act on the pilot port of the corresponding control valve. That is, by controlling the proportional valve 31 to output a pilot pressure that is higher than a pilot pressure on the secondary side, which is output from the operation device 26, the controller 30 described below can control a corresponding control valve and control the movement of each moving component irrespective of an operation given to the operation device 26 by the operator. The shuttle valves 32 include, for example, shuttle valves 32AL, 32AR, 32BL, 32BR, 32CL, and 32CR as described below.

The operation device 26 (a left operation lever, a right operation lever, a left running lever, and a right running lever) need not be a hydraulic pilot type that outputs a pilot pressure, and may be an electric type that outputs an electric signal. In such a case, electric signals from the operation device 26 are input into the controller 30, and the controller 30 controls the control valves 171 to 176 in the control valve 17 in accordance with the input electric signals. In this way, an operation of each hydraulic actuator matching the content of the operation given to the operation device 26 is realized. For example, the control valves 171 to 176 in the control valve 17 may be electromagnetic solenoid-type spool valves that are driven by instructions from the controller 30. Electromagnetic valves that operate in response to electric signals from the controller 30 may be situated between the pilot pump 15 and the respective control valves 171 to 176. In such a case, when a manual operation using the electric operation device 26 is given, the controller 30 controls the corresponding electromagnetic valve to increase or decrease the pilot pressure by means of an electric signal matching the amount of the operation (e.g., the amount by which a lever is operated), thus making it possible to control the control valves 171 to 176 to operate in accordance with the content of the operation given to the operation device 26.

A control system of the shovel 100 according to the first embodiment includes the controller 30, a discharging pressure sensor 28, an operation pressure sensor 29, the proportional valve 31, a display device 40, an input device 42, a sound output device 43, a memory device 47, a boom angle sensor S1, an arm angle sensor S2, a bucket angle sensor S3, a machine body inclination sensor S4, a rotation condition sensor S5, an image capturing device S6, a positioning device P1, and a communication device T1.

The controller 30 (which is an example of a control device) is situated in, for example, the cabin 10, and performs driving controls of the shovel 100. The functions of the controller 30 may be realized by desirably selected hardware or software, or combination of hardware and software. For example, the controller 30 is mainly formed of a microcomputer including, for example, a Central Processing Unit (CPU), a Read Only Memory (ROM), a Random Access Memory (RAM), a nonvolatile auxiliary memory device, and an input/output interface of any type. The controller realizes various functions by, for example, executing various programs stored in the ROM or the nonvolatile auxiliary memory device on the CPU.

For example, the controller 30 performs a driving control of setting a target rotation number based on, for example, a work mode previously set by a predetermined operation given by, for example, the operator, and controlling the engine 11 to rotate constantly.

For example, the controller 30 outputs a control instruction to the regulator 13 as needed, to change the discharging amount of the main pump 14.

For example, the controller 30 performs controls regarding a machine guidance function of giving guidance (consultation) regarding manual operations of the shovel 100 by, for example, the operator via the operation device 26. For example, the controller 30 also performs controls regarding a machine control function of automatically assisting manual operations of the shovel 100 by, for example, the operator via the operation device 26. That is, the controller 30 includes a machine guidance part 50 as a functional part involved in the machine guidance function and the machine control function. The controller also includes a soil load processing part 60 described below.

Some of the functions of the controller 30 may be realized by any other controller (control device). That is, the functions of the controller 30 may be realized dispersedly by a plurality of controllers. For example, the machine guidance function and the machine control function may be realized by dedicated controllers (control devices).

The discharging pressure sensor 28 detects the discharging pressure of the main pump 14. A detection signal matching the discharging pressure detected by the discharging pressure sensor 28 loads into the controller 30. The discharging pressure sensor 28 includes, for example, discharging pressure sensors 28L and 28R as described below.

The operation pressure sensor 29 detects pilot pressures on the secondary side of the operation device 26, i.e., pilot pressures that match the conditions of operations given to the operation device 26 regarding the respective moving components (i.e., the hydraulic actuators) (the conditions of operations being e.g., contents of operations such as directions of operations and amounts of operations). Signals from the operation pressure sensor 29, which are indicative of the detected pilot pressures matching the conditions of the operations given to the operation device 26 regarding, for example, the lower running body 1, the upper rotating body 3, the boom 4, the arm 5, and the bucket 6 load into the controller 30. The operation pressure sensor 29 includes, for example, operation pressure sensors 29A to 29C as described below.

Any other sensor that can detect the conditions of operations given to the operation device 26 regarding the respective moving components, such as an encoder or a potentiometer that can detect the amounts by which or the directions in which, for example, the lever devices 26A to 26C are operated (or shifted down), may be provided instead of the operation pressure sensor 29.

The proportional valve 31 is situated on the pilot line through which the pilot pump 15 and the shuttle valves 32 are coupled, and the flow area (cross-sectional area within which the operating oil can circulate) of the proportional valve is variable. The proportional valve 31 operates in accordance with a control instruction input by the controller 30. Hence, even while the operation device 26 (specifically, the lever devices 26A to 26C) is not being operated by the operator, the controller 30 can supply the operating oil discharged from the pilot pump 15 to the pilot port of a corresponding control valve in the control valve 17 through the proportional valve 31 and the shuttle valve 32. The proportional valve 31 includes, for example, proportional valves 31AL, 31AR, 31BL, 31BR, 31CL, and 31CR as described below.

The display device 40 is situated at a location in the cabin 10 at which it is easy for a seated operator to view the display device, and displays images of various information under control of the controller 30. The display device 40 may be coupled to the controller 30 through a vehicle-mountable network such as a Controller Area Network (CAN) or may be coupled to the controller 30 through a one-to-one dedicated line.

The input device 42 is situated in the cabin 10 within reach of a hand of a seated operator, and receives various operation inputs given by the operator and outputs signals matching the given operation inputs to the controller 30. The input device 42 includes, for example, a touch panel mounted as a display of the display device that displays images of various information, knob switches situated on ends of the levers of the lever devices 26A to 26C, button switches situated on the peripheral portion of the display device 40, levers, toggles, and rotation dials. Signals matching the contents of operations given to the input device 42 load into the controller 30.

The sound output device 43 is situated in, for example, the cabin 10, is coupled to the controller 30, and outputs sounds under control of the controller 30. The sound output device 43 is, for example, a loudspeaker or a buzzer. The sound output device 43 acoustically outputs various information in accordance with sound output instructions from the controller 30.

The memory device 47 is situated in, for example, the cabin 10, and stores various information under control of the controller 30. The memory device 47 is, for example, a nonvolatile memory medium such as a semiconductor memory. The memory device 47 may store information that is output by various devices during an operation of the shovel 100, and may store information to be acquired via various devices before an operation of the shovel 100 is started. The memory device 47 may store data regarding a work surface goal, which is acquired via, for example, the communication device T1 or which is set via, for example, the input device 42. The work surface goal may be set (stored) by the operator of the shovel 100 or may be set by, for example, a work manager.

The boom angle sensor S1 is attached on the boom 4, and detects an angle of depression or elevation (hereinafter, "boom angle") of the boom 4 with respect to the upper rotating body 3, e.g., an angle, which a straight line connecting fulcra on both ends of the boom 4 forms, in a side view perspective, with respect to the rotation plane of the upper rotating body 3. The boom angle sensor S1 may include, for example, a rotary encoder, an acceleration sensor, a six-axis sensor, and an Inertial Measurement Unit (IMU). The boom angle sensor S1 may also include, for example, a potentiometer employing a variable resistor and a cylinder sensor that detects the stroke amount of the hydraulic cylinder (boom cylinder 7) matching the boom angle. The same applies to the arm angle sensor S2 and the bucket angle sensor S3 below. A detection signal from the boom angle sensor S1 matching the boom angle loads into the controller 30.

The arm angle sensor S2 is attached on the arm 5 and detects a pivoting angle (hereinafter, "arm angle") of the arm 5 with respect to the boom 4, e.g., an angle, which a straight line connecting fulcra on both ends of the arm 5 forms, in a side view perspective, with respect to the straight line connecting the fulcra on both ends of the boom 4. A detection signal from the arm angle sensor S2 matching the arm angle loads into the controller 30.

The bucket angle sensor S3 is attached on the bucket 6, and detects a pivoting angle (hereinafter, "bucket angle") of the bucket 6 with respect to the arm 5, e.g., an angle, which a straight line connecting a fulcrum of the bucket 6 and an end (blade edge) of the bucket forms, in a side view perspective, with respect to the straight line connecting the fulcra on both ends of the arm 5. A detection signal from the bucket angle sensor S3 matching the bucket angle loads into the controller 30.

The machine body inclination sensor S4 detects an inclination condition of the machine body (upper rotating body 3 or lower running body 1) with respect to a horizontal plane. The machine body inclination sensor S4 is attached on, for example, the upper rotating body 3, and detects inclination angles (hereinafter, "front-rear inclination angle" and "left-right inclination angle") of the shovel 100 (i.e., the upper rotating body 3) about two axes in the front-rear direction and the left-right direction. The machine body inclination sensor S4 may include, for example, a rotary encoder, an acceleration sensor, a six-axis senor, and an IMU. A detection signal from the machine body inclination sensor S4 matching the inclination angles (front-rear inclination angle and left-right inclination angle) loads into the controller 30.

The rotation condition sensor S5 outputs detected information regarding the rotation condition of the upper rotating body 3. The rotation condition sensor S5 detects, for example, the rotation angular velocity and rotation angle of the upper rotating body 3. The rotation condition sensor S5 may include, for example, a gyro sensor, a resolver, and a rotary encoder. A detection signal from the rotation condition sensor S5 matching the rotation angle and rotation angular velocity of the upper rotating body 3 loads into the controller 30. The boom angle sensor S1, the arm angle sensor S2, the bucket angle sensor S3, the machine body inclination sensor S4, and the rotation condition sensor S5 are encompassed within attitude sensors. The attitude sensors detect not only the position of the blade edge of the bucket 6, but also, for example, the boom angle, the boom angular velocity, and the boom angular acceleration.

The image capturing device S6 serving as a spatial recognition device captures images of surroundings of the shovel 100. The image capturing device S6 includes a camera S6F that captures an image of a space ahead of the shovel 100, a camera S6L that captures an image of a space on the left of the shovel 100, a camera S6R that captures an image of a space on the right of the shovel 100, and a camera S6B that captures an image of a space behind the shovel 100.

The camera S6F is attached on, for example, the ceiling of the cabin 10, i.e., in the cabin 10. The camera S6F may be attached outside the cabin 10, such as on the roof of the cabin 10 or a side surface of the boom 4. The camera S6L is attached on the left end of the upper surface of the upper rotating body 3. The camera S6R is attached on the right end of the upper surface of the upper rotating body 3. The camera S6B is attached on the rear end of the upper surface of the upper rotating body 3.

Each of the image capturing devices S6 (cameras S6F, S6B, S6L, and S6R) is, for example, a monocular wide angle camera having an extremely wide angle of view. The image capturing devices S6 may be, for example, stereo cameras or range image cameras. Images captured by the image capturing devices S6 load into the controller 30 via the display device 40.

The image capturing devices S6 serving as spatial recognition devices may function as object sensing devices. In this case, the image capturing devices S6 may sense an object existing around the shovel 100. The sensing-target object may include, for example, humans, animals, vehicles, construction machinery, buildings, and holes. The image capturing devices S6 may calculate the distance from the image capturing devices S6 or the shovel 100 to a recognized object. The image capturing devices S6 serving as the object sensing devices may include, for example, a stereo camera and a range image sensor. The spatial recognition devices are, for example, monocular cameras including an imaging element such as a CCD or a CMOS, and output captured image to the display device 40. The spatial recognition devices may also calculate the distance from the spatial recognition devices or the shovel 100 to a recognized object. For example, in addition to the image capturing devices S6, any other object sensing device such as an ultrasonic sensor, a millimeter wave radar, a LIDAR, and an infrared sensor may be provided as the spatial recognition device. When, for example, a millimeter wave radar, an ultrasonic sensor, or a laser radar is used as the spatial recognition device, the device thus used may emit multiple signals (e.g., laser light) to an object and receive reflection signals of the emitted signals, to thereby detect the distance to the object and the direction of the object from the reflection signals.

The image capturing devices S6 may be directly coupled to the controller 30 in a communicable manner.

A boom rod pressure sensor S7R and a boom bottom pressure sensor S7B are attached on the boom cylinder 7. An arm rod pressure sensor S8R and an arm bottom pressure sensor S8B are attached on the arm cylinder 8. A bucket rod pressure sensor S9R and a bucket bottom pressure sensor S9B are attached on the bucket cylinder 9. The boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B are also referred to collectively as "cylinder pressure sensors".

The boom rod pressure sensor S7R detects a pressure (hereinafter, "boom rod pressure") in a rod-side oil chamber of the boom cylinder 7, and the boom bottom pressure sensor S7B detects a pressure (hereinafter, "boom bottom pressure") in a bottom-side oil chamber of the boom cylinder 7. The arm rod pressure sensor S8R detects a pressure (hereinafter, "arm rod pressure") in a rod-side oil chamber of the arm cylinder 8, and the arm bottom pressure sensor S8B detects a pressure (hereinafter, "arm bottom pressure") in a bottom-side oil chamber of the arm cylinder 8. The bucket rod pressure sensor S9R detects a pressure (hereinafter, "bucket rod pressure") in a rod-side oil chamber of the bucket cylinder 9, and the bucket bottom pressure sensor S9B detects a pressure (hereinafter, "bucket bottom pressure") in a bottom-side oil chamber of the bucket cylinder 9.

The positioning device P1 measures the position and orientation of the upper rotating body 3. The positioning device P1 is, for example, a Global Navigation Satellite System (GNSS) compass, and detects the position and orientation of the upper rotating body 3. A detection signal matching the position and orientation of the upper rotating body 3 loads into the controller 30. Of the functions of the positioning device P1, the function of detecting the orientation of the upper rotating body 3 may be replaced by an orientation sensor attached on the upper rotating body 3.

The communication device T1 communicates with an external device through a predetermined network including, for example, a mobile communication network terminated by base stations, a satellite communication network, and the Internet. The communication device T1 is, for example, a mobile communication module compliant with a mobile communication standard such as Long Term Evolution (LTE), $4^{th}$ Generation (4G), or $5^{th}$ Generation (5G), or a satellite communication module for connecting with a satellite communication network.

The machine guidance part 50 performs, for examples, controls on the shovel 100 regarding machine guidance functions. For example, the machine guidance part 50 informs work information such as the distance between the work surface goal and an end portion of the attachment, a specific example of the end portion being a working part of the end attachment, to the operator via, for example, the display device 40 and the sound output device 43. For example, data regarding the work surface goal is previously stored in the memory device 47 as described above. The data regarding the work surface goal is expressed on, for example, a standard coordinates system. The standard coordinates system is, for example, a world geodetic system. The world geodetic system is a three-dimensional orthogonal XYZ coordinates system in which the origin is on the earth's center of gravity, from which the X axis extends in the direction toward the intersection between the Greenwich meridian and the equator, the Y axis extends in the direction toward the 90$^{th}$ meridian east, and the Z axis extends in the direction toward the north pole. The operator may define any desirably selected point in the construction site as a reference point, and set the work surface goal based on a relative positional relationship with respect to the reference point via the input device 42. The working part of the bucket 6 is, for example, the edge of a claw of the bucket 6 or the back surface of the bucket 6. When, for example, a breaker is employed as the end attachment instead of the bucket 6, an end portion of the breaker corresponds to the working part. The machine guidance part 50 informs work information to the operator via, for example, the display device 40 and the sound output device 43, to give guidance on how the operator should operate the shovel 100 via the operation device 26.

The machine guidance part 50 also performs, for example, controls on the shovel 100 regarding machine control functions. For example, the machine guidance part 50 may automatically cause at least one selected from the boom 4, the arm 5, and the bucket 6 to move such that the work surface goal and an end position of the bucket 6 coincide with each other when the operator is manually performing a digging operation.

The machine guidance part 50 acquires information from, for example, the boom angle sensor S1, the arm angle sensor S2, the bucket angle sensor S3, the machine body inclination sensor S4, the rotation condition sensor S5, the image capturing devices S6, the positioning device P1, the communication device T1, and the input device 42. Then, for example, the machine guidance part 50 calculates the distance between the bucket 6 and the work surface goal based on the acquired information, informs the degree of the distance between the bucket 6 and the work surface goal to the operator by means of sounds from the sound output device 43 and images displayed on the display device 40, and automatically controls the movement of the attachment such that the end portion of the attachment (specifically, the end portion being the working part such as the edge of the claw of the bucket 6 or the back surface of the bucket) coincides with the work surface goal. The machine guidance part 50 includes a position calculating part 51, a distance calculating part 52, an information communicating part 53, an automatic control part 54, a rotation angle calculating part 55, and a relative angle calculating part 56 as detailed functional components involved in the machine guidance function and the machine control function.

The position calculating part 51 calculates the position of a predetermined positioning target. For example, the position calculating part 51 calculates the coordinate point of the end portion of the attachment, specifically, the working part of the bucket 6 such as the edge of the claw or the back surface on the standard coordinates system. Specifically, the position calculating part 51 calculates the coordinate point of the working part of the bucket 6 based on the angles of depression or elevation (boom angle, arm angle, and bucket angle) of the boom 4, the arm 5, and the bucket 6.

The distance calculating part 52 calculates the distance between two positioning targets. For example, the distance calculating part 52 calculates the distance between the working part of the bucket 6 such as the edge of the claw or the back surface and the work surface goal. The distance calculating part 52 may calculate the angle (relative angle) between the back surface of the bucket 6 as the working part and the work surface goal.

The information communicating part 53 communicates (informs) various information to the operator of the shovel 100 via predetermined informing parts such as the display device 40 and the sound output device 43. The information communicating part 53 informs magnitude (degree) such as various distances calculated by the distance calculating part 52 to the operator of the shovel 100. For example, the information communicating part communicates the distance between the end portion of the bucket 6 and the work surface goal (or the magnitude of the distance) to the operator using either or both of visual information by the display device 40 and acoustic information by the sound output device 43. The information communicating part 53 may communicate the relative angle between the back surface of the bucket 6 as the working part and the work surface goal (or the magnitude of the relative angle) to the operator using either or both of visual information by the display device 40 and acoustic information by the sound output device 43.

Specifically, the information communicating part 53 communicates the magnitude of the distance (e.g., a vertical distance) between the working part of the bucket 6 and the work surface goal to the operator using intermittent sounds by the sound output device 43. In this case, the information communicating part 53 may shorten the intervals between the intermittent sounds as the vertical distance shortens, and may lengthen the intervals between the intermittent sounds as the vertical distance lengthens. The information communicating part 53 may use a continuous sound and express difference in the magnitude of the vertical distance by changing, for example, the pitch or intensity of the sound. Moreover, when the end portion of the bucket 6 reaches a position lower than the work surface goal, i.e., oversteps the work surface goal, the information communicating part 53 may issue an alert via the sound output device 43. The alert is, for example, a continuous sound that is noticeably louder than the intermittent sounds.

The information communicating part 53 may cause the display device 40 to display, for example, the magnitude of the distance between the end portion of the attachment, specifically, the working part of the bucket 6 and the work surface goal, or the magnitude of the relative angle between the back surface of the bucket 6 and the work surface goal as work information. Under control of the controller 30, the display device 40 displays the work information which it receives from the information communicating part 53 together with image data which it receives from the image capturing device S6. The information communicating part 53 may communicate the magnitude of a vertical distance to the operator using, for example, an image representing an analog meter or an image representing a bar graph indicator.

The automatic control part 54 automatically assists manual operations of the shovel 100 by the operator via the operation device 26, by automatically operating the actuators. Specifically, as described below, the automatic control part 54 can individually and automatically adjust pilot pressures that act on the control valves (specifically, the control valve 173, the control valves 175L and 175R, and the control valve 174) corresponding to the plurality of hydraulic actuators (specifically, the rotation hydraulic motor 2A, the boom cylinder 7, and the bucket cylinder 9). In this way, the automatic control part 54 can automatically operate the respective hydraulic actuators. The automatic control part 54 may perform controls regarding the machine control function, for example, when a predetermined switch included in the input device 42 is depressed. The predetermined switch is, for example, a machine control switch (hereinafter, "Machine Control (MC) switch"), and may be situated as a knob switch at an end of a grip of the operation device 26 (e.g., a lever device corresponding to the operations of the arm 5) to be gripped by the operator. The following description will proceed on the premise that the machine control function is effective, provided that the MC switch is being depressed.

For example, provided that, for example, the MC switch is depressed, the automatic control part 54 automatically elongates or shrinks either or both of the boom cylinder 7 and the bucket cylinder 9 to match the movement of the arm cylinder 8, in order to assist a digging work or a shaping work. Specifically, when the operator is manually performing an operation of closing the arm 5 (hereinafter, "arm closing operation"), the automatic control part 54 automatically elongates or shrinks either or both of the boom cylinder 7 and the bucket cylinder 9 such that the work surface goal and the position of the working part of the bucket 6 such as the edge of the claw or the back surface coincide with each other. In this case, the operator can close the arm 5 while keeping, for example, the edge of the claw of the bucket 6 coinciding with the work surface goal, only by giving an arm closing operation to the lever device corresponding to the operations of the arm 5.

Moreover, provided that, for example, the MC switch is depressed, the automatic control part 54 may automatically rotate the rotation hydraulic motor 2A (which is an example of an actuator) in order to control the upper rotating body 3 to face the work surface goal straightly. Hereinafter, the control by the controller 30 (automatic control part 54) to control the upper rotating body 3 to face the work surface goal straightly will be referred to as "straight facing control". Hence, for example, the operator can bring the upper rotating body 3 to face the work surface goal straightly, only by depressing the predetermined switch, or only by operating the lever device 26C described below, which corresponds to the rotation operation, while the switch is being depressed. Moreover, only by depressing the MC switch, the operator can bring the upper rotating body 3 to face the work surface goal straightly and can start the machine control function regarding, for example, a digging work toward the mentioned work surface goal.

For example, the state of the upper rotating body 3 of the shovel 100 facing the work surface goal straightly is a state in which the end portion of the attachment (e.g., the edge of the claw or the back surface of the bucket 6 as the working part) can be moved along the inclination direction of the work surface goal (backslope BS) along with an operation of the attachment. Specifically, the state of the upper rotating body 3 of the shovel 100 facing the work surface goal straightly is a state in which an operating plane of the attachment (attachment's operating plane), which is perpendicular to the rotation plane of the shovel 10, includes the normal to the work surface goal corresponding to the cylindrical body (i.e., a state in which the operating plane is along the normal).

When the attachment's operating plane of the shovel 100 does not include the normal to the work surface goal corresponding to the cylindrical body, the end portion of the attachment cannot be moved in the direction in which the work surface goal inclines. Hence, the shovel 100 cannot work suitably toward the work surface goal. In this regard, the automatic control part 54 can control the upper rotating body 3 into the straightly facing state, by automatically rotating the rotation hydraulic motor 2A. Hence, the shovel 100 can work suitably toward the work surface goal.

In the straight facing control, the automatic control part 54 determines that the shovel is straightly facing the work surface goal, when, for example, a left end vertical distance between the coordinate point of the left end of the edge of the claw of the bucket 6 and the work surface goal (hereinafter, simply "left end vertical distance") and a right end vertical distance between the coordinate point of the right end of the edge of the claw of the bucket 6 and the work surface goal (hereinafter, simply "right end vertical distance") are equal. The automatic control part 54 may determine that the shovel 100 is straightly facing the work surface goal, not when the left end vertical distance and the right end vertical distance are equal (i.e., the difference between the left end vertical distance and the right end vertical distance is zero), but when the difference is equal to less than a predetermined value.

In the straight facing control, the automatic control part 54 may operate the rotation hydraulic motor 2A based on, for example, the difference between the left end vertical distance and the right end vertical distance. Specifically, when an operation is given to the lever device 26C corresponding to the rotating operations while the predetermined switch such as the MC switch is being depressed, the automatic control part determines whether or not the operation to the lever device 26C is given in a direction to bring the upper rotating body 3 to face the work surface goal straightly. For example, when the operation to the lever device 26C is given in a direction to increase the vertical distance between the edge of the claw of the bucket 6 and the work surface goal (backslope BS), the automatic control part 54 is not to perform the straight facing control. On the other hand, when the operation to the rotating operation lever is given in a direction to reduce the vertical distance between the edge of the claw of the bucket 6 and the work surface goal (backslope BS), the automatic control part 54 is to perform the straight facing control. Hence, the automatic control part 54 can operate the rotation hydraulic motor 2A such that the difference between the left end vertical distance and the right end vertical distance is reduced. Subsequently, when the difference becomes equal to or less than a predetermined value or becomes zero, the automatic control part 54 stops the rotation hydraulic motor 2A. The automatic control part 54 may set a rotation angle at which the difference is equal to or less than the predetermined value or is zero as the target angle, and control the operation of the rotation hydraulic motor 2A such that the angle difference between the target angle and the current rotation angle (specifically, a detected value based on a detection signal from the rotation condition sensor S5) becomes zero. In such a case, the rotation angle is, for example, the angle of the front-rear axis of the upper rotating body 3 from a reference direction.

When an electric motor for rotation is mounted on the shovel 100 instead of the rotation hydraulic motor 2A as described above, the automatic control part 54 performs the straight facing control, by controlling the electric motor for rotation (which is an example of an actuator) as a control target.

The rotation angle calculating part 55 calculates the rotation angle of the upper rotating body 3. This allows the controller 30 to determine the current orientation of the upper rotating body 3. The rotation angle calculating part 55 calculates the angle of the front-rear axis of the upper rotating body 3 from the reference direction as the rotation angle, based on, for example, an output signal from the GNSS compass included in the positioning device P1. The rotation angle calculating part 55 may calculate the rotation angle based on a detection signal from the rotation condition sensor S5. When a reference point is set in the construction site, the rotation angle calculating part 55 may regard the direction to the reference point from the axis of rotation, as the reference direction.

The rotation angle indicates the direction in which the attachment's operating plane extends with respect to the reference direction. The attachment's operating plane is, for example, an imaginary plane that is taken as a longitudinal section of the attachment and is positioned perpendicularly to the rotation plane. The rotation plane is, for example, an imaginary plane including the bottom surface of a rotation frame that is perpendicular to the axis of rotation. For example, when it is determined that the attachment's operating plane includes the normal to the work surface goal, the controller 30 (machine guidance part 50) determines that the upper rotating body 3 is facing the work surface goal straightly.

The relative angle calculating part 56 calculates a rotation angle (relative angle) needed to bring the upper rotating body 3 to face the work surface goal straightly. The relative angle is, for example, a relative angle that is famed between the direction in which the front-rear axis of the upper rotating body 3 will extend when the upper rotating body 3 is brought to face the work surface goal straightly and the direction in which the front-rear axis of the upper rotating body 3 is currently extending. The relative angle calculating part 56 calculates the relative angle based on, for example, data regarding the work surface goal stored in the memory device 47 and the rotation angle calculated by the rotation angle calculating part 55.

When an operation is given to the lever device 26C corresponding to rotating operations while the predetermined switch such as the MC switch is being depressed, the automatic control part 54 determines whether the rotating operation is given in a direction to bring the upper rotating body 3 to face the work surface goal straightly. When it is determined that the rotating operation is given in a direction to bring the upper rotating body 3 to face the work surface goal straightly, the automatic control part 54 sets the relative angle calculated by the relative angle calculating part 56 as a target angle. Then, when a rotation angle change following the operation to the lever device 26C has reached the target angle, the automatic control part 54 determines that the upper rotating body 3 has come to face the work surface goal straightly, and may stop the operation of the rotation hydraulic motor 2A. Hence, the automatic control part 54 can control the upper rotating body 3 to face the work surface goal straightly, based on the configuration illustrated in FIG. 2. In the above-described example of the straight facing control, a case of the straight facing control toward the work surface goal has been illustrated. However, this case is non-limiting. For example, also in an operation of scooping up soil that is temporarily set aside before loading onto a dump truck, a target digging trajectory amounting to a target volume may be generated, and the straight facing control for a rotating operation may be performed such that the attachment faces the target digging trajectory. In such a case, the target digging trajectory is changed every time a scooping operation is performed. Therefore, after soil is dumped onto the dump truck, the straight facing control is performed with respect to a newly changed target digging trajectory.

The rotation hydraulic motor 2A has a first port 2A1 and a second port 2A2. A hydraulic sensor 21 detects the pressure of the operating oil at the first port 2A1 of the rotation hydraulic motor 2A. A hydraulic sensor 22 detects the pressure of the operating oil at the second port 2A2 of the rotation hydraulic motor 2A. Detection signals matching the discharging pressures detected by the hydraulic sensors 21 and 22 load into the controller 30.

The first port 2A1 is coupled to an operating oil tank via a relief valve 23. The relief valve 23 opens when the pressure at the first port 2A1 side reaches a predetermined relief pressure, and ejects the operating oil at the first port 2A1 side into the operating oil tank. Likewise, the second port 2A2 is coupled to the operating oil tank via a relief valve 24. The relief valve 24 opens when the pressure at the second port 2A2 side reaches a predetermined relief pressure, and ejects the operating oil at the second port 2A2 side into the operating oil tank.

[Shovel Hydraulic System]

Next, a hydraulic system of the shovel 100 according to the first embodiment will be described with reference to FIG. 3.

Figure 3:
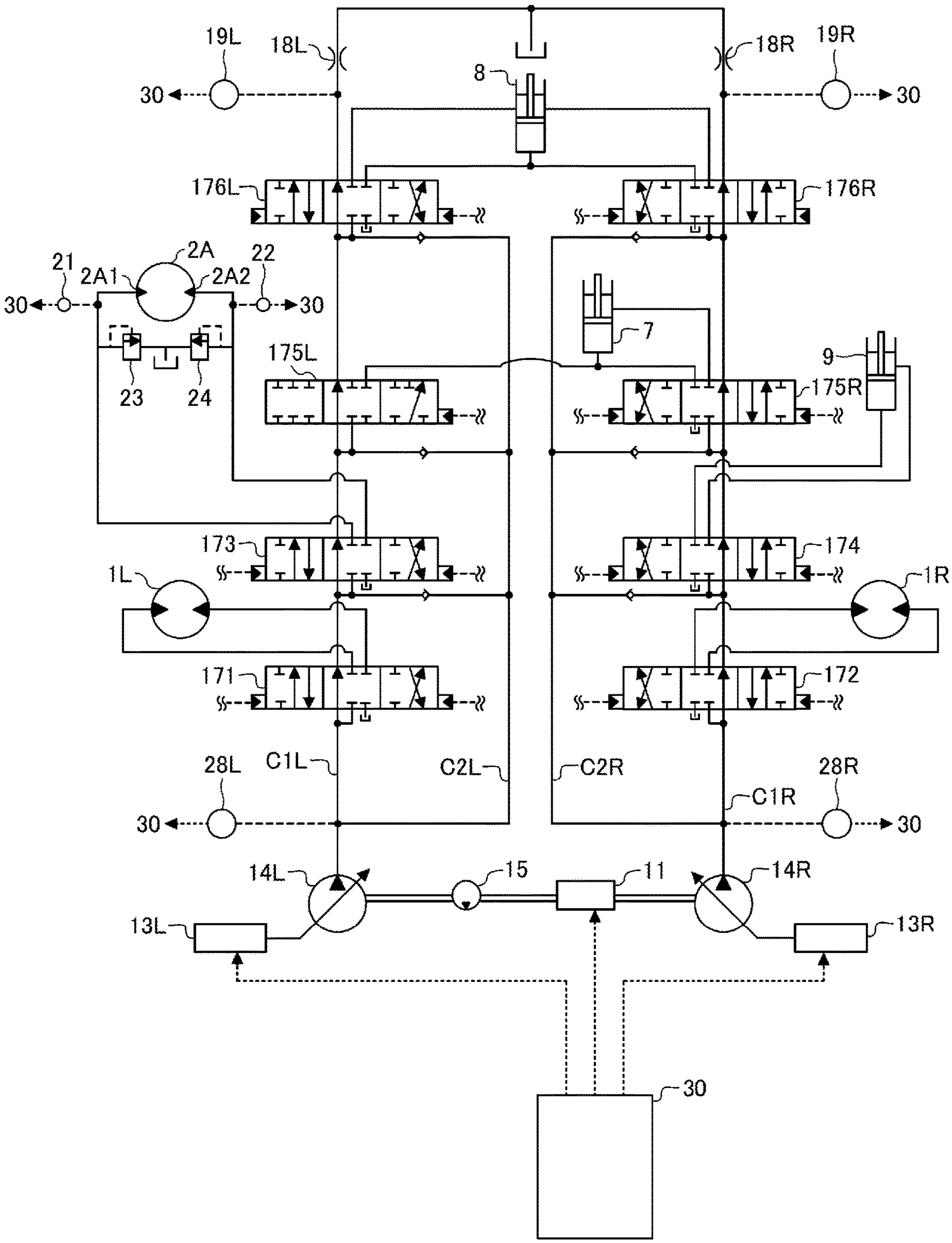
FIG. 3 is a view schematically illustrating an example of a configuration of a hydraulic system of a shovel according to one embodiment.

FIG. 3 is a view schematically illustrating an example of the configuration of the hydraulic system of the shovel 100 according to the first embodiment.

In FIG. 3, the mechanical power system, the operating oil line, the pilot line, and the electric control system are denoted by double lines, solid line, broken line, and dotted line, respectively as in, for example, FIG. 2.

The hydraulic system realized by this hydraulic circuit circulates the operating oil from both of the main pumps 14L and 14R driven by the engine 11 to the operating oil tank through center bypass oil paths C1L and C1R and parallel oil paths C2L and C2R.

The center bypass oil path C1L starts from the main pump 14L, sequentially passes the control valves 171, 173, 175L, and 176L situated in the control valve 17, and reaches the operating oil tank.

The center bypass oil path C1R starts from the main pump 14R, sequentially passes the control valves 172, 174, 175R, and 176R situated in the control valve 17, and reaches the operating oil tank.

The control valve 171 is a spool valve that supplies the operating oil discharged from the main pump 14L to the running hydraulic motor 1L, and ejects the operating oil discharged by the running hydraulic motor 1L into the operating oil tank.

The control valve 172 is a spool valve that supplies the operating oil discharged from the main pump 14R to the running hydraulic motor 1R, and ejects the operating oil discharged by the running hydraulic motor 1R into the operating oil tank.

The control valve 173 is a spool valve that supplies the operating oil discharged from the main pump 14L to the rotation hydraulic motor 2A, and ejects the operating oil discharged by the rotation hydraulic motor 2A into the operating oil tank.

The control valve 174 is a spool valve that supplies the operating oil discharged from the main pump 14R to the bucket cylinder 9, and ejects the operating oil in the bucket cylinder 9 into the operating oil tank.

The control valves 175L and 175R are spool valves that both supply the operating oil discharged by the main pumps 14L and 14R to the boom cylinder 7, and eject the operating oil in the boom cylinder 7 into the operating oil tank.

The control valves 176L and 176R supply the operating oil discharged by the main pumps 14L and 14R to the arm cylinder 8, and eject the operating oil in the arm cylinder 8 into the operating oil tank.

The control valves 171, 172, 173, 174, 175L, 175R, 176L, and 176R each adjust the flow rate of, or switch the flow direction of, the operating oil that is supplied to or ejected from the hydraulic actuators, in accordance with the pilot pressures that act on the pilot ports.

The parallel oil path C2L supplies the operating oil from the main pump 14L to the control valves 171, 173, 175L, and 176L in parallel with the center bypass oil path C1L.

Specifically, the parallel oil path C2L diverges from the center bypass oil path C1L at the upstream side of the control valve 171, to be able to supply the operating oil from the main pump 14L to the control valves 171, 173, 175L, and 176L in parallel. Hence, when the flow of the operating oil passing through the center bypass oil path C1L is restricted or interrupted by any of the control valves 171, 173, and 175L, the parallel oil path C2L can supply the operating oil to the more downstream control valves.

The parallel oil path C2R supplies the operating oil from the main pump 14R to the control valves 172, 174, 175R, and 176R in parallel with the center bypass oil path C1R. Specifically, the parallel oil path C2R diverges from the center bypass oil path C1R at the upstream side of the control valve 172, to be able to supply the operating oil from the main pump 14R to the control valves 172, 174, 175R, and 176R in parallel. When the flow of the operating oil passing through the center bypass oil path C1R is restricted or interrupted by any of the control valves 172, 174, and 175R, the parallel oil path C2R can supply the operating oil to the more downstream control valves.

The regulators 13L and 13R regulate the discharging amounts of the main pumps 14L and 14R by adjusting the tilt angles of the swash plates of the main pumps 14L and 14R under control of the controller 30.

The discharging pressure sensor 28L detects the discharging pressure of the main pump 14L, and a detection signal matching the detected discharging pressure loads into the controller 30. The same applies to the discharging pressure sensor 28R. Hence, the controller 30 can control the regulators 13L and 13R in accordance with the discharging pressures of the main pumps 14L and 14R.

The center bypass oil paths C1L and C1R include negative control throttles 18L and 18R that are situated between the most downstream control valves 176L and 176R and the operating oil tank. Hence, the flow of the operating oil discharged by the main pumps 14L and 14R is restricted by the negative control throttles 18L and 18R. Then, the negative control throttles 18L and 18R generate control pressures (hereinafter, "negative control pressures") for controlling the regulators 13L and 13R.

Negative control pressure sensors 19L and 19R detect the negative control pressures, and detection signals matching the detected negative control pressures load into the controller 30.

The controller 30 may control the regulators 13L and 13R in accordance with the discharging pressures of the main pumps 14L and 14R detected by the discharging pressure sensors 28L and 28R, and adjust the discharging amounts of the main pumps 14L and 14R. For example, the controller 30 may control the regulator 13L in response to increase in the discharging pressure of the main pump 14L and adjust the swash plate tilt angle of the main pump 14L, to thereby reduce the discharging amount. The same applies to the regulator 13R. In this way, the controller 30 can perform overall horsepower control for the main pumps 14L and 14R such that the absorbing horsepower of each of the main pumps 14L and 14R, expressed as a product between the discharging pressure and the discharging amount, does not exceed the output horsepower of the engine 11.

The controller 30 may adjust the discharging amounts of the main pumps 14L and 14R, by controlling the regulators 13L and 13R in accordance with the negative control pressures detected by the negative control pressure sensors 19L and 19R. For example, the controller 30 makes the discharging amounts of the main pumps 14L and 14R lower the higher the negative control pressures are, and makes the discharging amounts of the main pumps 14L and 14R higher the lower the negative control pressures are.

Specifically, in a stand-by state (i.e., the state illustrated in FIG. 3) in which none of the hydraulic actuators of the shovel 100 is operated, the operating oil discharged from the main pumps 14L and 14R reaches the negative control throttles 18L and 18R through the center bypass oil paths C1L and C1R. The flow of the operating oil discharged from the main pumps 14L and 14R increases the negative control pressures that are generated upstream of the negative control throttles 18L and 18R. As a result, the controller 30 reduces the discharging amounts of the main pumps 14L and 14R to the lowest discharging amounts that are tolerable, to inhibit pressure loss (pumping loss) when the discharged operating oil passes the center bypass oil paths C1L and C1R.

On the other hand, when any of the hydraulic actuators is operated via the operation device 26, the operating oil discharged from the main pumps 14L and 14R flows into the hydraulic actuator that is operated, via the control valve corresponding to the hydraulic actuator that is operated. This reduces the amount of, or puts an end to, the flow of the actuating oil that is discharged from the main pumps 14L and 14R and will reach the negative control throttles 18L and 18R, to lower the negative control pressures to be generated upstream of the negative control throttles 18L and 18R. As a result, the controller increases the discharging amounts of the main pumps 14L and 14R, circulates the operating oil sufficiently to the hydraulic actuator that is operated, and can drive the hydraulic actuator that is operated, without fail.

[Details of Configuration Involved in Machine Control Function of Shovel]

Next, the details of the configuration involved in the machine control function of the shovel 100 will be described with reference to FIG. 4A to FIG. 4C.

Figure 4A:
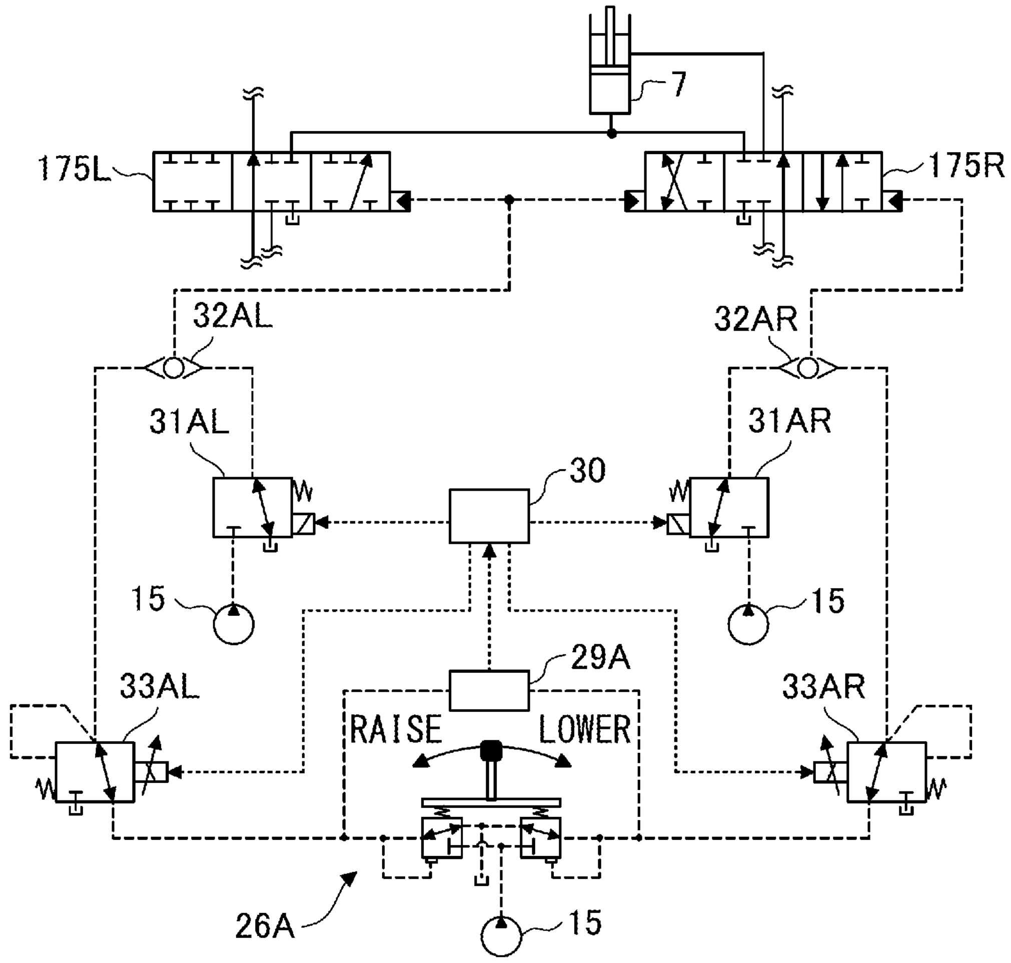
FIG. 4A is a view schematically illustrating an example of parts of a configuration involved in an operation system of a hydraulic system of a shovel according to one embodiment.
Figure 4B:
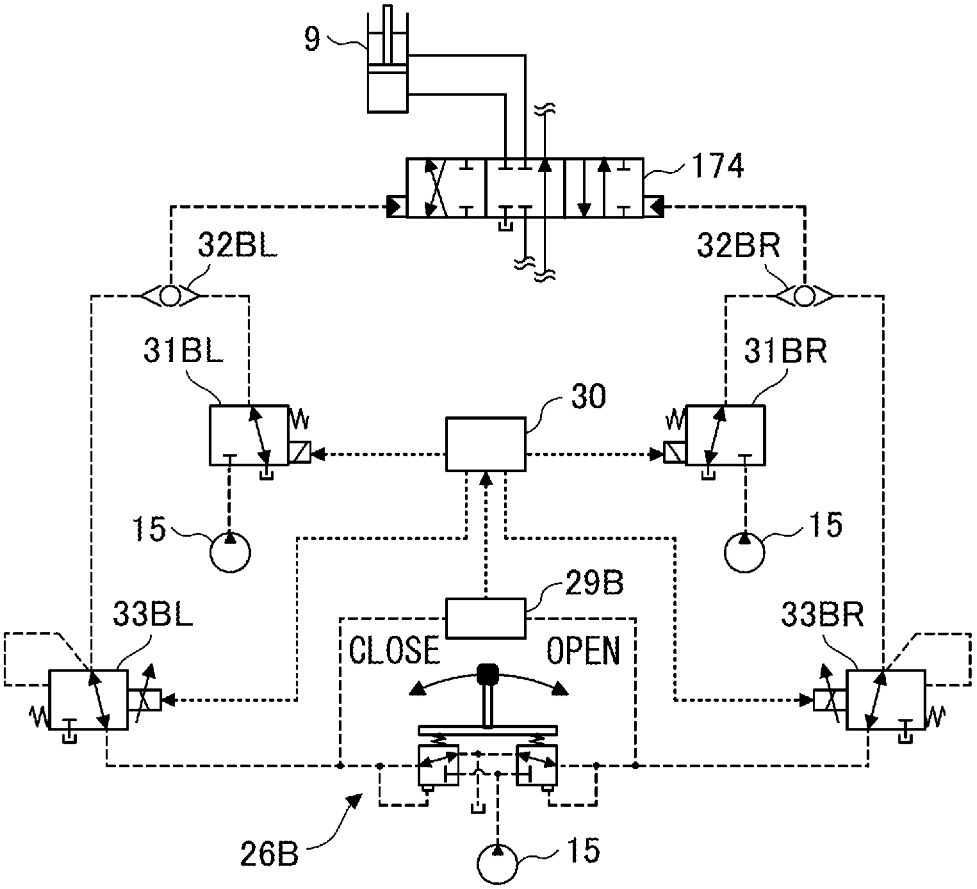
FIG. 4B is a view schematically illustrating an example of parts of a configuration involved in an operation system of a hydraulic system of a shovel according to one embodiment.
Figure 4C:
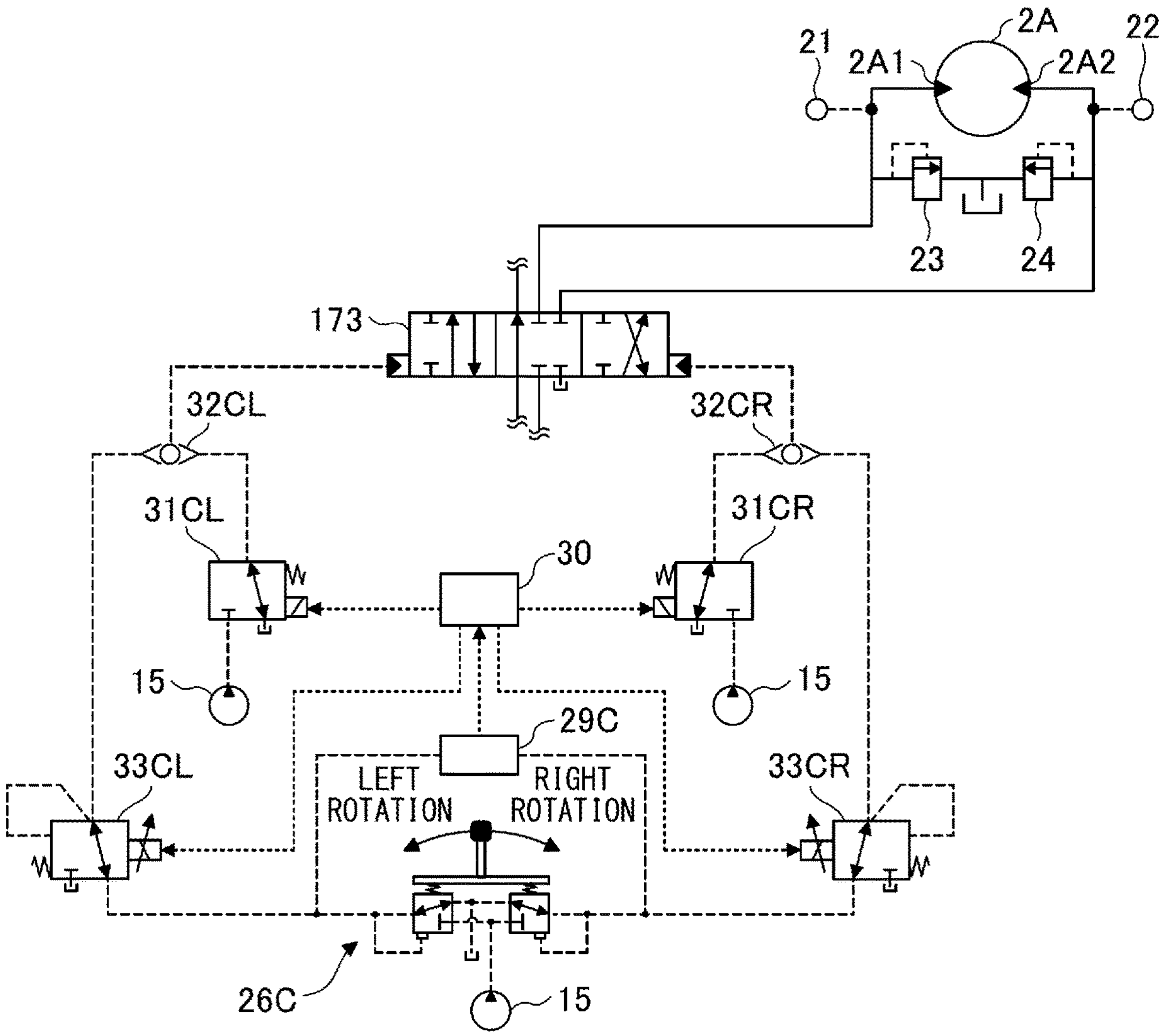
FIG. 4C is a view schematically illustrating an example of parts of a configuration involved in an operation system of a hydraulic system of a shovel according to one embodiment.

FIG. 4A to FIG. 4C are views schematically illustrating an example of parts of a configuration involved in the operation system of the hydraulic system of the shovel 100 according to the first embodiment. Specifically, FIG. 4A is a view illustrating an example of a pilot circuit that makes pilot pressures act on the control valves 175L and 175R that hydraulically control the boom cylinder 7. FIG. 4B is a view illustrating an example of a pilot circuit that makes a pilot pressure act on the control valve 174 that hydraulically controls the bucket cylinder 9. FIG. 4C is a view illustrating an example of a pilot circuit that makes a pilot pressure act on the control valve 173 that hydraulically controls the rotation hydraulic motor 2A.

For example, as illustrated in FIG. 4A, the lever device 26A is used by, for example, the operator in order to operate the boom cylinder 7 corresponding to the boom 4. The lever device 26A outputs a pilot pressure, which matches the content of an operation given to the lever device 26A, to the secondary side, by using the operating oil discharged from the pilot pump 15.

The shuttle valve 32AL has two inlet ports that are coupled to a pilot line on the secondary side of the lever device 26A corresponding to an operation of the boom 4 in a raising direction (hereinafter, "boom raising operation") and to a pilot line on the secondary side of the proportional valve 31AL respectively, and has an output port that is coupled to a right pilot port of the control valve 175L and to a left pilot port of the control valve 175R.

The shuttle valve 32AR has two inlet ports that are coupled to a pilot line on the secondary side of the lever device 26A corresponding to an operation of the boom 4 in a lowering direction (hereinafter, "boom lowering operation") and to a pilot line on the secondary side of the proportional valve 31AR, and has an output port that is coupled to a right pilot port of the control valve 175R.

That is, the lever device 26A makes pilot pressures, which match the content of an operation (e.g., the direction of the operation and the amount of the operation), act on the pilot ports of the control valves 175L and 175R via the shuttle valves 32AL and 32AR. Specifically, when a boom raising operation is given, the lever device 26A outputs a pilot pressure matching the amount of the operation to one inlet port of the shuttle valve 32AL, to make the pilot pressure act on the right pilot port of the control valve 175L and on the left pilot port of the control valve 175R via the shuttle valve 32AL. When a boom lowering operation is given, the lever device 26A outputs a pilot pressure matching the amount of the operation to one inlet port of the shuttle valve 32AR, to make the pilot pressure act on the right pilot port of the control valve 175R via the shuttle valve 32AR.

The proportional valve 31AL operates in response to a control current that is input by the controller 30. Specifically, the proportional valve 31AL outputs a pilot pressure matching the control current input by the controller 30 to the other inlet port of the shuttle valve 32AL, using the operating oil discharged from the pilot pump 15. In this way, the proportional valve 31AL can adjust the pilot pressure that acts on the right pilot port of the control valve 175L and on the left pilot port of the control valve 175R via the shuttle valve 32AL.

The proportional valve 31AR operates in response to a control current that is input by the controller 30. Specifically, the proportional valve 31AR outputs a pilot pressure matching the control current input by the controller 30 to the other inlet port of the shuttle valve 32AR, using the operating oil discharged from the pilot pump 15. In this way, the proportional valve 31AR can adjust the pilot pressure that acts on the right pilot port of the control valve 175R via the shuttle valve 32AR.

That is, the proportional valves 31AL and 31AR can adjust the pilot pressures to be output to the secondary side such that the control valves 175L and 175R can be stopped at desirably selected valve positions irrespective of the condition of an operation give to the lever device 26A.

A proportional valve 33AL functions as a control valve for machine control, like the proportional valve 31AL. The proportional valve 33AL is situated on a duct line that couples the operation device 26 and the shuttle valve 32AL to each other, and the flow area of the duct line is variable. In the first embodiment, the proportional valve 33AL operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32AL.

Likewise, a proportional valve 33AR functions as control valve for machine control. The proportional valve 33AR is situated on a duct line that couples the operation device 26 and the shuttle valve 32AR to each other, and the flow area of the duct line is variable. In the first embodiment, the proportional valve 33AR operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32AR.

An operation pressure sensor 29A detects the content of an operation, which is given to the lever device 26A by the operator, in the form of a pressure (operation pressure), and a detection signal matching the detected pressure loads into the controller 30. Hence, the controller 30 can get hold of the content of the operation given to the lever device 26A.

The controller 30 can supply the operating oil discharged from the pilot pump 15 to the right pilot port of the control valve 175L and to the left pilot port of the control valve 175R via the proportional valve 31AL and the shuttle valve 32AL, irrespective of a boom raising operation given to the lever device 26A by the operator. The controller 30 can supply the operating oil discharged from the pilot pump 15 to the right pilot port of the control valve 175R via the proportional valve 31AR and the shuttle valve 32AR, irrespective of a boom lowering operation given to the lever device 26A by the operator. That is, the controller 30 can automatically control the operations for raising and lowering the boom 4. Moreover, even while an operation is being given to a specific operation device 26, the controller 30 can forcibly stop the operation of the hydraulic actuator corresponding to the specific operation device 26.

The proportional valve 33AL operates in accordance with a control instruction (electric current instruction) output by the controller 30. Then, the proportional valve 33AL reduces the pilot pressure attributable to the operating oil that is introduced from the pilot pump 15 into the right pilot port of the control valve 175L and into the left pilot port of the control valve 175R via the lever device 26A, the proportional valve 33AL, and the shuttle valve 32AL. The proportional valve 33AR operates in accordance with a control instruction (electric current instruction) output by the controller 30. Then, the proportional valve 33AR reduces the pilot pressure attributable to the operating oil that is introduced from the pilot pump 15 into the right pilot port of the control valve 175R via the lever device 26A, the proportional valve 33AR, and the shuttle valve 32AR. The proportional valves 33AL and 33AR can adjust the pilot pressures such that the control valves 175L and 175R can be stopped at desirably selected valve positions.

Even while the operator is giving a boom raising operation, this configuration enables the controller 30 to reduce the pilot pressure that acts on the raising-side pilot ports of the control valves 175 (i.e., the right pilot port of the control valve 175L and the left pilot port of the control valve 175R) as needed, and to forcibly stop the operation of raising the boom 4. The same applies when forcibly stopping an operation of lowering the boom 4 while the operator is giving a boom lowering operation.

Alternatively, even while the operator is giving a boom raising operation, the controller 30 may control the proportional valve 31AR as needed, to increase the pilot pressure that acts on the lowering-side pilot port of the control valve 175 (i.e., the right pilot port of the control valve 175R), which is located at the opposite side to the raising-side pilot port of the control valve 175, to forcibly return the control valve 175 to a neutral position and thereby forcibly stop the operation of raising the boom 4. In such a case, the proportional valve 33AL may be omitted. The same applies when forcibly stopping an operation of lowering the boom 4 while the operator is giving a boom lowering operation.

As illustrated in FIG. 4B, the lever device 26B is used by, for example, the operator in order to operate the bucket cylinder 9 corresponding to the bucket 6. The lever device 26B outputs a pilot pressure, which matches the content of an operation given to the lever device 26B, to the secondary side, by using the operating oil discharged from the pilot pump 15.

A shuttle valve 32BL has two inlet ports that are coupled to a pilot line on the secondary side of the lever device 26B corresponding to an operation of the bucket 6 in a closing direction (hereinafter, "bucket closing operation") and to a pilot line on the secondary side of a proportional valve 31BL respectively, and has an output port that is coupled to a left pilot port of the control valve 174.

A shuttle valve 32BR has two inlet ports that are coupled to a pilot line on the secondary side of the lever device 26B corresponding to an operation of the bucket 6 in an opening direction (hereinafter, "bucket opening operation") and to a pilot line on the secondary side of a proportional valve 31BR respectively, and has an outlet port that is coupled to a right pilot port of the control valve 174.

That is, the lever device 26B makes pilot pressures, which match the contents of operations, act on the pilot ports of the control valve 174 via the shuttle valves 32BL and 32BR. Specifically, when a bucket closing operation is given, the lever device 26B outputs a pilot pressure matching the amount of the operation to one inlet port of the shuttle valve 32BL, to make the pilot pressure act on the left pilot port of the control valve 174 via the shuttle valve 32BL. When a bucket opening operation is given, the lever device 26B outputs a pilot pressure matching the amount of the operation to one inlet port of the shuttle valve 32BR, to make the pilot pressure act on the right pilot port of the control valve 174 via the shuttle valve 32BR.

The proportional valve 31BL operates in response to a control current input by the controller 30. Specifically, the proportional valve 31BL outputs a pilot pressure matching the control current input by the controller 30 to the other inlet port of the shuttle valve 32BL, using the operating oil discharged from the pilot pump 15. In this way, the proportional valve 31BL can adjust the pilot pressure that acts on the left pilot port of the control valve 174 via the shuttle valve 32BL.

The proportional valve 31BR operates in response to a control current output by the controller 30. Specifically, the proportional valve 31BR outputs a pilot pressure matching the control current input by the controller 30 to the other inlet port of the shuttle valve 32BR, using the operating oil discharged from the pilot pump 15. In this way, the proportional valve 31BR can adjust the pilot pressure that acts on the right pilot port of the control valve 174 via the shuttle valve 32BR.

That is, the proportional valves 31BL and 31BR can adjust the pilot pressures to be output to the secondary side in a manner that the control valve 174 can be stopped at a desirably selected valve position irrespective of the operation condition of the lever device 26B.

A proportional valve 33BL functions as a control valve for machine control, like the proportional valve 31BL. The proportional valve 33BL is situated on a duct line that couples the operation device 26 and the shuttle valve 32BL to each other, and the flow area of the duct line is variable. In the first embodiment, the proportional valve 33BL operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32BL.

Likewise, a proportional valve 33BR functions as control valve for machine control. The proportional valve 33BR is situated on a duct line that couples the operation device 26 and the shuttle valve 32BR to each other, and the flow area of the duct line is variable. In the first embodiment, the proportional valve 33BR operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32BR.

An operation pressure sensor 29B detects the content of an operation, which is given to the lever device 26B by the operator, in the form of a pressure (operation pressure), and a detection signal matching the detected pressure loads into the controller 30. Hence, the controller 30 can get hold of the content of the operation given to the lever device 26B.

The controller 30 can supply the operating oil discharged from the pilot pump 15 to the left pilot port of the control valve 174 via the proportional valve 31BL and the shuttle valve 32BL, irrespective of a bucket closing operation given to the lever device 26B by the operator. The controller 30 can supply the operating oil discharged from the pilot pump 15 to the right pilot port of the control valve 174 via the proportional valve 31BR and the shuttle valve 32BR, irrespective of a bucket opening operation given to the lever device 26B by the operator. That is, the controller 30 can automatically control the operations for opening and closing the bucket 6. Moreover, even while an operation is being given to a specific operation device 26, the controller 30 can forcibly stop the operation of the hydraulic actuator corresponding to the specific operation device 26.

Operations of the proportional valves 33BL and 33BR for forcibly stopping the operation of the bucket 6 while the operator is giving a bucket closing operation or a bucket opening operation are the same as the operations of the proportional valves 33A1 and 33AR for forcibly stopping the operation of the boom 4 while the operator is giving a boom raising operation or a boom lowering operation. Hence, overlapping descriptions will be skipped.

For example, as illustrated in FIG. 4C, the lever device 26C is used by, for example, the operator in order to operate the rotation hydraulic motor 2A corresponding to the upper rotating body 3 (rotating mechanism 2). The lever device 26C outputs a pilot pressure, which matches the content of an operation given to the lever device 26C, to the secondary side, by using the operating oil discharged from the pilot pump 15.

A shuttle valve 32CL has two inlet ports that are coupled to a pilot line on the secondary side of the lever device 26C corresponding to a rotating operation of the upper rotating body 3 in the left direction (hereinafter, "left rotating operation") and to a pilot line on the secondary side of a proportional valve 31CL respectively, and has an outlet port that is coupled to a left pilot port of the control valve 173.

A shuttle valve 32CR has two inlet ports that are coupled to a pilot line on the secondary side of the lever device 26C corresponding to a rotating operation of the upper rotating body 3 in the right direction (hereinafter, "right rotating operation") and to a pilot line on the secondary side of a proportional valve 31CR respectively, and has an outlet port that is coupled to a right pilot port of the control valve 173.

That is, the lever device 26C makes pilot pressures, which match the contents of operations in the left and right directions, act on the pilot ports of the control valve 173 via the shuttle valves 32CL and 32CR. Specifically, when a left rotating operation is given, the lever device 26C outputs a pilot pressure matching the amount of the operation to one inlet port of the shuttle valve 32CL, to make the pilot pressure act on the left pilot port of the control valve 173 via the shuttle valve 32CL. When a right rotating operation is given, the lever device 26C outputs a pilot pressure matching the amount of the operation to one inlet port of the shuttle valve 32CR, to make the pilot pressure act on the right pilot port of the control valve 173 via the shuttle valve 32CR.

The proportional valve 31CL operates in response to a control current input by the controller 30. Specifically, the proportional valve 31CL outputs a pilot pressure matching the control current input by the controller 30 to the other inlet port of the shuttle valve 32CL, using the operating oil discharged from the pilot pump 15. In this way, the proportional valve 31CL can adjust the pilot pressure that acts on the left pilot port of the control valve 173 via the shuttle valve 32CL.

The proportional valve 31CR operates in response to a control current output by the controller 30. Specifically, the proportional valve 31CR outputs a pilot pressure matching the control current input by the controller 30 to the other inlet port of the shuttle valve 32CR, using the operating oil output from the pilot pump 15. In this way, the proportional valve 31CR can adjust the pilot pressure that acts on the right pilot port of the control valve 173 via the shuttle valve 32CR.

That is, the proportional valves 31CL and 31CR can adjust the pilot pressures to be output to the secondary side such that the control valve 173 can be stopped at a desirably selected valve position irrespective of the condition of an operation given to the lever device 26C.

A proportional valve 33CL functions as a control valve for machine control, like the proportional valve 31CL. The proportional valve 33CL is situated on a duct line that couples the operation device 26 and the shuttle valve 32CL to each other, and the flow area of the duct line is variable. In the first embodiment, the proportional valve 33CL operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32CL.

Likewise, a proportional valve 33CR functions as control valve for machine control. The proportional valve 33CR is situated on a duct line that couples the operation device 26 and the shuttle valve 32CR to each other, and the flow area of the duct line is variable. In the first embodiment, the proportional valve 33CR operates in accordance with a control instruction output by the controller 30. Hence, the controller 30 can reduce the pressure of the operating oil discharged from the operation device 26 irrespective of an operation given to the operation device 26 by the operator, and supply the operating oil, of which the pressure is thusly reduced, to the pilot port of the corresponding control valve in the control valve 17 via the shuttle valve 32CR.

An operation pressure sensor 29C detects the condition of an operation, which is given to the lever device 26C by the operator, in the form of a pressure, and a detection signal matching the detected pressure loads into the controller 30. Hence, the controller 30 can get hold of the content of the operation in the left or right direction, given to the lever device 26C.

The controller 30 can supply the operating oil discharged from the pilot pump 15 to the left pilot port of the control valve 173 via the proportional valve 31CL and the shuttle valve 32CL, irrespective of a left rotating operation given to the lever device 26C by the operator. The controller 30 can supply the operating oil discharged from the pilot pump 15 to the right pilot port of the control valve 173 via the proportional valve 31CR and the shuttle valve 32CR, irrespective of a right rotating operation given to the lever device 26C by the operator. That is, the controller 30 can automatically control the operations for rotating the upper rotating body 3 in the left and right directions. Moreover, even while an operation is being given to a specific operation device 26, the controller 30 can forcibly stop the operation of the hydraulic actuator corresponding to the specific operation device 26.

Operations of the proportional valves 33CL and 33CR for forcibly stopping the operation of the upper rotating body 3 while the operator is giving a rotating operation are the same as the operations of the proportional valves 33AL and 33AR for forcibly stopping the operation of the boom 4 while the operator is giving a boom raising operation or a boom lowering operation. Hence, overlapping descriptions will be skipped.

The shovel 100 may further have a configuration for automatically opening or closing the arm 5, and a configuration for automatically moving the lower running body 1 forward or rearward. In such a case, of the hydraulic system, the parts of the configuration involved in the operation system of the arm cylinder 8, the parts of the configuration involved in the operation system of the running hydraulic motor 1L, and the parts of the configuration involved in the operation of the running hydraulic motor 1R may be configured the same as, for example, the parts of the configuration (FIG. 4A to FIG. 4C) involved in the operation system of the boom cylinder 7.

[Details of Configuration Involved in Soil Load Detecting Function of Shovel]

Figure 5:
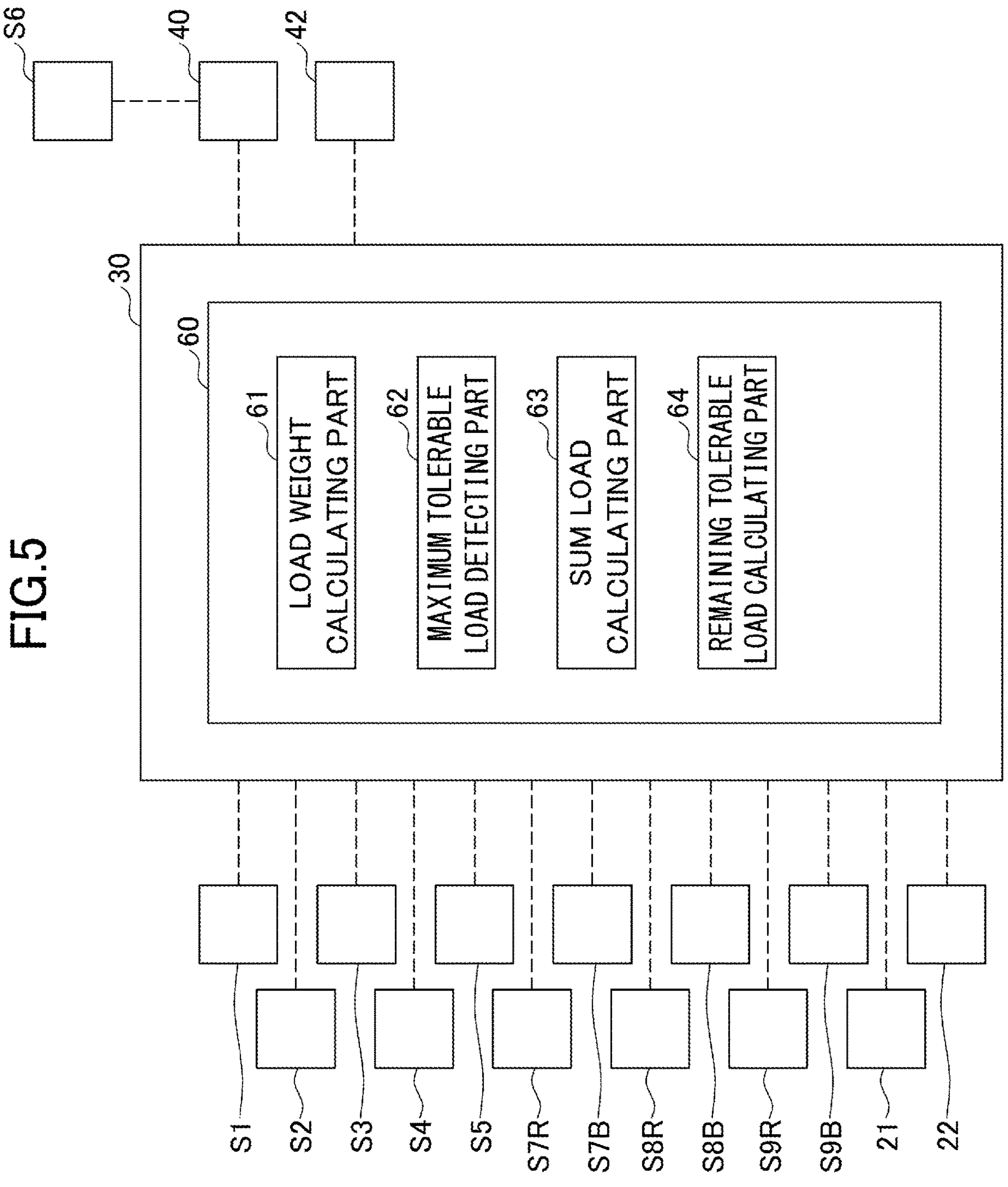
FIG. 5 is a view schematically illustrating an example of parts of a configuration involved in a soil load detecting function of a shovel according to one embodiment.

Next, the details of the configuration involved in the soil load detecting function of the shovel 100 according to the first embodiment will be described with reference to FIG. 5. FIG. 5 is a view schematically illustrating an example of parts of a configuration involved in the soil load detecting function of the shovel 100 according to the first embodiment.

As described above with reference to FIG. 3, the controller 30 includes the soil load processing part 60 as a functional part involved in the function for detecting the load of soil that is dug up with the bucket 6.

The soil load processing part 60 includes a load weight calculating part 61, a maximum tolerable load detecting part 62, a sum load calculating part 63, and a remaining tolerable load calculating part 64.

Here, an example of an operation of the shovel 100 according to the first embodiment for loading soil (load) onto a dump truck will be described.

First, the shovel 100 digs up soil with the bucket 6 by controlling the attachment at a digging location (digging operation). Next, the shovel 100 rotates the upper rotating body 3 to move the bucket 6 from the digging location to a soil dumping location (rotating operation). The loading platform of the dump truck is deployed below the soil dumping location. Next, the shovel 100 loads the soil in the bucket 6 onto the loading platform of the dump truck by dumping the soil in the bucket 6 by controlling the attachment at the soil dumping location (soil dumping operation). Next, the shovel 100 rotates the upper rotating body 3 to move the bucket 6 from the soil dumping location to the digging location (rotating operation). By repeating these operations, the shovel 100 loads soil that is dug up onto the loading platform of the dump truck.

The load weight calculating part 61 calculates the weight of the soil (load) in the bucket 6 when the shovel 100 performs a specified operation. Here, the specified operation is a starting requisite for starting calculation of the weight of the soil, and is, for example, raising the boom 4 to a predetermined angle, or a predetermined time having passed since rotating the upper rotating body 3.

The weight of the soil is calculated based on, for example, torque balance about the foot of the boom 4. Specifically, the soil in the bucket 6 increases the thrust on the boom cylinder 7, and also increases a torque about the foot of the boom 4 that is calculated based on the thrust on the boom cylinder 7. This torque increase, and a torque that is calculated based on the weight of the soil and the soil's center of gravity are equal. In this way, the load weight calculating part 61 can calculate the weight of the soil based on the thrust on the boom cylinder 7 (the thrust being a value measured by the boom rod pressure sensor S7R and the boom bottom pressure sensor S7B) and the soil's center of gravity. The soil's center of gravity is, for example, previously ascertained by experiments and stored in the controller 30. The example in which the weight of soil is calculated based on the thrust on the boom cylinder 7 has been described. However, the method for calculating the weight of soil is not limited to this. The weight of soil may be calculated based on the thrust on the arm cylinder 8 (the thrust being a value measured by the arm rod pressure sensor S8R and the arm bottom pressure sensor S8B), or the weight of soil may be calculated based on the thrust on the bucket cylinder 9 (the thrust being a value measured by the bucket rod pressure sensor S9R and the bucket bottom pressure sensor S9B). The weight of soil may also be calculated based on the rotation torque on the rotation hydraulic motor 2A when rotating the upper rotating body 3 (the rotation torque being a value measured by the hydraulic sensors 21 and 22).

The maximum tolerable load detecting part 62 detects the maximum tolerable load of the dump truck, which is the target onto which soil is loaded. For example, the maximum tolerable load detecting part 62 identifies the dump truck, which is the target onto which soil is loaded, based on an image captured by the image capturing device S6. Next, the maximum tolerable load detecting part 62 detects the maximum tolerable load of the dump track based on the image of the dump truck identified. For example, the maximum tolerable load detecting part 62 determines the vehicle type (e.g., size) of the dump truck based on the image of the dump truck identified. The maximum tolerable load detecting part 62 includes a table in which vehicle types and maximum tolerable loads are associated with each other, and derives the maximum tolerable load of the dump truck based on the vehicle type determined from the image and the table. For example, it is optional to input, for example, the maximum tolerable load and the vehicle type of the dump truck via the input device 42, so that the maximum tolerable load detecting part 62 may derive the maximum tolerable load of the dump truck based on the information that is input via the input device 42.

The sum load calculating part 63 calculates the weight of soil loaded onto the dump truck. That is, every time soil in the bucket 6 is dumped onto the loading platform of the dump truck, the sum load calculating part 63 adds the weight of the soil in the bucket 6, which is calculated by the load weight calculating part 61, to calculate the sum load (total weight), which is the total weight of the soil loaded onto the loading platform of the dump truck. When the dump truck, which is the target onto which to load soil, is changed to a new dump truck, the sum load is reset.

The remaining tolerable load calculating part 64 calculates the difference between the maximum tolerable load of the dump truck detected by the maximum tolerable load detecting part 62 and the current sum load calculated by the sum load calculating part 63, as a remaining tolerable load. The remaining tolerable load is the weight of soil that can still be loaded onto the dump truck.

The display device 40 may display the weight of soil in the bucket 6 calculated by the load weight calculating part 61, the maximum tolerable load of the dump truck detected by the maximum tolerable load detecting part 62, the sum load on the dump truck (the total weight of the soil loaded onto the loading platform) calculated by the sum load calculating part 63, and the remaining tolerable load of the dump truck (the weight of soil that can still be loaded) calculated by the remaining tolerable load calculating part 64.

When the sum load has exceeded the maximum tolerable load, an alert may be brought up on the display device 40. When a calculated weight of soil in the bucket 6 is greater than the remaining tolerable load, an alert may be brought up on the display device 40. The alert is not limited to being displayed on the display device 40, but may be acoustically output by the sound output device 43. This makes it possible to minimize loading of soil onto the dump truck more than the maximum tolerable load.

[Digging and Loading Operation of Shovel]

Figure 6:
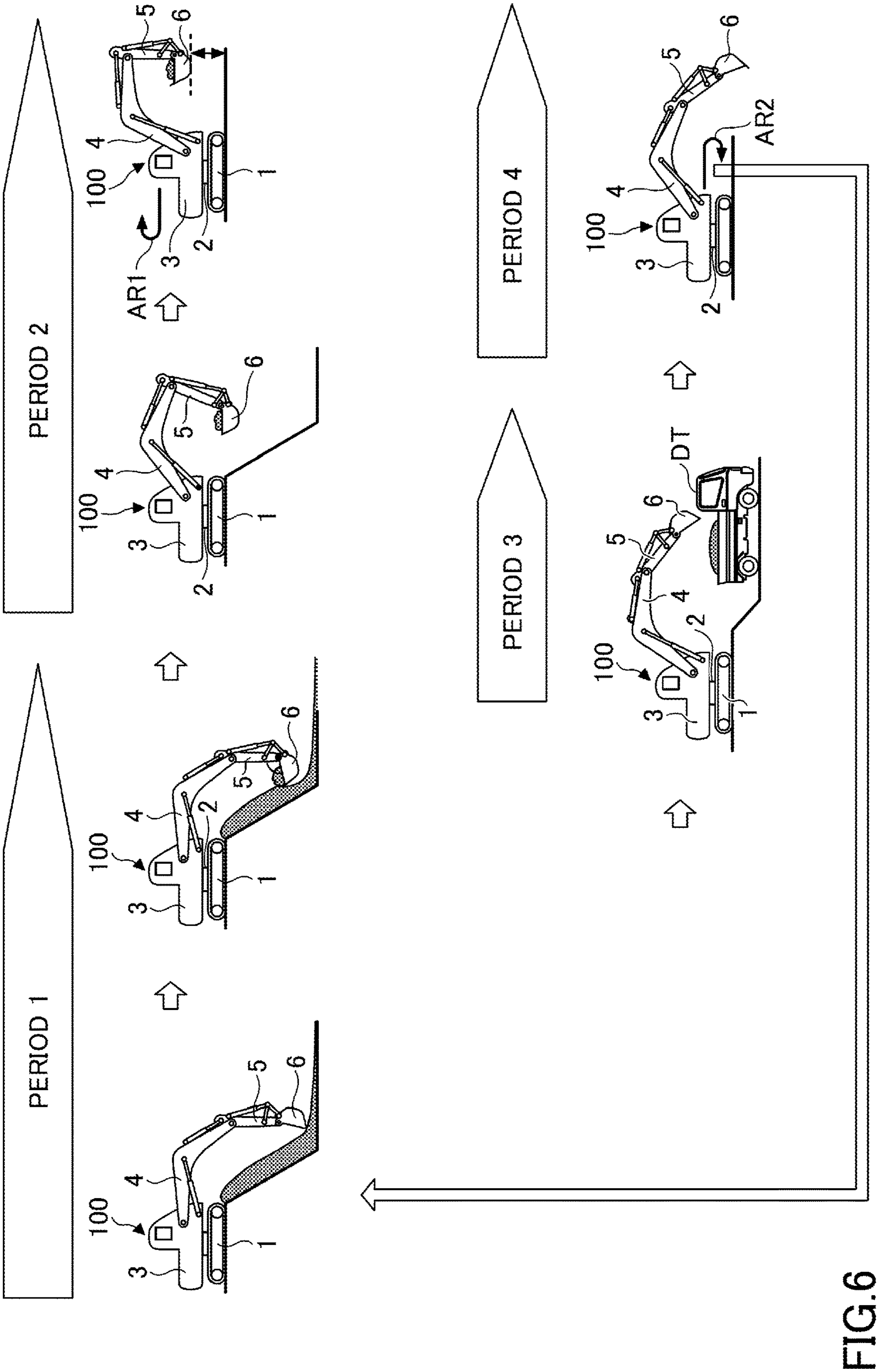
FIG. 6 is a view illustrating a deep-digging excavation/loading operation of a shovel.

Next, an example of an operation of the shovel 100 will be described with reference to FIG. 6. FIG. 6 is a view illustrating a deep-digging excavation/loading operation of the shovel 100.

First, the operator performs a boom lowering operation as illustrated in FIG. 6 in Period 1 at the start side of the center arrow. Then, the operator performs positioning of the end of the bucket 6 such that the end reaches a desired height position with respect to the digging target, and, as illustrated in FIG. 6 in Period 1 at the head side of the center arrow, gradually closes the bucket 6 from its open state. Here, the excavated soil enters the bucket 6.

Next, the operator raises the boom 4 while keeping the upper rim of the bucket 6 approximately horizontal, to raise the bucket 6 to the position illustrated in FIG. 6 in Period 2 at the start side of the center arrow. Here, the operator may perform an operation of closing the arm 5 at the same time as raising the boom 4.

Then, the operator raises the boom 4 until the bottom of the bucket 6 comes to a desired height from the ground as illustrated in FIG. 6 in Period 2 at the head side of the center arrow. The desired height is, for example, a height equal to or higher than the height of a dump truck DT (see FIG. 6 in Period 3). Next or at the same time, the operator rotates the upper rotating body 3 as denoted by an arrow AR1, to move the bucket 6 to a dumping location. The operation of the shovel here is referred to as a boom raising/rotating operation, and Period 2 in which this operation is performed is referred to as a boom raising/rotating operation period.

Upon finishing the boom raising/rotating operation, the operator next opens the arm 5 and the bucket 6 as illustrated in FIG. 6 in Period 3, to dump the soil in the bucket 6. The operation of the shovel 100 here is referred to as a dumping operation, and Period 3 in which this operation is performed is referred to as a dumping operation period. In the dumping operation, the operator may dump the soil by opening only the bucket 6.

Upon finishing the dumping operation, the operator next rotates the upper rotating body 3 as illustrated in FIG. 6 in Period 4 by an arrow AR2, to move the bucket 6 to right above the digging location. Here, the operator lowers the boom 4 at the same time as the rotating, to lower the bucket 6 to a desired height from the digging target. The operation of the shovel here is referred to as a boom lowering/rotating operation, and Period 4 in which this operation is performed is referred to as a boom lowering/rotating operation period.

The operator proceeds with the deep-digging excavation/loading operation, by repeating the cycle formed of "digging operation", "boom raising/rotating operation", "dumping operation", and "boom lowering/rotating operation".

[Soil Weight Calculating Method of Shovel 100 According to First Embodiment]

Next, the method by which the load weight calculating part 61 of the shovel 100 according to the first embodiment calculates the weight of the soil (load) in the bucket 6 will be described with reference to FIG. 7 to FIG. 9.

Figure 7A:
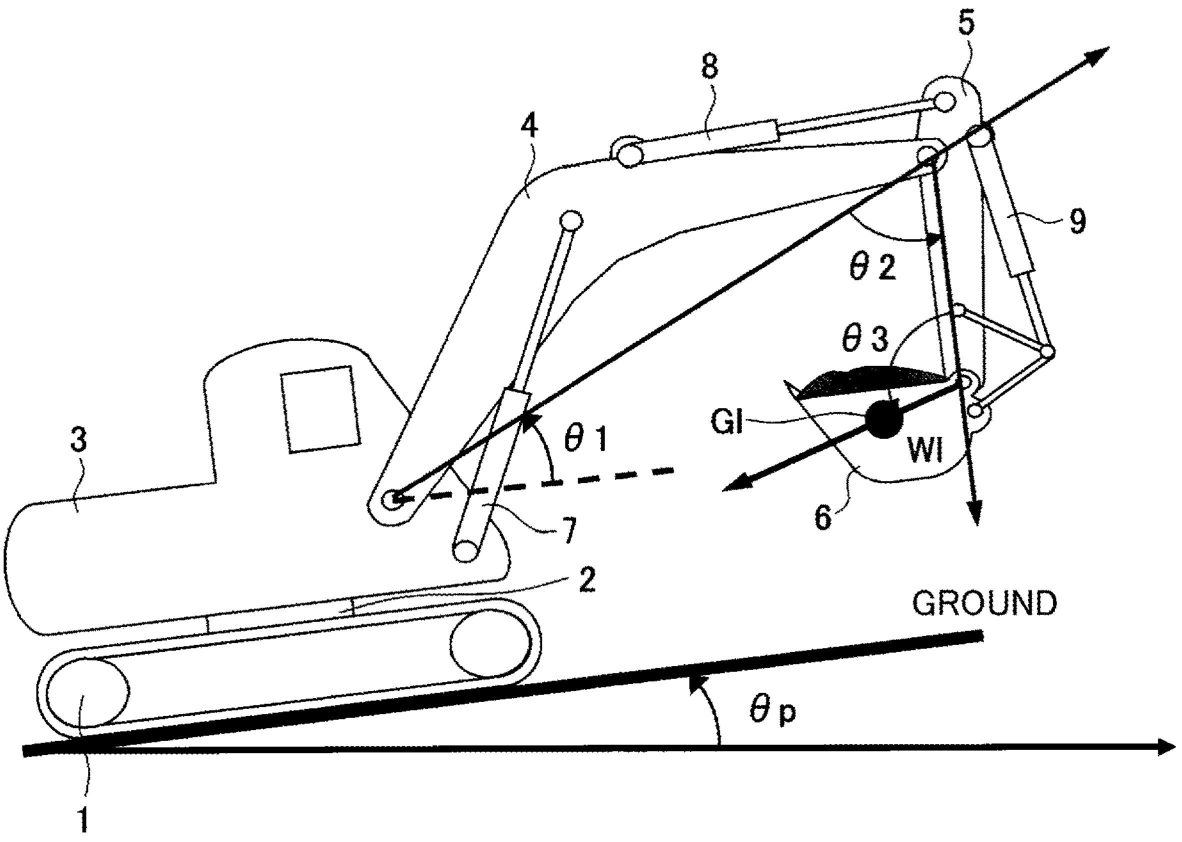
FIG. 7A is a view illustrating parameters of a shovel.
Figure 7B:
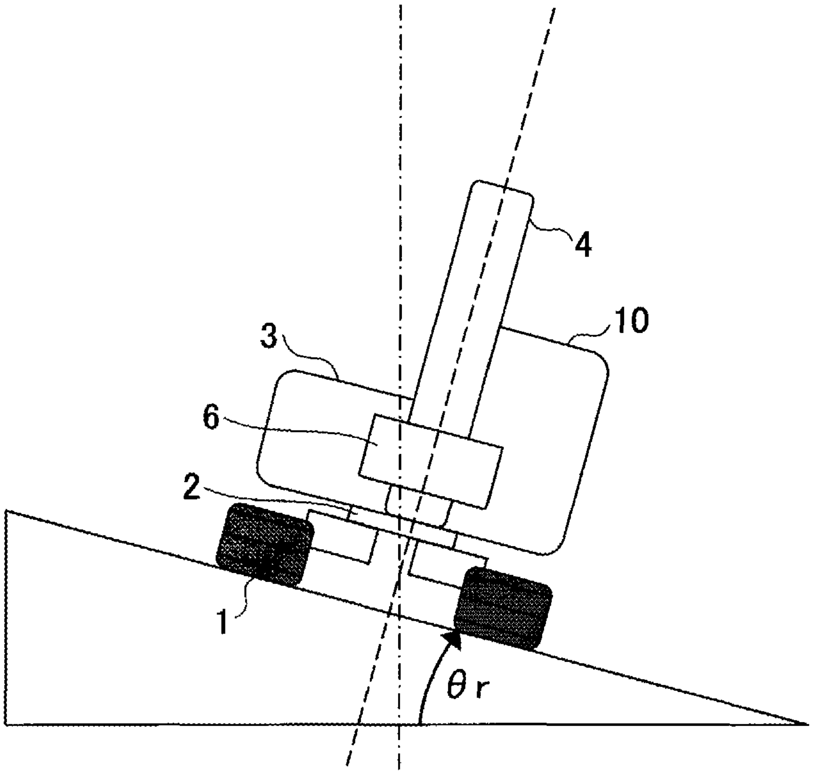
FIG. 7B is a view illustrating parameters of a shovel.
Figure 8:
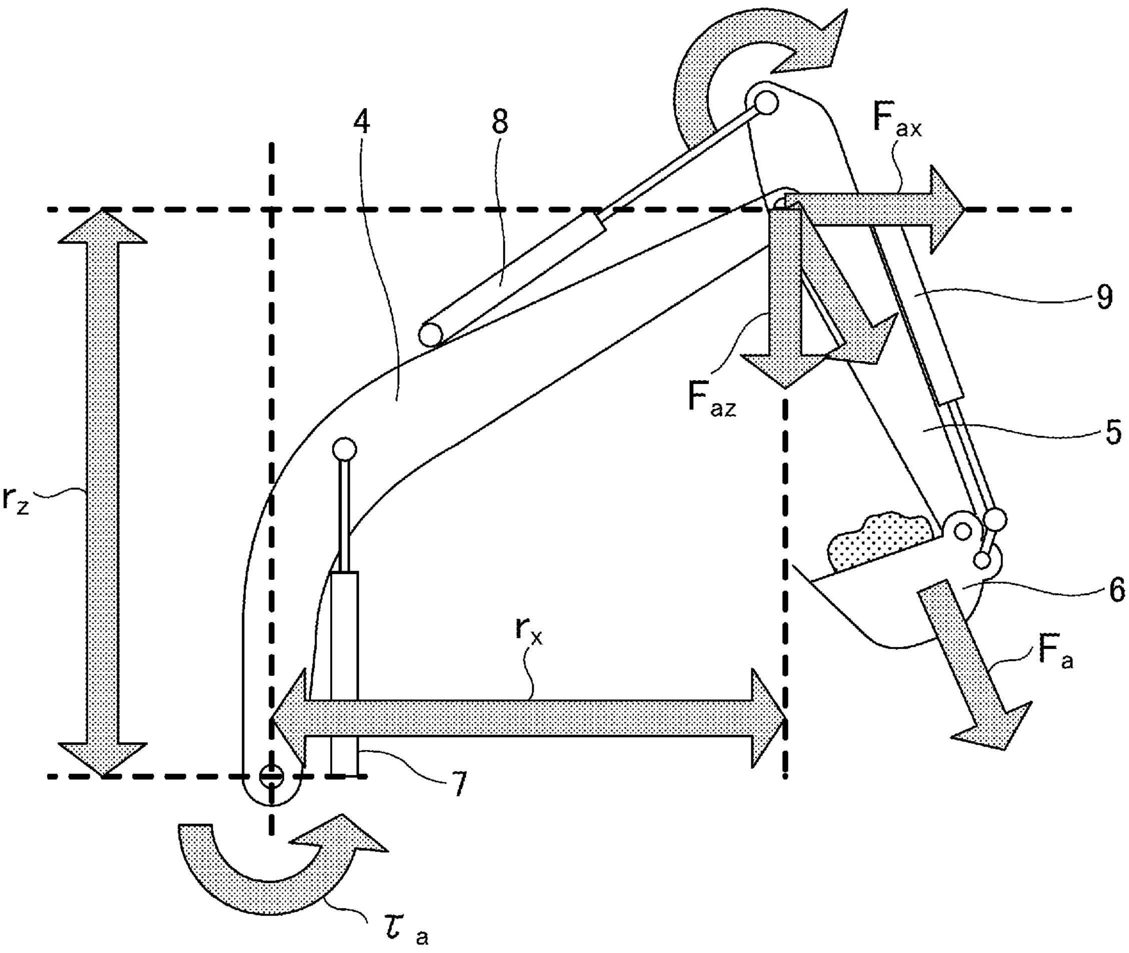
FIG. 8 is an exemplary view of an attachment of a shovel, and illustrating a relationship between an arm opening/closing operation and a torque about a foot pin of a boom.

FIG. 7A and FIG. 7B are views illustrating parameters of the shovel 100. FIG. 7A is a side view and FIG. 7B is a front view.

As illustrated in FIG. 7A, the center of gravity of soil (load) loaded in the bucket 6 is referred to as soil's center of gravity G1. The position of the soil's center of gravity G1 with respect to the bucket 6 is, for example, previously ascertained by experiments and stored in the controller 30. The weight of the soil loaded in the bucket 6 is referred to as soil weight W1. The angle formed by a straight line connecting the fulcra on both ends of the boom 4 with respect to the rotation plane of the upper rotating body 3 is referred to as a boom angle θ1. The boom angle θ1 is detected by the boom angle sensor ANOTHER EMBODIMENT. The angle formed by a straight line connecting the fulcra on both ends of the arm 5 with respect to the straight line connecting the fulcra on both ends of the boom 4 is referred to as an arm angle θ2. The arm angle θ2 is detected by the arm angle sensor S2. An angle formed by a straight line connecting the fulcrum of the bucket 6 and the soil's center of gravity G1 with respect to the straight line connecting the fulcra on both ends of the arm 5 is referred to as a bucket angle θ3. The bucket angle θ3 is detected by the bucket angle sensor S3. The inclination angle of the shovel 100 in the front-rear direction is referred to as a pitch angle θp. As illustrated in FIG. 7B, the inclination angle of the shovel 100 in the left-right direction is referred to as a roll angle θr. The pitch angle θp and the roll angle θr are detected by the machine body inclination sensor S4.

The load weight calculating part 61 estimates the weight of soil based on, for example, a torque about a foot pin of the boom 4 during raising of the boom 4 after an end of Period 1 (see FIG. 6 from Period 1 at the head side of the center arrow to Period 2 at the start side of the center arrow). Here, there may be a case where the shovel 100 performs an operation of opening or closing the arm 5 (an operation of closing the arm 5 in the example of FIG. 6) at the same time as the operation of raising the boom 4. For example, if the arm 5 is open while a rotating operation is performed, the distance from the upper rotating body 3 to the bucket 6 is long (in other words, the rotation radius is large). Therefore, the rotational moment is also large. Hence, if the arm 5 is open while a rotating operation is performed, a large rotation driving force is needed, and a long time is needed for rotation. Hence, when dumping excavated soil onto the ground, the rotating operation after digging is typically performed while performing an operation of closing the arm 5 in order to reduce the rotational moment. On the other hand, when dumping excavated soil onto a dump truck, the rotating operation after digging is performed while further opening the arm 5 in order to avoid collision against the dump truck. In this way, also during the boom raising/rotating operation after digging, an operation of opening or closing the arm 5 may be performed depending on the content of the work. Hence, a moment accompanying the operation of opening or closing the arm 5 is also applied to the boom 4.

A torque, about a foot pin of the boom 4, which is due to the operation of opening or closing the arm 5 will be described with reference to FIG. 8. FIG. 8 is an exemplary view of an attachment of the shovel 100, and illustrates a relationship between the operation of opening or closing the arm 5 and the torque about the foot pin of the boom 4.

Here, the weight of soil loaded in the bucket 6 is designated as m. The distance between the connecting pin (the rotation center of the arm 5) connecting the boom 4 and the arm 5 and the soil's center of gravity is designated as r. The rotation angular velocity of the arm is designated as tea. The centrifugal force $F_a$ due to opening or closing of the arm 5 can be expressed by the following formula (1).

$$F_a = mr\omega_a^2 \tag{1}$$

The horizontal distance between the foot pin of the boom 4 and the connecting pin connecting the boom 4 and the arm 5 is designated as $r_x$, and the vertical distance between them is designated as $r_z$. The horizontal component of the centrifugal force $F_a$ is designated as $F_{ax}$, and the component of the centrifugal force $F_a$ in the perpendicular direction is designated as $F_{az}$. The torque $\tau_a$ that occurs about the foot pin of the boom 4 due to opening or closing of the arm 5 can be expressed by the following formula (2).

$$\tau_a = F_{ax} r_z + F_{az} r_x \tag{2}$$

As can be seen, when an operation of opening or closing the arm 5 is performed at the same time as a boom raising operation, the torque $\tau_a$ occurs about the foot pin of the boom 4 due to the opening or closing of the arm 5. Hence, in the method for estimating the weight of soil based on the torque about the foot pin during a boom raising operation, it is necessary to compensate for the weight of soil suitably.

Figure 9:
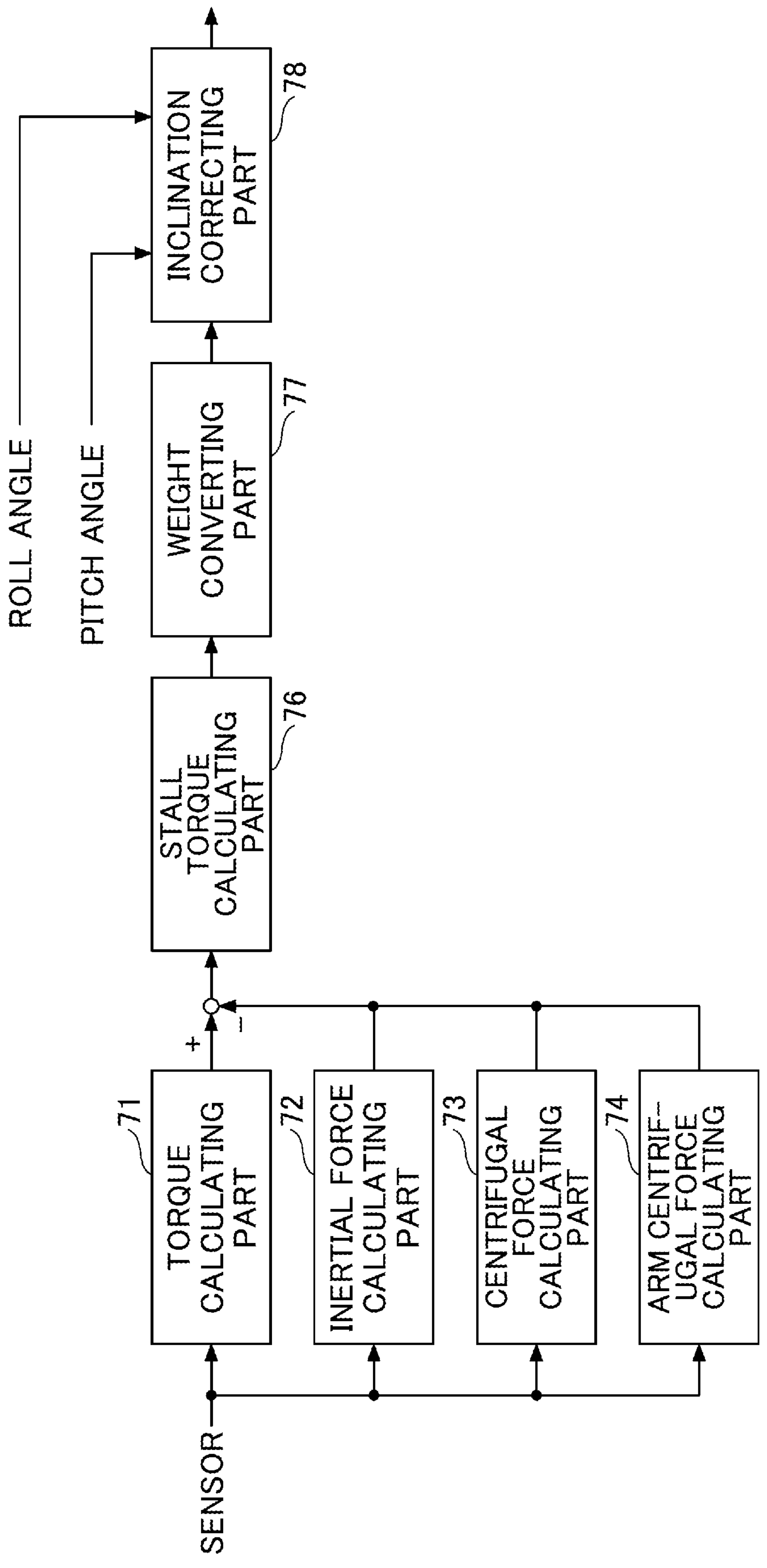
FIG. 9 is a block diagram illustrating a process of a load weight calculating part of a shovel according to one embodiment.

FIG. 9 is a block diagram illustrating a process of the load weight calculating part 61 of the shovel 100 according to the first embodiment. The load weight calculating part 61 includes a torque calculating part 71, an inertial force calculating part 72, a centrifugal force calculating part 73, an arm centrifugal force calculating part 74, a stall torque calculating part 76, a weight converting part 77, and an inclination correcting part 78.

The torque calculating part 71 calculates a torque (detection-target torque) about the foot pin of the boom 4. This torque is calculated based on the pressure (boom rod pressure sensor S7R and a boom bottom pressure sensor S7B) of the operating oil in the boom cylinder 7.

The inertial force calculating part 72 calculates a torque (inertial term torque), about the foot pin of the boom 4, which is due to an inertial force. The inertial term torque is calculated based on the angular acceleration about the foot pin of the boom 4 and the moment of inertia of the boom 4. The angular acceleration about the foot pin of the boom 4 and the moment of inertia are calculated based on outputs from attitude sensors.

The centrifugal force calculating part 73 calculates a torque (centrifugal term torque), about the foot pin of the boom 4, which is due to Coriolis and centrifugal forces. The centrifugal term torque is calculated based on the angular velocity about the foot pin of the boom 4 and the weight of the boom 4. The angular velocity about the foot pin of the boom 4 is calculated based on an output from an attitude sensor. The weight of the boom 4 is a known value.

The arm centrifugal force calculating part 74 calculates a torque (arm centrifugal force torque $\tau_a$), about the foot pin of the boom 4, which is due to a centrifugal force due to opening or closing of the arm 5. The arm centrifugal force torque $\tau_a$ is calculated based on an output from an attitude sensor, and the formula (1) and the formula (2) described above.

The stall torque calculating part 76 calculates a stall torque $\tau_W$, which is a torque about the foot pin of the boom 4 during a stall period of the attachment, based on the detection-target torque of the torque calculating part 71, the inertial term torque of the inertial force calculating part 72, the centrifugal term torque of the centrifugal force calculating part 73, and the arm centrifugal force torque of the arm centrifugal force calculating part 74. The formula expressing the torque about the foot pin of the boom 4 is given as the formula (3) below. $\tau$ in the left-hand side of the formula (3) represents the detection-target torque, the first term of the right-hand side represents the inertial term torque, the second term of the right-hand side represents the centrifugal term torque, the third term of the right-hand side represents the arm centrifugal force torque $\tau_a$, and the fourth term of the right-hand side represents the stall torque $\tau_W$.

$$\tau = J\ddot{\theta} + h(\dot{\theta},\theta)\dot{\theta} + \tau_a + \tau_W \quad (3)$$

As indicated by the formula (3), it is possible to calculate the stall torque $\tau_W$ by subtracting the inertial term torque, the centrifugal term torque, and the arm centrifugal force torque $\tau_a$ from the detection-target torque $\tau$. Hence, in the first embodiment, it is possible to offset any effects that may occur due to a pivoting operation about a pin of, for example, the boom. For example, when an operation of closing the arm 5 is performed at the same time as a boom raising operation, a torque $\tau_a$ occurs about the foot pin of the boom 4 in the boom raising direction as illustrated in FIG. 8 due to the operation of opening or closing the arm 5. Hence, the torque calculated by the torque calculating part 71 becomes smaller than when an operation of closing the arm 5 is not performed at the same time. The load weight calculating part 61 of the first embodiment can calculate the stall torque $\tau_W$ accurately, by offsetting the arm centrifugal force torque $\tau_a$ calculated by the arm centrifugal force calculating part 74.

The weight converting part 77 calculates the soil weight W1 based on the stall torque $\tau_W$ that is calculated by offsetting the arm centrifugal force torque $\tau_a$. It is possible to calculate the soil weight W1, by, for example, dividing a torque obtained by subtracting a torque applied when no soil is loaded in the bucket 6 from the stall torque $\tau_W$ by the horizontal distance from the foot pin of the boom 4 to the soil's center of gravity.

The inclination correcting part 78 performs correction based on the attitude of the shovel 100.

Here, the attitude of the attachment when the shovel 100 is on an inclined surface having a pitch angle θp and a detected boom angle is θ1 is the same as the attitude of the attachment when the shovel 100 is on a flat surface and a boom angle is (θ1+θp). That is, depending on the attitude of the shovel 100, a detected boom angle θ1 is corrected based on the pitch angle θp, to thereby compensate for the weight of soil.

When the shovel 100 is on an inclined surface having a roll angle θr, the thrust F on the boom cylinder 7 contains a vertical component and a horizontal component in a front view perspective of the shovel 100. Therefore, the thrust F on the boom cylinder 7 is corrected based on the roll angle θr. That is, depending on the attitude of the shovel 100, the vertical component is calculated as F cos θr, to thereby compensate for the weight of soil.

As described above, the shovel 100 according to the first embodiment can detect the weight of excavated soil. For example, the pressures on the actuators vary during an attachment operation such as a boom raising operation. In this regard, the shovel 100 according to the first embodiment can calculate the stall torque, by offsetting an inertial force, Coriolis, and about-pin centrifugal forces, which are due to the attachment operation, from a detected torque about the pin. Moreover, it is possible to calculate the weight of soil based on the calculated stall torque, and to improve the accuracy for detecting the weight of soil.

Moreover, when the surface contacted by the shovel 100 is not a flat surface, it is possible to compensate for the weight of soil based on the attitude (pitch angle and roll angle) of the shovel 100. Hence, it is possible to suitably detect the weight of soil, even when the surface contacted by the shovel is an inclined surface.

Moreover, it is possible to calculate the weight of soil loaded on a dump truck. Hence, it is possible to avoid overloading on the dump truck. For example, before getting out from the construction site onto a public road, the dump truck may be censored for its load, by, for example, a truck scale. When the load is greater than the maximum tolerable load, the dump truck needs to return to the location of the shovel 100 and reduce the loaded soil. This reduces the operational efficiency of the dump truck. Moreover, dump truck underloading increases the gross number of dump trucks needed to convey soil, and reduces the operational efficiency of dump trucks. In this regard, the shovel 100 according to the first embodiment can load soil onto dump trucks while inhibiting overloading, and can improve the operational efficiency of dump trucks.

The display device 40 displays the weight of soil in the bucket 6, and the maximum tolerable load, the sum load, and the remaining tolerable load of a dump truck. An operator in the shovel 100 can load soil onto the dump truck by performing operations while watching these displays.

An embodiment and other particulars of the shovel 100 have been described above. The present invention is not limited to the described embodiment and particulars, and various changes and modifications can be made within the scope of the spirit of the present invention described in the claims.

The load weight calculating part 61 has been described as including the arm centrifugal force calculating part 74 to offset a torque, about the foot of the boom 4, which is due to a centrifugal force due to opening or closing of the arm 5. However, this is a non-limiting example. The load weight calculating part 61 may include an arm inertial force calculating part (unillustrated) that calculates a torque, about the foot pin of the boom 4, which is due to acceleration or deceleration (inertial force) in opening or closing of the arm 5. The load weight calculating part 61 may offset a torque, about the foot pin of the boom 4, which is due to an inertial force due to opening or closing of the arm 5. Moreover, the load weight calculating part 61 may offset both a torque that is due to a centrifugal force due to opening or closing of the arm 5 and a torque that is due to an inertial force due to opening or closing of the arm 5.

The shovel (work machine) 100 according to the first embodiment includes the bucket 6 as the end attachment, and measures the weight of soil (conveyance object) conveyed by the bucket 6. Here, the method for measuring the weight of soil, which is applied to the shovel (work machine) 100 according to the first embodiment, may be applied to other work machines. That is, the method for measuring the weight of soil applied to the shovel 100 according to the first embodiment may be applied to work machines including end attachments such as a bucket, a lifting magnet, a grapple, a fork, and a harvester including a chainsaw, which are used to convey conveyance objects.

For example, the method may be applied to a work machine including a lifting magnet as the end attachment. For example, with the boom 4 lowered and the arm 5 opened, an iron scrap (conveyance object) that is located apart from the work machine is attached to the lifting magnet, and then the boom 4 is raised and the arm 5 is closed, to thereby shorten the distance from the rotation center of the upper rotating body 3 to the iron scrap (conveyance object) attached to the lifting magnet, for the subsequent rotating of the upper rotating body 3. Also in such a work in which an operation of raising the boom 4 and an operation of closing the arm 5 are performed at the same time, it is possible to calculate the weight of the conveyance object suitably.

[Soil Weight Calculating Method of Shovel 100 According to Second Embodiment]

Figure 10:
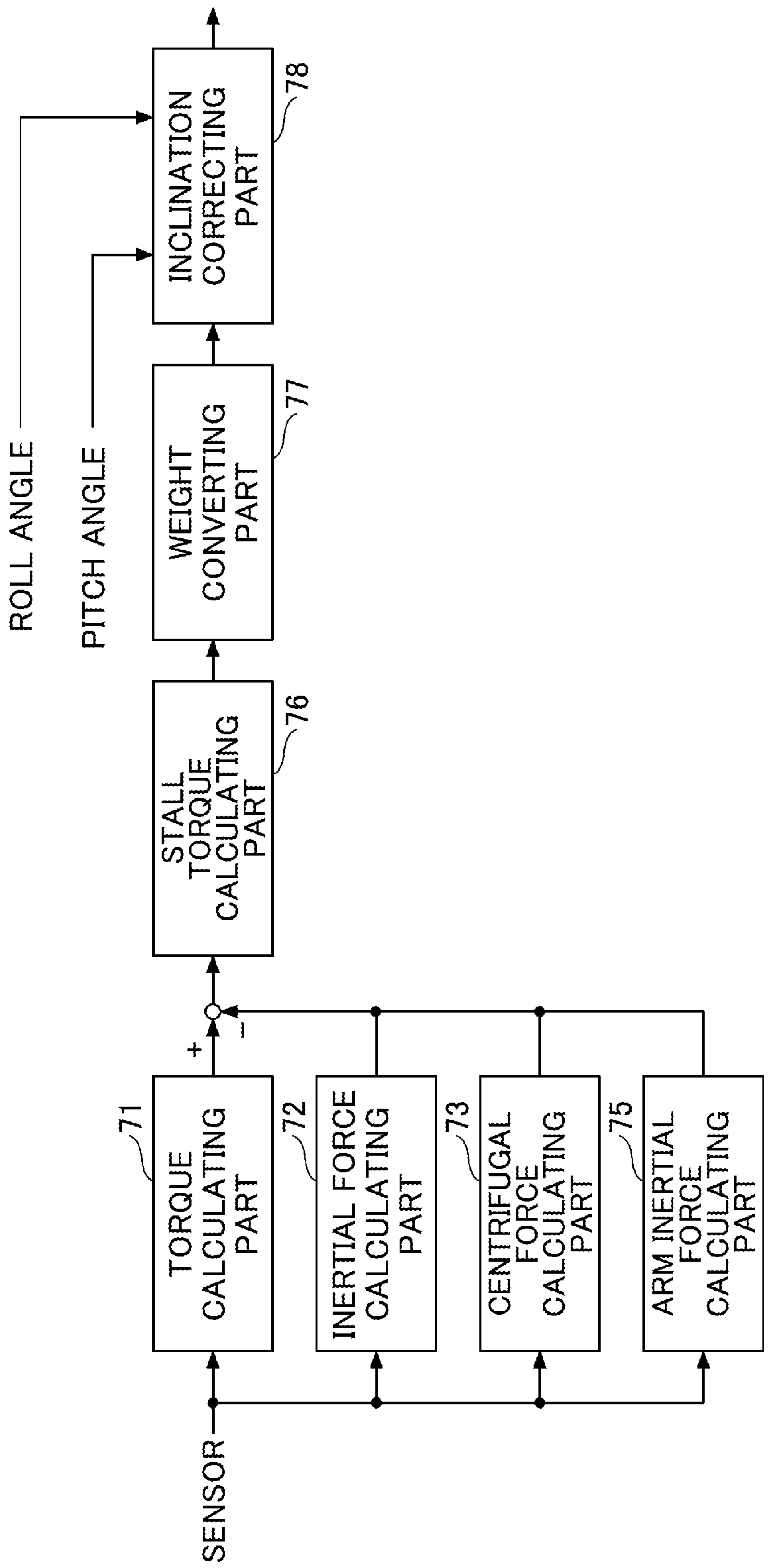
FIG. 10 is a block diagram illustrating a process of a load weight calculating part of a shovel according to another embodiment.

A load weight calculating part 61 of a shovel 100 according to a second embodiment will be described with reference to FIG. 10. FIG. 10 is a block diagram illustrating a process of the load weight calculating part 61 of the shovel 100 according to the second embodiment. The load weight calculating part 61 includes a torque calculating part 71, an inertial force calculating part 72, a centrifugal force calculating part 73, an arm inertial force calculating part 75, a stall torque calculating part 76, a weight converting part 77, and an inclination correcting part 78.

The torque calculating part 71 calculates a torque (detection-target torque) about the foot pin of the boom 4. The inertial force calculating part 72 calculates a torque (inertial term torque), about the foot pin of the boom 4, which is due to an inertial force. The centrifugal force calculating part 73 calculates a torque (centrifugal term torque), about the foot pin of the boom 4, which is due to Coriolis and centrifugal forces. The torque calculating part 71, the inertial force calculating part 72, and the centrifugal force calculating part 73 are the same as the torque calculating part 71, the inertial force calculating part 72, and the centrifugal force calculating part 73 of the load weight calculating part 61 illustrated in FIG. 9, and overlapping descriptions about them will be skipped.

The arm inertial force calculating part 75 calculates a torque (arm inertial force torque), about the foot pin of the boom 4, which is due to acceleration or deceleration (inertial force) in opening or closing of the arm 5. The arm inertial force torque is calculated based on an output from an attitude sensor.

The stall torque calculating part 76 calculates a stall torque $\tau_W$, which is a torque about the foot pin of the boom 4 during a stall period of the attachment, based on the detection-target torque of the torque calculating part 71, the inertial term torque of the inertial force calculating part 72, the centrifugal term torque of the centrifugal force calculating part 73, and the arm inertial force torque of the arm inertial force calculating part 75. The formula expressing the torque about the foot pin of the boom 4 is given as the formula (3). $\tau$ in the left-hand side of the formula (3) represents the detection-target torque, the first term of the right-hand side represents the inertial term torque, the second term of the right-hand side represents the centrifugal term torque, the third term of the right-hand side represents the arm inertial force torque $\tau_a$, and the fourth term of the right-hand side represents the stall torque $\tau_W$.

As indicated by the formula (3), it is possible to calculate the stall torque $\tau_W$ by subtracting the inertial term torque, the centrifugal term torque, and the arm inertial force torque $\tau_a$ from the detection-target torque $\tau$. Hence, in the second embodiment, it is possible to offset any effects that may occur due to a pivoting operation about a pin of, for example, the boom. For example, when an operation of closing the arm 5 is performed at the same time as a boom raising operation as illustrated in FIG. 8, an arm inertial force torque $\tau_a$ occurs about the foot pin of the boom 4 due to the operation of opening or closing the arm 5. Hence, the torque calculated by the torque calculating part 71 is different from when an operation of closing the arm 5 is not performed at the same time. Particularly, when the soil conveyed by the bucket 6 is heavy, the inertial force has a large effect on moving the soil from a location remote from the shovel 100 to a location close to the shovel 100. The load weight calculating part 61 of the second embodiment can calculate the stall torque $\tau_W$ accurately, by offsetting the arm inertial force torque $\tau_a$ calculated by the arm inertial force calculating part 75.

The weight converting part 77 calculates the soil weight W1 based on the stall torque $\tau_W$ that is calculated by offsetting the arm inertial force torque $\tau_a$. The inclination correcting part 78 performs correction based on the attitude of the shovel 100. The weight converting part 77 and the inclination correcting part 78 are the same as the weight converting part 77 and the inclination correcting part 78 illustrated in FIG. 9, and overlapping descriptions about them will be skipped.

In the way described above, the shovel 100 according to the second embodiment can detect the weight of excavated soil. For example, the pressures on the actuators vary during an attachment operation such as a boom raising operation. In this regard, the shovel 100 according to the second embodiment can calculate the stall torque, by offsetting an inertial force, Coriolis, and about-pin centrifugal forces, which are due to the attachment operation, from a detected torque about the pin. Moreover, it is possible to calculate the weight of soil based on the calculated stall torque, and to improve the accuracy for detecting the weight of soil.

Moreover, when the surface contacted by the shovel 100 is not a flat surface, it is possible to compensate for the weight of soil based on the attitude (pitch angle and roll angle) of the shovel 100. Hence, it is possible to suitably detect the weight of soil, even when the surface contacted by the shovel is an inclined surface.

Moreover, it is possible to calculate the weight of soil loaded on a dump truck. Hence, it is possible to avoid overloading on the dump truck. For example, before getting out from the construction site onto a public road, the dump truck may be censored for its load, by, for example, a truck scale. When the load is greater than the maximum tolerable load, the dump truck needs to return to the location of the shovel 100 and reduce the loaded soil. This reduces the operational efficiency of the dump truck. Moreover, dump truck underloading increases the gross number of dump trucks needed to convey soil, and reduces the operational efficiency of dump trucks. In this regard, the shovel 100 according to the second embodiment can load soil onto dump trucks while inhibiting overloading, and can improve the operational efficiency of dump trucks.

The display device 40 displays the weight of soil in the bucket 6, and the maximum tolerable load, the sum load, and the remaining tolerable load of a dump truck. The operator in the shovel 100 can load soil onto the dump truck by performing operations while watching these displays.

An embodiment and other particulars of the shovel 100 have been described above. The present invention is not limited to the described embodiment and particulars, and various changes and modifications can be made within the scope of the spirit of the present invention described in the claims.

The load weight calculating part 61 illustrated in FIG. 9 has been described as one that offsets a torque that is due to a centrifugal force due to opening or closing of the arm 5, and the load weight calculating part 61 illustrated in FIG. 10 has been described as one that offsets a torque that is due to an inertial force due to opening or closing of the arm 5. However, these are non-limiting examples. The load weight calculating part 61 may offset either or both of a torque that is due to a centrifugal force due to opening or closing of the arm 5 and a torque that is due to an inertial force due to opening or closing of the arm 5.

That is, it is optional to offset both of a torque that is due to a centrifugal force due to opening or closing of the arm 5 and a torque that is due to an inertial force due to opening or closing of the arm 5. In such a case, the load weight calculating part 61 may include a torque calculating part 71, an inertial force calculating part 72, a centrifugal force calculating part 73, an arm centrifugal force calculating part 74, an arm inertial force calculating part 75, a stall torque calculating part 76, a weight converting part 77, and an inclination correcting part 78. In such a case, the stall torque calculating part 76 calculates a stall torque $\tau_W$, which is a torque about the foot pin of the boom 4 during a stall period of the attachment, based on the detection-target torque of the torque calculating part 71, the inertial term torque of the inertial force calculating part 72, the centrifugal term torque of the centrifugal force calculating part 73, the arm centrifugal force torque of the arm centrifugal force calculating part 74, and the arm inertial force torque of the arm inertial force calculating part 75. Moreover, Ta in the formula (3) given above may be a combined torque of the arm centrifugal force torque and the arm inertial force torque. This can further improve the accuracy for detecting the weight of soil.

The shovel (work machine) 100 according to the second embodiment includes the bucket 6 as the end attachment, and measures the weight of soil (conveyance object) conveyed by the bucket 6. Here, the method for measuring the weight of soil, which is applied to the shovel (work machine) 100 according to the second embodiment, may be applied to other work machines. That is, the method for measuring the weight of soil applied to the shovel 100 according to the second embodiment may be applied to work machines including end attachments such as a bucket, a lifting magnet, a grapple, a fork, and a harvester including a chainsaw, which are used to convey conveyance objects.

For example, the method may be applied to a work machine including a lifting magnet as the end attachment. For example, with the boom 4 lowered and the arm 5 opened, an iron scrap (conveyance object) that is located apart from the work machine is attached by the lifting magnet, and then the boom 4 is raised and the arm 5 is closed, to thereby shorten the distance from the rotation center of the upper rotating body 3 to the iron scrap (conveyance object) attached by the lifting magnet, for the subsequent rotating of the upper rotating body 3. Also in such a work in which an operation of raising the boom 4 and an operation of closing the arm 5 are performed at the same time, it is possible to calculate the weight of the conveyance object suitably.

Moreover, when the end attachment such as the lifting magnet and the conveyance object are heavy objects, the inertial force on the arm has a large effect on moving the conveyance object remote from the work machine to a location close to the work machine. Even in such a work, it is possible to calculate the weight of the conveyance object suitably.

[Soil Weight Calculating Method of Shovel 100 According to Third Embodiment]

Next, the method by which a load weight calculating part 61 of a shovel 100 according to a third embodiment calculates the weight of soil (load) in the bucket 6 will be described with reference to FIG. 7A, FIG. 7B, FIG. 11A, FIG. 11B, and FIG. 12.

FIG. 7A and FIG. 7B are views illustrating parameters of the shovel 100. FIG. 7A is a side view and FIG. 7B is a front view.

As illustrated in FIG. 7A, the center of gravity of soil (load) loaded in the bucket 6 is referred to as soil's center of gravity G1. The position of the soil's center of gravity G1 with respect to the bucket 6 is, for example, previously ascertained by experiments and stored in the controller 30. The weight of the soil loaded in the bucket 6 is referred to as soil weight W1. The angle formed by a straight line connecting the fulcra on both ends of the boom 4 with respect to the rotation plane of the upper rotating body 3 is referred to as a boom angle θ1. The boom angle θ1 is detected by the boom angle sensor S1. The angle formed by a straight line connecting the fulcra on both ends of the arm 5 with respect to the straight line connecting the fulcra on both ends of the boom 4 is referred to as an arm angle θ2. The arm angle θ2 is detected by the arm angle sensor S2. An angle formed by a straight line connecting the fulcrum of the bucket 6 and the soil's center of gravity G1 with respect to the straight line connecting the fulcra on both ends of the arm is referred to as a bucket angle θ3. The bucket angle θ3 is detected by the bucket angle sensor S3. The inclination angle of the shovel 100 in the front-rear direction is referred to as a pitch angle θp. As illustrated in FIG. 7B, the inclination angle of the shovel 100 in the left-right direction is referred to as a roll angle θr. The pitch angle θp and the roll angle θr are detected by the machine body inclination sensor S4.

The load weight calculating part 61 estimates the weight of soil based on, for example, a torque about the foot pin of the boom 4 during raising of the boom 4 after an end of Period 1 (see FIG. 6 from Period 1 at the head side of the center arrow to Period 2 at the start side of the center arrow). Here, there may be a case where the shovel 100 performs an operation of opening or closing the arm 5 (an operation of closing the arm 5 in the example of FIG. 6) at the same time as the operation of raising the boom 4. For example, if the arm 5 is open while a rotating operation is performed, the distance from the upper rotating body 3 to the bucket 6 is long (in other words, the rotation radius is large). Therefore, the rotational moment is also large. Hence, if the arm 5 is open while a rotating operation is performed, a large rotation driving force is needed, and a long time is needed for rotation. Hence, when dumping excavated soil onto the ground, the rotating operation after digging is typically performed while performing an operation of closing the arm 5 in order to reduce the rotational moment. On the other hand, when dumping excavated soil onto a dump truck, the rotating operation after digging is performed while further opening the arm 5 in order to avoid collision against the dump truck. In this way, also during the boom raising/rotating operation after digging, an operation of opening or closing the arm 5 may be performed depending on the content of the work. Hence, a moment accompanying the operation of opening or closing the arm 5 is also applied to the boom 4.

Figure 11A:
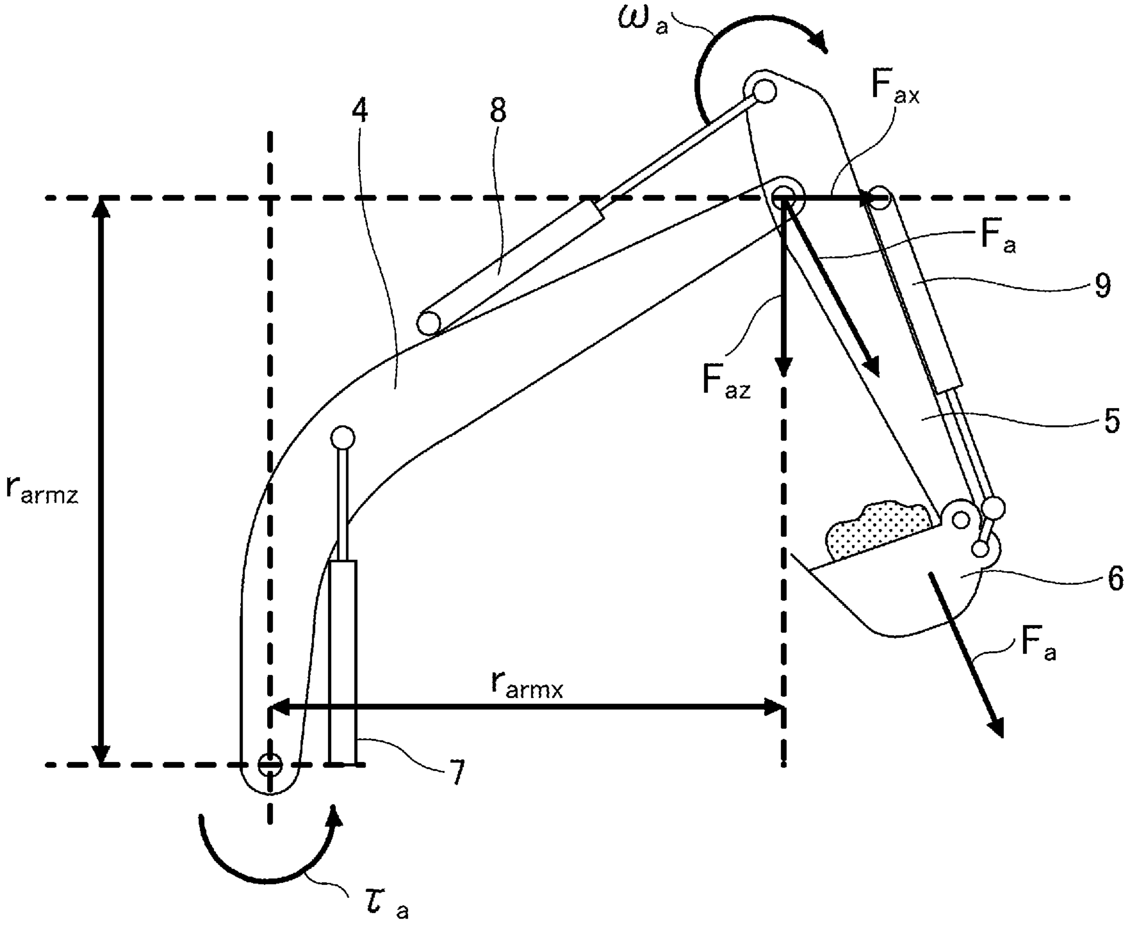
FIG. 11A is an exemplary view of an attachment of a shovel, and illustrating a relationship between an arm opening/closing operation, a bucket opening/closing operation, and a torque about a foot pin of a boom.
Figure 11B:
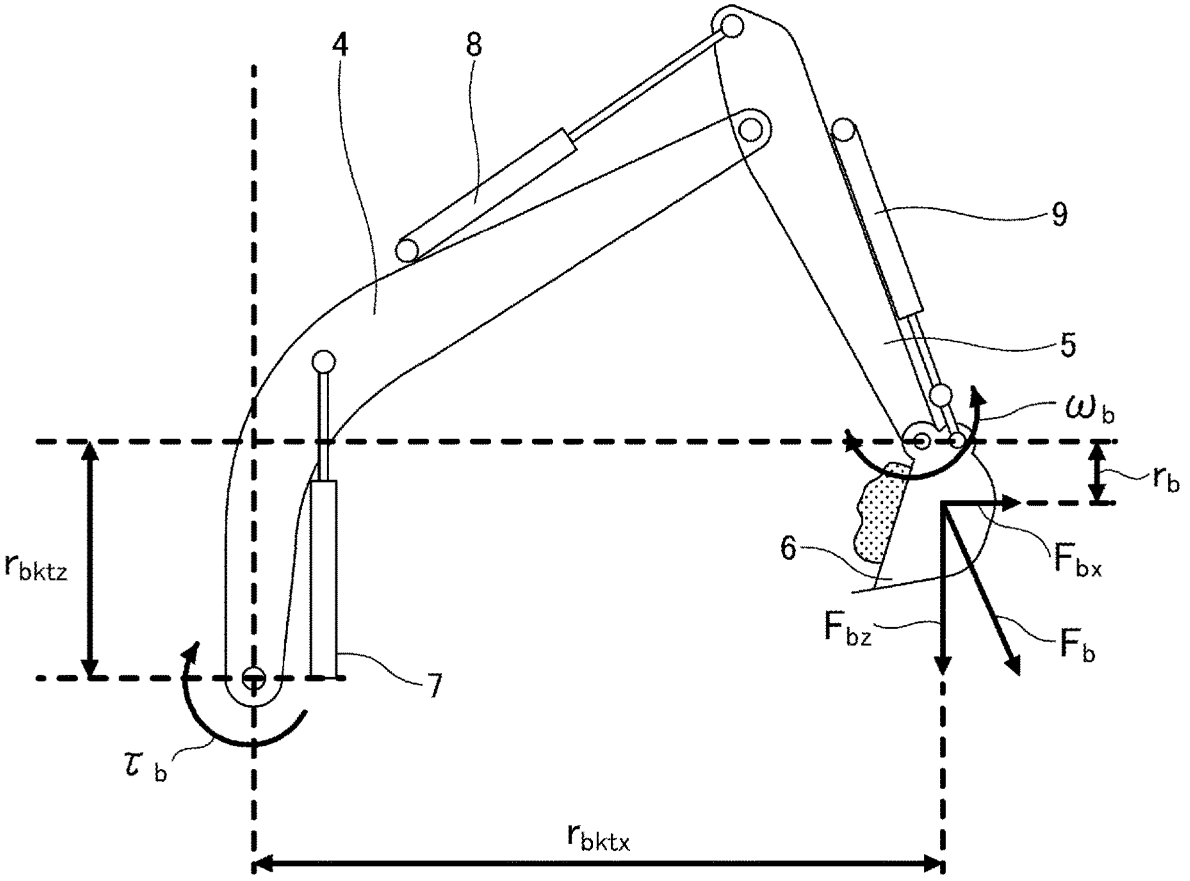
FIG. 11B is an exemplary view of an attachment of a shovel, and illustrating a relationship between an arm opening/closing operation, a bucket opening/closing operation, and a torque about a foot pin of a boom.

A torque, about the foot pin of the boom 4, which is due to the operations of opening or closing the arm 5 and the bucket 6 will be described with reference to FIG. 11A and FIG. 11B. FIG. 11A is an exemplary view of the attachment of the shovel 100, and illustrates a relationship between the operation of opening or closing the arm 5 and the torque about the foot pin of the boom 4. FIG. 11B is an exemplary view of the attachment of the shovel 100, and illustrates a relationship between the operation of opening or closing the bucket 6 and the torque about the foot pin of the boom 4.

First, the operation of opening or closing the arm 5 will be described with reference to FIG. 11A.

Here, the weight of soil loaded in the bucket 6 is designated as m. The distance between the connecting pin (the rotation center of the arm 5) connecting the boom 4 and the arm 5 and the soil's center of gravity is designated as $r_a$. The rotation angular velocity of the arm is designated as $\omega_a$. A centrifugal force $F_a$ due to opening or closing of the arm 5 can be expressed by the following formula (4).

$$F_a=mr_a\omega_a^2 \tag{4}$$

The soil weight m is a provisional value calculated based on the thrust on the boom cylinder 7. Specifically, first, the torque calculating part 71 (see FIG. 12) calculates a detection-target torque τ about the foot pin of the boom 4 based on the thrust on the boom cylinder 7 (the thrust being a value calculated from values measured by the boom rod pressure sensor S7R and the boom bottom pressure sensor S7B). A stall torque calculating part 76 (see FIG. 12) calculates a stall torque $\tau_W$ based on the detection-target torque τ, an inertial force team J calculated by an inertial force calculating part 72 (see FIG. 12), and a centrifugal force term h calculated by a centrifugal force calculating part 73 (see FIG. 12), and a formula (8) described below. Here, the stall torque calculating part 76 calculates the stall torque $\tau_W$ without using an arm centrifugal force torque $\tau_a$ and a bucket centrifugal force torque $\tau_b$. Hence, the soil weight m is a provisional value calculated based on the thrust on the boom cylinder 7. θ represents attachment angles, and includes a boom angle, an arm angle, and a bucket angle.

The horizontal distance between the foot pin of the boom 4 and the connecting pin connecting the boom 4 and the arm 5 is designated as $r_{armx}$, and the distance between them in the perpendicular direction is designated as $r_{armz}$. The horizontal component of a centrifugal force $F_a$ is designated as $F_{ax}$, and the component of the centrifugal force $F_a$ in the perpendicular direction is designated as $F_{az}$. The torque $\tau_a$ that occurs about the foot pin of the boom 4 due to opening or closing of the arm 5 can be expressed by the following formula (5).

$$\tau_a=F_{ax}r_{armz}+F_{az}r_{armx} \tag{5}$$

As can be seen, when an operation of opening or closing the arm 5 is performed at the same time as a boom raising operation, the torque $\tau_a$ occurs about the foot pin of the boom 4 due to the opening or closing of the arm 5. Hence, in the method for estimating the weight of soil based on the torque about the foot pin during a boom raising operation, it is necessary to suitably compensate for the weight of soil.

Next, the operation of opening or closing the bucket 6 will be described with reference to FIG. 11B.

Here, the weight of soil loaded in the bucket 6 is designated as m. The distance between the connecting pin (the rotation center of the bucket 6) connecting the arm 5 and the bucket 6 and the soil's center of gravity is designated as $r_b$. The rotation angular velocity of the bucket 6 is designated as cob. A centrifugal force $F_b$ due to opening or closing of the bucket 6 can be expressed by the following formula (6).

$$F_b=mr_b\omega_b^2 \tag{6}$$

The horizontal distance between the foot pin of the boom 4 and the connecting pin connecting the arm 5 and the bucket 6 is designated as $r_{bktx}$, and the distance between them in the perpendicular direction is designated as $r_{bktz}$. The horizontal component of the centrifugal force $F_b$ is designated as $F_{bx}$, and the component of the centrifugal force $F_b$ in the perpendicular direction is designated as $F_{bz}$. The torque $\tau_b$ that occurs about the foot pin of the boom 4 due to opening or closing of the bucket 6 can be expressed by the following formula (7).

$$\tau_b=F_{bx}r_{bktz}+F_{bz}r_{bktx} \tag{7}$$

As can be seen, when an operation of opening or closing the bucket 6 is performed at the same time as a boom raising operation, the torque $\tau_b$ occurs about the foot pin of the boom 4 due to the opening or closing of the bucket 6. Hence, in the method for estimating the weight of soil based on the torque about the foot pin during a boom raising operation, it is necessary to suitably compensate for the weight of soil.

Figure 12:
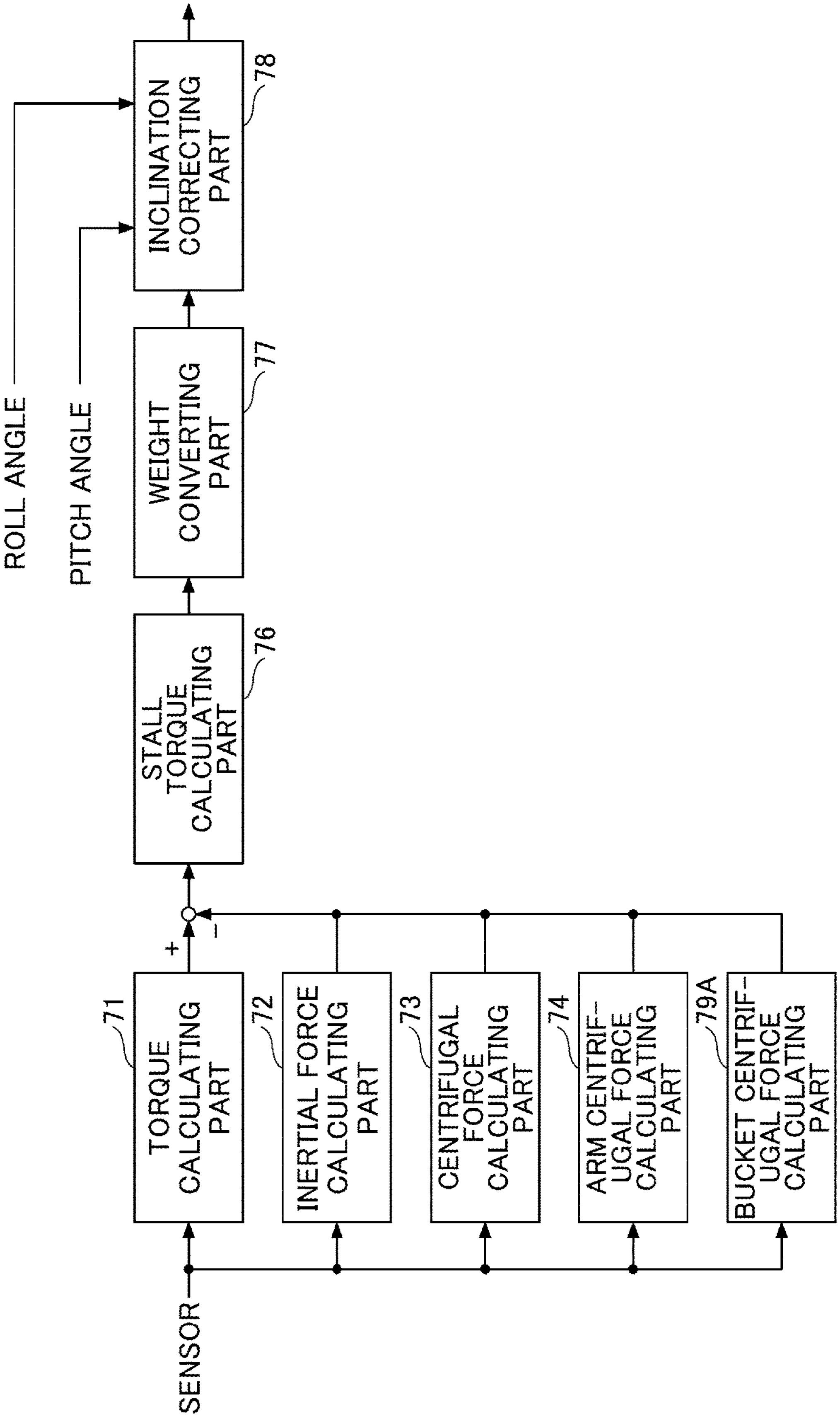
FIG. 12 is a block diagram illustrating a process of a load weight calculating part of a shovel according to further another embodiment.

FIG. 12 is a block diagram illustrating a process of the load weight calculating part 61 of the shovel 100 according to the third embodiment. The load weight calculating part 61 includes a torque calculating part 71, an inertial force calculating part 72, a centrifugal force calculating part 73, an arm centrifugal force calculating part 74, a bucket centrifugal force calculating part 79A, a stall torque calculating part 76, a weight converting part 77, and an inclination correcting part 78.

The torque calculating part 71 calculates a torque (detection-target torque τ) about the foot pin of the boom 4. The detection-target torque τ is calculated based on the pressure (boom rod pressure sensor S7R and a boom bottom pressure sensor S7B) of the operating oil in the boom cylinder 7.

The inertial force calculating part 72 calculates a torque (inertial term torque), about the foot pin of the boom 4, which is due to an inertial force. The inertial term torque is calculated based on the angular acceleration about the foot pin of the boom 4 and the moment of inertia on the boom 4. The angular acceleration about the foot pin of the boom 4 and the moment of inertia are calculated based on outputs from attitude sensors.

The centrifugal force calculating part 73 calculates a torque (centrifugal term torque), about the foot pin of the boom 4, which is due to Coriolis and centrifugal forces. The centrifugal term torque is calculated based on the angular velocity about the foot pin of the boom 4 and the weight of the boom 4. The angular velocity about the foot pin of the boom 4 is calculated based on an output from an attitude sensor. The weight of the boom 4 is a known value.

The arm centrifugal force calculating part 74 calculates the torque (arm centrifugal force torque $\tau_a$), about the foot pin of the boom 4, which is due to the centrifugal force due to opening or closing of the arm 5. The arm centrifugal force torque $\tau_a$ is calculated based on an output from an attitude sensor, and the formula (4) and the formula (5) described above.

The bucket centrifugal force calculating part 79A calculates the torque (bucket centrifugal force torque $\tau_b$), about the foot pin of the boom 4, which is due to the centrifugal force due to opening or closing of the bucket 6. The bucket centrifugal force torque $\tau_b$ is calculated based on an output from an attitude sensor, and the formula (6) and the formula (7) described above.

The stall torque calculating part 76 calculates a stall torque $\tau_W$, which is a torque about the foot pin of the boom 4 during a stall period of the attachment, based on the detection-target torque $\tau$ of the torque calculating part 71, the inertial term torque of the inertial force calculating part 72, the centrifugal term torque of the centrifugal force calculating part 73, the arm centrifugal force torque of the arm centrifugal force calculating part 74, and the bucket centrifugal force torque of the bucket centrifugal force calculating part 79A. The formula expressing the torque about the foot pin of the boom 4 is given as the formula (8) below. $\tau$ in the left-hand side of the formula (8) represents the detection-target torque, the first term of the right-hand side represents the inertial term torque, the second term of the right-hand side represents the centrifugal term torque, the third term of the right-hand side represents the arm centrifugal force torque $\tau_a$, the fourth term of the right-hand side represents the bucket centrifugal force torque $\tau_b$, and the fifth term of the right-hand side represents the stall torque $\tau_W$.

$$\tau = J\ddot{\theta} + (\dot{\theta}, \theta)\dot{\theta} + \tau_a + \tau_b + \tau_W \quad (8)$$

As indicated by the formula (8), it is possible to calculate the stall torque $\tau_W$ by subtracting the inertial term torque, the centrifugal term torque, the arm centrifugal force torque $\tau_a$, and the bucket centrifugal force torque $\tau_b$ from the detection-target torque $\tau$. Hence, in the third embodiment, it is possible to offset any effects that may occur due to a pivoting operation about a pin of, for example, the boom. For example, when an operation of closing the arm 5 is performed at the same time as a boom raising operation, the torque $\tau_a$ occurs about the foot pin of the boom 4 in the boom raising direction as illustrated in FIG. 11A due to the operation of opening or closing the arm 5. Hence, the torque calculated by the torque calculating part 71 becomes smaller than when an operation of closing the arm 5 is not performed at the same time. The load weight calculating part 61 of the third embodiment can calculate the stall torque $\tau_W$ accurately, by offsetting the arm centrifugal force torque $\tau_a$ calculated by the arm centrifugal force calculating part 74. When an operation of closing the bucket 6 is performed at the same time as a boom raising operation, the torque $\tau_b$ occurs about the foot pin of the boom 4 in the boom lowering direction as illustrated in FIG. 11B due to the operation of opening or closing the bucket 6. Hence, the torque calculated by the torque calculating part 71 becomes greater than when an operation of closing the bucket 6 is not performed at the same time. The load weight calculating part 61 of the third embodiment can calculate the stall torque $\tau_W$ accurately, by offsetting the bucket centrifugal force torque $\tau_b$ calculated by the bucket centrifugal force calculating part 79A.

The weight converting part 77 calculates the soil weight W1 based on the stall torque $\tau_W$ that is calculated by offsetting the arm centrifugal force torque $\tau_a$ and the bucket centrifugal force torque $\tau_b$. It is possible to calculate the soil weight W1, by, for example, dividing a torque obtained by subtracting a torque present when no soil is loaded in the bucket 6 from the stall torque $\tau_W$ by the horizontal distance from the foot pin of the boom 4 to the soil's center of gravity.

The inclination correcting part 78 performs correction based on the attitude of the shovel 100.

Here, the attitude of the attachment when the shovel 100 is on an inclined surface having a pitch angle $\theta p$ and a detected boom angle is $\theta$1 is the same as the attitude of the attachment when the shovel 100 is on a flat surface and a boom angle is ($\theta$1+$\theta p$). That is, depending on the attitude of the shovel 100, a detected boom angle $\theta$1 is corrected based on the pitch angle $\theta p$, to thereby compensate for the weight of soil.

When the shovel 100 is on an inclined surface having a roll angle $\theta r$, the thrust F on the boom cylinder 7 contains a vertical component and a horizontal component in a front view perspective of the shovel 100. Therefore, the thrust F on the boom cylinder 7 is corrected based on the roll angle $\theta r$. That is, depending on the attitude of the shovel 100, the vertical component is calculated as F cos $\theta r$, to thereby compensate for the weight of soil.

In the way described above, the shovel 100 according to the third embodiment can detect the weight of excavated soil. For example, the pressures on the actuators vary during an attachment operation such as a boom raising operation. In this regard, the shovel 100 according to the third embodiment can calculate the stall torque, by offsetting an inertial force, Coriolis, and about-pin centrifugal forces, which are due to the attachment operation, from a detected torque about the pin. Moreover, it is possible to calculate the weight of soil based on the calculated stall torque, and to improve the accuracy for detecting the weight of soil.

Moreover, when the surface contacted by the shovel 100 is not a flat surface, it is possible to compensate for the weight of soil based on the attitude (pitch angle and roll angle) of the shovel 100. Hence, it is possible to suitably detect the weight of soil, even when the surface contacted by the shovel is an inclined surface.

Moreover, it is possible to calculate the weight of soil loaded on a dump truck. Hence, it is possible to avoid overloading on the dump truck. For example, before getting out from the construction site onto a public road, the dump truck may be censored for its load, by, for example, a truck scale. When the load is greater than the maximum tolerable load, the dump truck needs to return to the location of the shovel 100 and reduce the loaded soil. This reduces the operational efficiency of the dump truck. Moreover, dump truck underloading increases the gross number of dump trucks needed to convey soil, and reduces the operational efficiency of dump trucks. In this regard, the shovel 100 according to the third embodiment can load soil onto dump trucks while inhibiting overloading, and can improve the operational efficiency of dump trucks.

The display device 40 displays the weight of soil in the bucket 6, and the maximum tolerable load, the sum load, and the remaining tolerable load of a dump truck. The operator in the shovel 100 can load soil onto the dump truck by performing operations while watching these displays.

The load weight calculating part 61 has been described as including the arm centrifugal force calculating part 74 to calculate a torque (arm centrifugal force torque $\tau_a$), about the foot pin of the boom 4, which is due to a centrifugal force due to opening or closing of the arm 5 by the arm cylinder 8 and offset the arm centrifugal force torque $\tau_a$ from the stall torque $\tau_W$. However, this is a non-limiting example. The load weight calculating part 61 may include an arm inertial force calculating part (unillustrated) that calculates a torque (arm inertial force torque), about the foot pin of the boom 4, which is due to acceleration or deceleration (inertial force) in opening or closing of the arm 5. The load weight calculating part 61 may offset the arm inertial force torque from the stall torque $\tau_W$. Moreover, the load weight calculating part 61 may offset both the arm centrifugal force torque $\tau_a$ and the arm inertial force torque from the stall torque $\tau_W$.

The load weight calculating part 61 has been described as including the bucket centrifugal force calculating part 79A to calculate a torque (bucket centrifugal force torque $\tau_b$), about the foot pin of the boom 4, which is due to a centrifugal force due to opening or closing of the bucket 6 by the bucket cylinder 9 and offset the bucket centrifugal force torque $\tau_b$ from the stall torque $\tau_W$. However, this is a non-limiting example. The load weight calculating part 61 may include a bucket inertial force calculating part (unillustrated) that calculates a torque (bucket inertial force torque), about the foot pin of the boom 4, which is due to acceleration or deceleration (inertial force) in opening or closing of the bucket 6. The load weight calculating part 61 may offset the bucket inertial force torque from the stall torque $\tau_W$. Moreover, the load weight calculating part 61 may offset both the bucket centrifugal force torque $\tau_b$ and the bucket inertial force torque from the stall torque $\tau_W$.

[Outline of Work Machine According to Fourth Embodiment]

First, the outline of a work machine 100A according to a fourth embodiment will be described with reference to FIG. 13.

Figure 13:
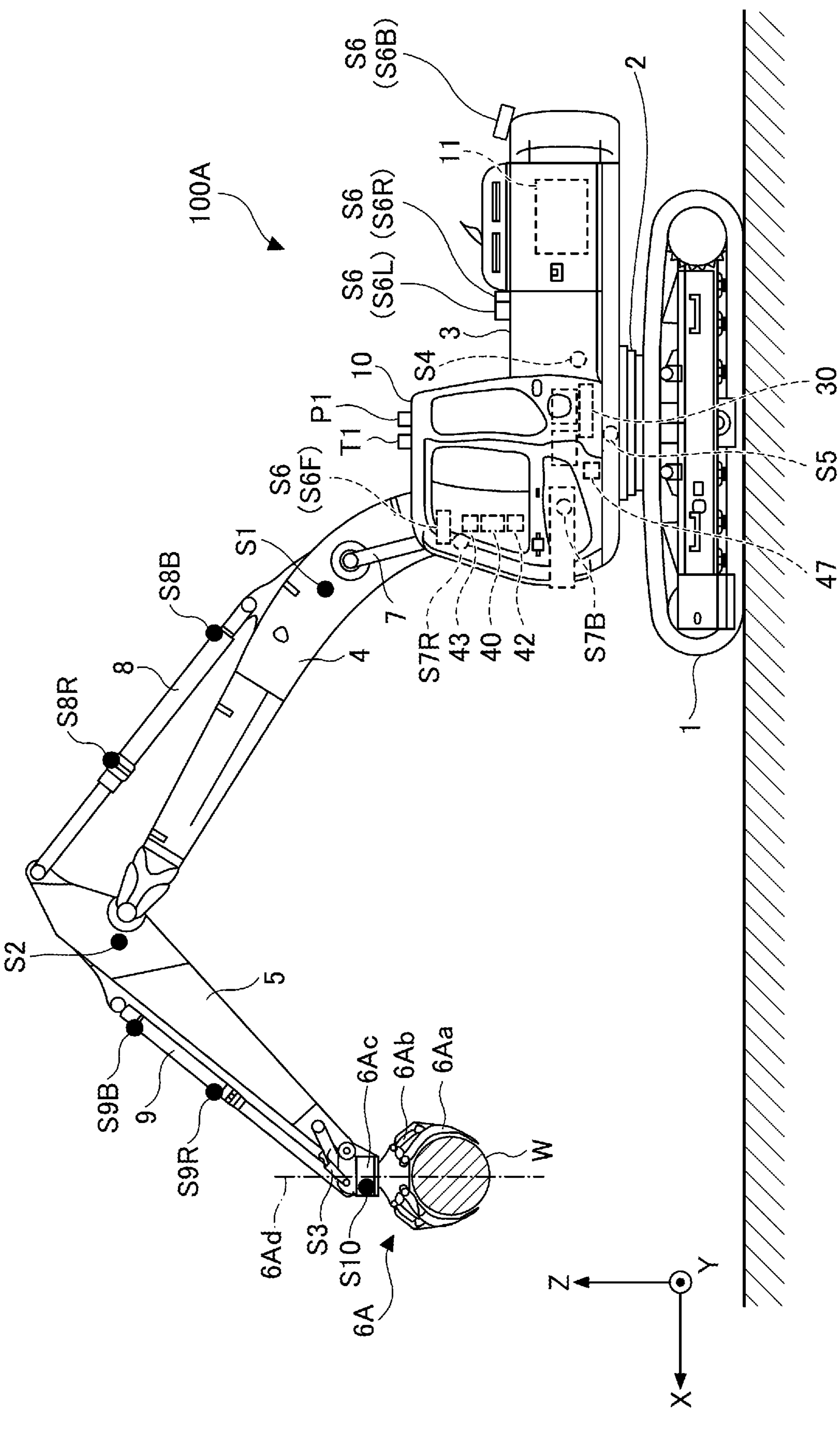
FIG. 13 is a side view of a work machine according to further another embodiment.

FIG. 13 is a side view of the work machine 100A according to the fourth embodiment.

The work machine 100A according to the fourth embodiment is different from the shovel (work machine) 100 according to the first to third embodiments illustrated in FIG. 1 in that the end attachment is changed from the bucket 6 to a grapple 6A. The other configurations are the same, and overlapping descriptions about the same configurations will be skipped. The work machine 100A according to the fourth embodiment grapples a lengthy conveyance object W such as a round timber (timber) using a grapple 6A, and conveys the conveyance object W. The conveyance object W conveyed by the work machine 100A is loaded onto, for example, a dump truck (unillustrated).

A bucket cylinder (end attachment cylinder) 9 is used to pivot (tilt) the grapple 6A. The grapple 6A includes an openable/closable claw (grappling portion) 6Aa, a grapple opening/closing cylinder 6Ab that opens or closes the claw 6Aa, and a rotation hydraulic motor 6Ac that rotates the claw 6Aa about a rotation axis 6Ad.

A control valve 17 (see FIG. 2) includes a control valve (unillustrated) corresponding to the grapple opening/closing cylinder 6Ab and a control valve (unillustrated) corresponding to the rotation hydraulic motor 6Ac, and can supply an operating oil supplied from a main pump 14 to the grapple opening/closing cylinder 6Ab and the rotation hydraulic motor 6Ac, which are hydraulic actuators, in accordance with conditions of operations given to an operation device 26.

A grapple rotation angle sensor S10 is attached on the grapple 6A, and detects the rotation angle of the grappling portion of the grapple 6A about the rotation axis 6Ad. The grapple rotation angle sensor S10 may include, for example, a gyro sensor, a resolver, and a rotary encoder. A detection signal from the grapple rotation angle sensor S10 matching the rotation angle of the grapple 6A loads into a controller 30.

Figure 14A:
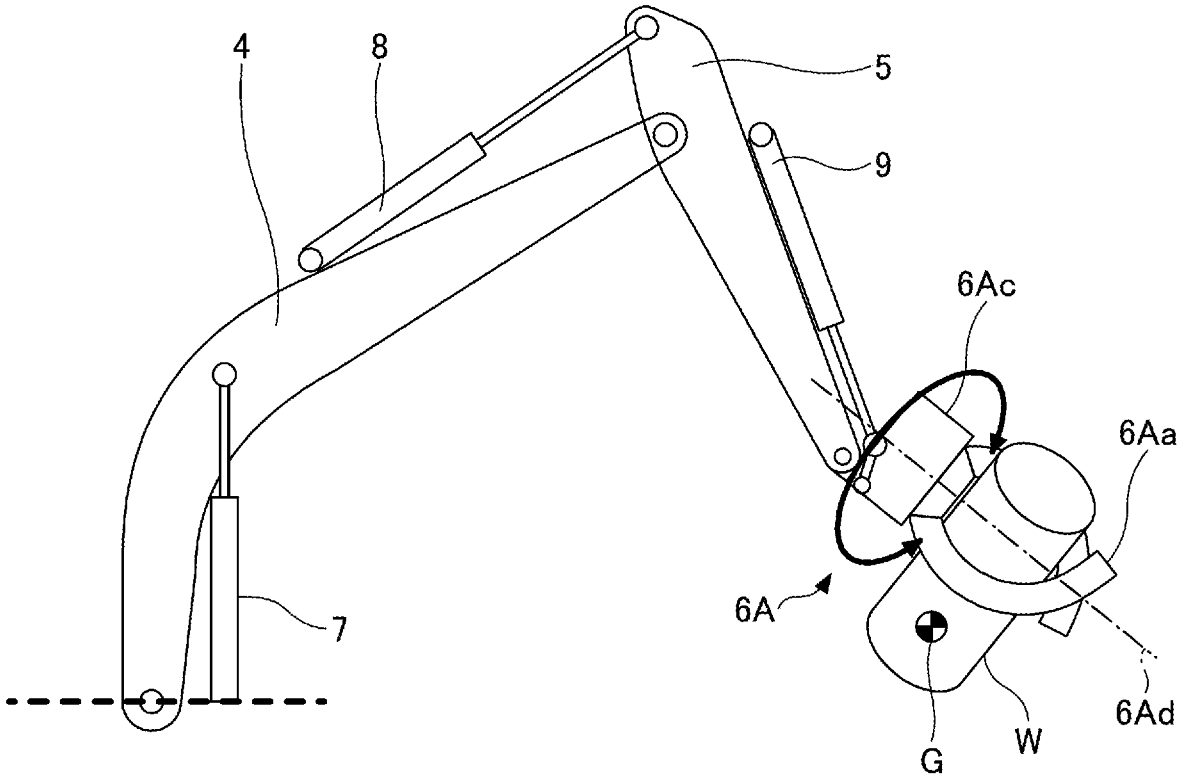
FIG. 14A is a view illustrating an example of an operation of a work machine according to further another embodiment.
Figure 14B:
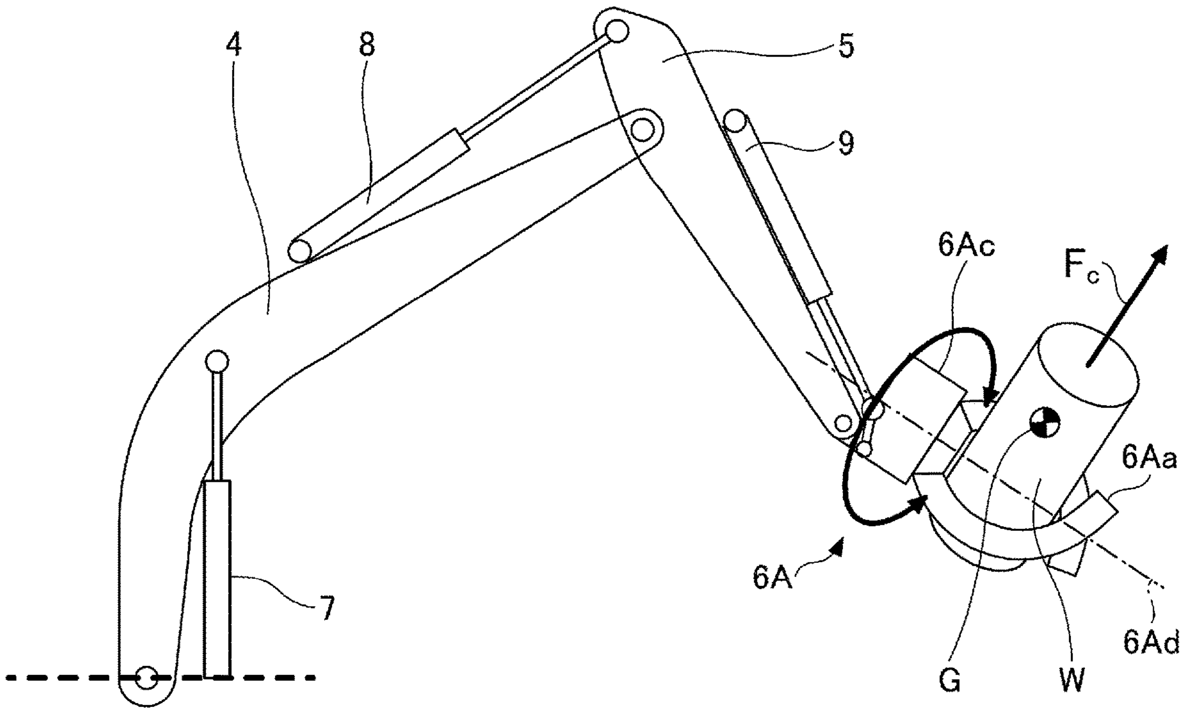
FIG. 14B is a view illustrating an example of an operation of a work machine according to further another embodiment.

FIG. 14A and FIG. 14B are views illustrating an example of an operation of the work machine 100A according to the fourth embodiment.

As illustrated in FIG. 14A, a lengthy conveyance object W is grappled by the claw 6Aa of the grapple 6A. Here, the claw 6Aa of the grapple 6A grapples the conveyance object W at a position of the conveyance object W that is different from the center of gravity G of the conveyance object W. In other words, the claw 6Aa grapples the conveyance object W at a position lopsided to one end side of the conveyance object W. The work machine 100A performs an operation of rotating the grappling portion of the grapple 6A about the rotation axis 6Ad (see the arrow).

As illustrated in FIG. 14B, when the grappling portion of the grapple 6A is rotated about the rotation axis 6Ad, the conveyance object W receives a centrifugal force $F_c$ in a direction in which the conveyance object W grappled by the grappling portion of the grapple 6A would slip (i.e., the axial direction of the conveyance object W). Here, because the grappling portion of the grapple 6A grapples the conveyance object W so as not for the conveyance object W to slip due to the centrifugal force $F_c$, the centrifugal force $F_c$ received by the conveyance object W is applied to the attachment of the work machine 100A.

Figure 15:
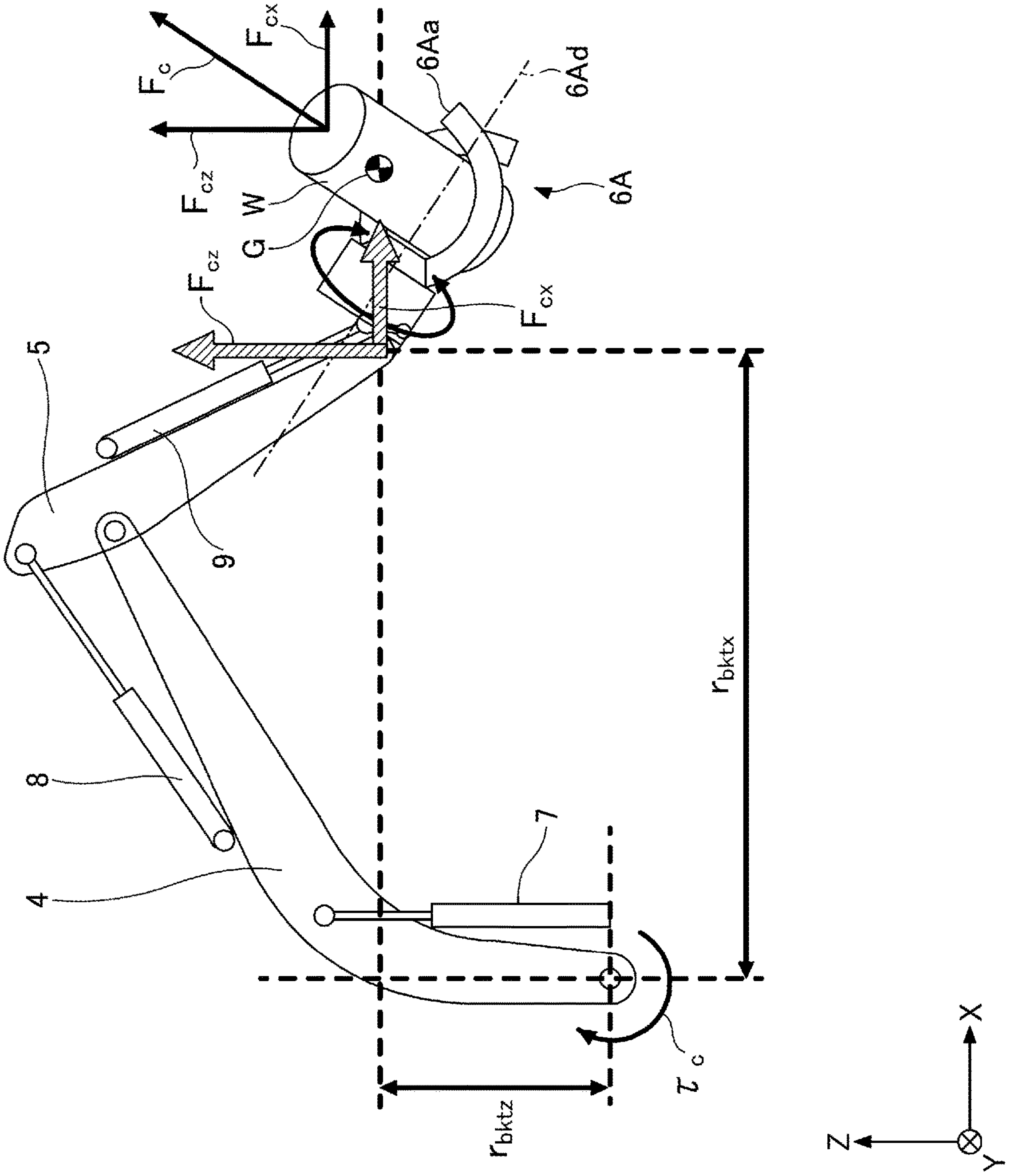
FIG. 15 is an exemplary view of an attachment of a shovel, and illustrating a relationship between a rotating operation of a grappling portion of a grapple and a torque about a foot pin of a boom.

Next, the rotating operation of the grappling portion of the grapple 6A will further be described with reference to FIG. 15. FIG. 15 is an exemplary view of the attachment of the shovel 100, and illustrates a relationship between a rotating operation of the grappling portion of the grapple 6A and a torque about a foot pin of a boom 4.

The centrifugal force due to rotating the grappling portion of the grapple 6A about the rotation axis 6Ad is designated as a centrifugal force $F_c$. The centrifugal force $F_c$ contains X-direction, Y-direction, and Z-direction components. The X direction is a horizontal direction and a direction in which the attachment elongates or shrinks. The Y direction is a horizontal direction and a direction orthogonal to the X direction. The Z direction is the vertical direction. Here, as denoted by black arrows, the horizontal component of the centrifugal force $F_c$ in the X direction is designated as $F_{cx}$, and the perpendicular component of the centrifugal force $F_c$ extending in the Z direction is designated as $F_{cz}$.

Here, because the grappling portion of the grapple 6A grapples the conveyance object W so as not for the conveyance object W to slip due to the centrifugal force $F_c$, the centrifugal force $F_c$ received by the conveyance object W acts also at the position of a connecting pin connecting the arm 5 and the grapple 6A (see hatched arrows).

The horizontal distance between the foot pin of the boom 4 and the connecting pin connecting the arm 5 and the grapple 6A is designated as $r_{bktx}$, and the distance between them in the perpendicular direction is designated as $r_{bktz}$. A torque $\tau_c$ that occurs about the foot pin of the boom 4 due to an operation of rotating the grappling portion of the grapple 6A can be expressed by the following formula (9).

$$\tau_c = F_{cx} r_{bktz} + F_{cz} r_{bktx} \tag{9}$$

As can be seen, when an operation of rotating the grappling portion of the grapple 6A is performed at the same time as a boom raising operation, the torque $\tau_c$ occurs about the foot pin of the boom 4 due to the operation of rotating the grappling portion of the grapple 6A. Hence, in a method for estimating the weight of the conveyance object based on the torque about the foot pin during a boom raising operation, it is necessary to compensate for the weight of the conveyance object suitably.

As indicated by the formula (9), the horizontal component $F_{cy}$ in the Y direction, which is contained in the centrifugal force $F_c$ received by the conveyance object W, has no effect on the torque $\tau_c$ about the foot pin of the boom 4.

For example, when the rotation axis 6Ad extends in the vertical direction (Z direction) as a result of the bucket cylinder (end attachment cylinder) 9 causing the grapple 6A to pivot, an operation of rotating the grappling portion of the grapple 6A by the rotation hydraulic motor 6Ac causes a centrifugal force $F_c$. Here, the perpendicular component $F_{cz}$ of the centrifugal force $F_c$ extending in the Z direction is zero. Here, if the centrifugal force $F_c$ acts in the Y direction depending on the operation of rotating the grappling portion of the grapple 6A, the horizontal component $F_{cx}$ in the X direction is zero, and the torque $\tau_c$ calculated according to the formula (9) is also zero.

For example, when the rotation axis 6Ad extends in the horizontal direction (X direction) as a result of the bucket cylinder (end attachment cylinder) 9 causing the grapple 6A to pivot, an operation of rotating the grappling portion of the grapple 6A by the rotation hydraulic motor 6Ac causes a centrifugal force $F_c$. Here, the horizontal component $F_{cx}$ of the centrifugal force $F_c$ in the X direction is zero. Here, if the centrifugal force $F_c$ acts in the Y direction depending on the operation of rotating the grappling portion of the grapple 6A, the perpendicular component $F_{cz}$ extending in the Z direction is zero, and the torque $\tau_c$ calculated according to the formula (9) is also zero.

[Soil Weight Calculating Method of Work Machine 100A According to Fourth Embodiment]

Figure 16:
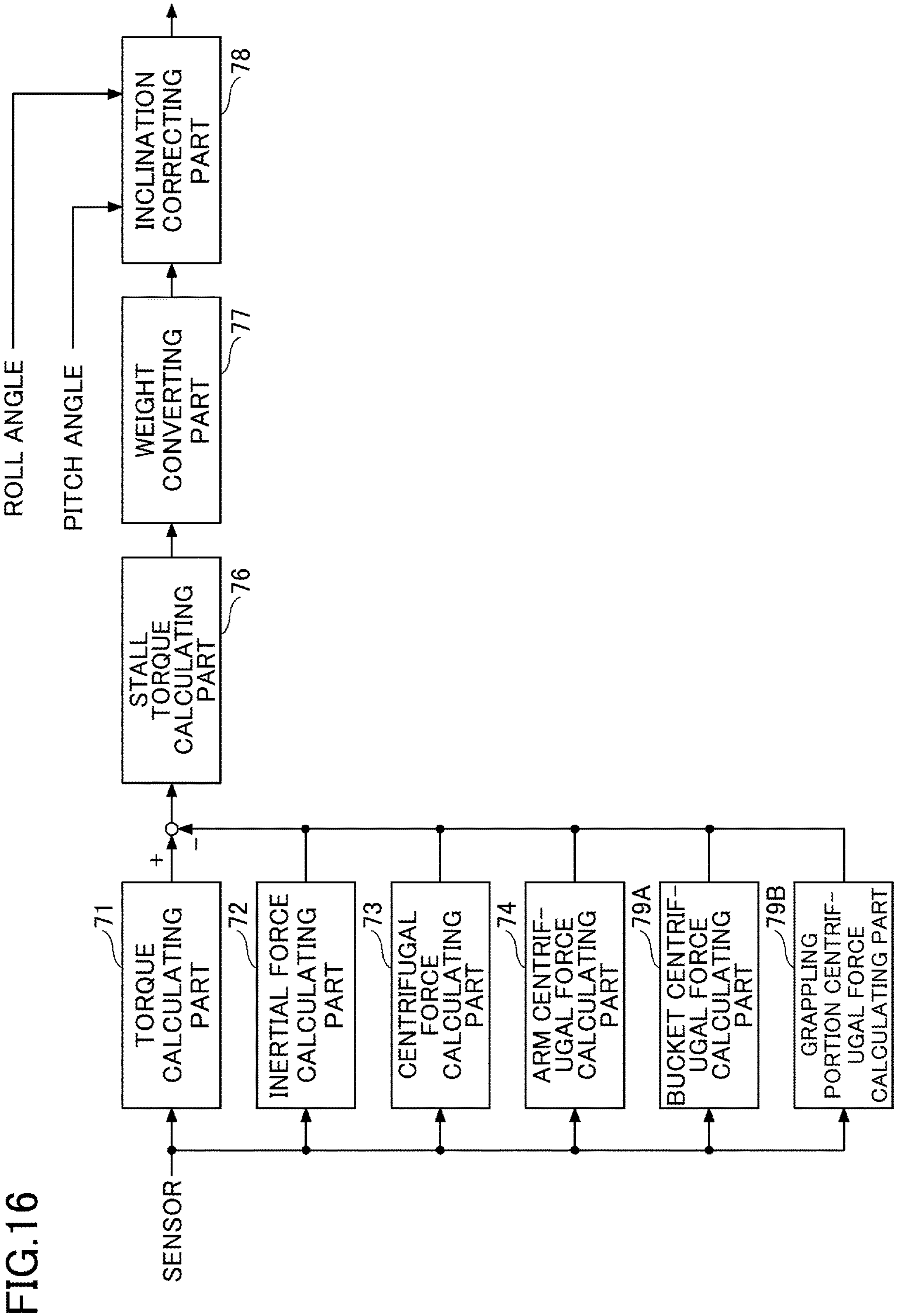
FIG. 16 is a block diagram illustrating a process of a load weight calculating part of a work machine according to yet another embodiment.

FIG. 16 is a block diagram illustrating a process of a load weight calculating part 61 of the work machine 100A according to the fourth embodiment. The load weight calculating part 61 includes a torque calculating part 71, an inertial force calculating part 72, a centrifugal force calculating part 73, an arm centrifugal force calculating part 74, a bucket centrifugal force calculating part (end attachment centrifugal force calculating part) 79A, a grappling portion centrifugal force calculating part 79B, a stall torque calculating part 76, a weight converting part 77, and an inclination correcting part 78.

The torque calculating part 71, the inertial force calculating part 72, the centrifugal force calculating part 73, the arm centrifugal force calculating part 74, and the inclination correcting part 78 are the same as those illustrated in FIG. 12, and overlapping descriptions about them will be skipped.

The bucket centrifugal force calculating part 79A calculates a torque (bucket centrifugal force torque (end attachment centrifugal force torque) $\tau_b$), about the foot pin of the boom 4, which is due to a centrifugal force due to rotating of the grapple 6A in a tilt direction. The bucket centrifugal force torque τb is calculated based on an output from an attitude sensor, and the formula (6) and the formula (7) described above.

The grappling portion centrifugal force calculating part 79B calculates a torque (grappling portion centrifugal force torque $\tau_c$), about the foot pin of the boom 4, which is due to a centrifugal force due to rotating of the grapple 6A about the rotation axis 6Ad. The grappling portion centrifugal force torque $\tau_c$ is calculated based on an output from an attitude sensor and the formula (9) described above.

The stall torque calculating part 76 calculates a stall torque $\tau_W$, which is a torque about the foot pin of the boom 4 during a stall period of the attachment, based on the detection-target torque of the torque calculating part 71, the inertial term torque of the inertial force calculating part 72, the centrifugal term torque of the centrifugal force calculating part 73, the arm centrifugal force torque of the arm centrifugal force calculating part 74, the bucket centrifugal force torque of the bucket centrifugal force calculating part 79A, and the grappling portion centrifugal force torque of the grappling portion centrifugal force calculating part 79B. The formula expressing the torque about the foot pin of the boom 4 is given as the formula (10) below. τ in the left-hand side of the formula (10) represents the detection-target torque, the first term of the right-hand side represents the inertial term torque, the second term of the right-hand side represents the centrifugal term torque, the third term of the right-hand side represents the arm centrifugal force torque $\tau_a$, the fourth term of the right-hand side represents the bucket centrifugal force torque $\tau_b$, the fifth term of the right-hand side represents the grappling portion centrifugal force torque $\tau_c$, and the sixth term of the right-hand side represents the stall torque $\tau_W$.

$$\tau = J\ddot{\theta} + h(\dot{\theta}, \theta)\dot{\theta} + \tau_a + \tau_b + \tau_c + \tau_W \quad (10)$$

As indicated by the formula (10), it is possible to calculate the stall torque $\tau_W$ by subtracting the inertial term torque, the centrifugal term torque, the arm centrifugal force torque $\tau_a$, the bucket centrifugal force torque $\tau_b$, and the grappling portion centrifugal force torque $\tau_c$ from the detection-target torque τ. Hence, the load weight calculating part 61 of the work machine 100A according to the fourth embodiment can offset any effects that may occur due to a pivoting operation about a pin of, for example, the boom.

For example, in a boom raising operation, the work machine 100A that conveys a lengthy conveyance object W such as timber performs the conveying operation together with a tilting operation of the grapple 6A or a rotating operation of the grappling portion. Therefore, by offsetting the bucket centrifugal force torque $\tau_b$ calculated by the bucket centrifugal force calculating part 79A and the grappling portion centrifugal force torque $\tau_c$ calculated by the grappling portion centrifugal force calculating part 79B, the load weight calculating part 61 according to the fourth embodiment can calculate the stall torque $\tau_W$ accurately.

The weight converting part 77 calculates the weight of the conveyance object based on the stall torque $\tau_W$ that is calculated by offsetting the arm centrifugal force torque $\tau_a$, the bucket centrifugal force torque $\tau_b$, and the grappling portion centrifugal force torque $\tau_c$.

As described above, the work machine 100A according to the fourth embodiment can detect the weight of the conveyance object W grappled by the grapple 6A. Moreover, the work machine 100A according to the fourth embodiment can calculate the weight of the conveyance object based on the stall torque $\tau_W$ that is calculated by offsetting the arm centrifugal force torque $\tau_a$, the bucket centrifugal force torque $\tau_b$, and the grappling portion centrifugal force torque $\tau_c$, and can improve the accuracy for detecting the weight of the conveyance object.

Like the shovel 100 according to the first to third embodiments, the work machine 100A according to the fourth embodiment can compensate for the weight of the conveyance object based on the attitude (pitch angle and roll angle) of the work machine 100A even when the surface contacted by the work machine 100A is not a flat surface. Hence, it is possible to suitably detect the weight of the conveyance object, even when the surface contacted by the work machine 100A is an inclined surface.

Moreover, like the shovel 100 according to the first to third embodiments, the work machine 100A according to the fourth embodiment can calculate the weight of the conveyance object loaded on a dump truck. Hence, it is possible to load the conveyance object onto a dump truck while inhibiting overloading on the dump truck. Therefore, it is possible to improve the operational efficiency of the dump truck.

The display device 40 displays the weight of the conveyance object grappled by the grapple 6A, and the maximum tolerable load, the sum load, and the remaining tolerable load of a dump truck. The operator in the work machine 100A can load the conveyance object onto the dump truck by performing operations while watching these displays.

The load weight calculating part 61 has been described as including the arm centrifugal force calculating part 74 to calculate a torque (arm centrifugal force torque $\tau_a$), about the foot pin of the boom 4, which is due to a centrifugal force due to opening or closing of the arm 5 by the arm cylinder 8 and offset the arm centrifugal force torque $\tau_a$ from the stall torque $\tau_W$. However, this is a non-limiting example. The load weight calculating part 61 may include an arm inertial force calculating part (unillustrated) that calculates a torque (arm inertial force torque), about the foot pin of the boom 4, which is due to acceleration or deceleration (inertial force) in opening or closing of the arm 5. The load weight calculating part 61 may offset the arm inertial force torque from the stall torque $\tau_W$. Moreover, the load weight calculating part 61 may offset both the arm centrifugal force torque $\tau_a$ and the arm inertial force torque from the stall torque $\tau_W$.

The load weight calculating part 61 has been described as including the bucket centrifugal force calculating part 79A to calculate a torque (bucket centrifugal force torque (end attachment centrifugal force torque) $\tau_b$), about the foot pin of the boom 4, which is due to a centrifugal force due to opening or closing of the grapple 6A by the bucket cylinder (end attachment cylinder) 9 and offset the bucket centrifugal force torque $\tau_b$ from the stall torque $\tau_W$. However, this is a non-limiting example. The load weight calculating part 61 may include a bucket inertial force calculating part (end attachment inertial force calculating part, unillustrated) that calculates a torque (bucket inertial force torque (end attachment inertial force torque)), about the foot pin of the boom 4, which is due to acceleration or deceleration (inertial force) in opening or closing of the grapple 6A. The load weight calculating part 61 may offset the bucket inertial force torque from the stall torque $\tau_W$. Moreover, the load weight calculating part 61 may offset both the bucket centrifugal force torque $\tau_b$ and the bucket inertial force torque from the stall torque $\tau_W$.

The load weight calculating part 61 has been described as including the grappling portion centrifugal force calculating part 79B to calculate a torque (grappling portion centrifugal force torque $\tau_c$), about the foot pin of the boom 4, which is due to a centrifugal force due to an operation of rotating the grappling portion of the grapple 6A by the rotation hydraulic motor (grappling portion rotating mechanism) 6Ac and offset the grappling portion centrifugal force torque $\tau_c$ from the stall torque $\tau_W$. However, this is a non-limiting example. The load weight calculating part 61 may include a grappling portion inertial force calculating part (unillustrated) that calculates a torque (grappling portion inertial force torque), about the foot pin of the boom 4, which is due to acceleration or deceleration (inertial force) in an operation of rotating the grappling portion of the grapple 6A. The load weight calculating part 61 may offset the grappling portion inertial force torque from the stall torque $\tau_W$. The load weight calculating part 61 may offset both the grappling portion centrifugal force torque $\tau_c$ and the grappling portion inertial force torque from the stall torque $\tau_W$.

The embodiments and other particulars of the shovel 100 and the work machine 100A have been described above. The present invention is not limited to the described embodiments and particulars, and various changes and modifications can be made within the scope of the spirit of the present invention described in the claims.

The method for measuring the weight of the conveyance object, which is applied to the shovel 100 according to the third embodiment and the work machine 100A according to the fourth embodiment, may be applied to other work machines. That is, the method for measuring the weight of the conveyance object applied to the shovel 100 according to the third embodiment and the work machine 100A according to the fourth embodiment may be applied to work machines including end attachments such as a bucket, a lifting magnet, a grapple, a fork, and a harvester including a chainsaw, which are used to convey conveyance objects.

The soil load processing part 60 (load weight calculating part 61) has been described as being provided as a function in the controller 30 of the shovel 100 or the work machine 100A. However, this is a non-limiting example. The function of the soil load processing part 60 (load weight calculating part 61) may be provided in a control device (unillustrated) for the work machine, the control device being provided separately from the controller 30.

[Loading Support System]

Figure 17:
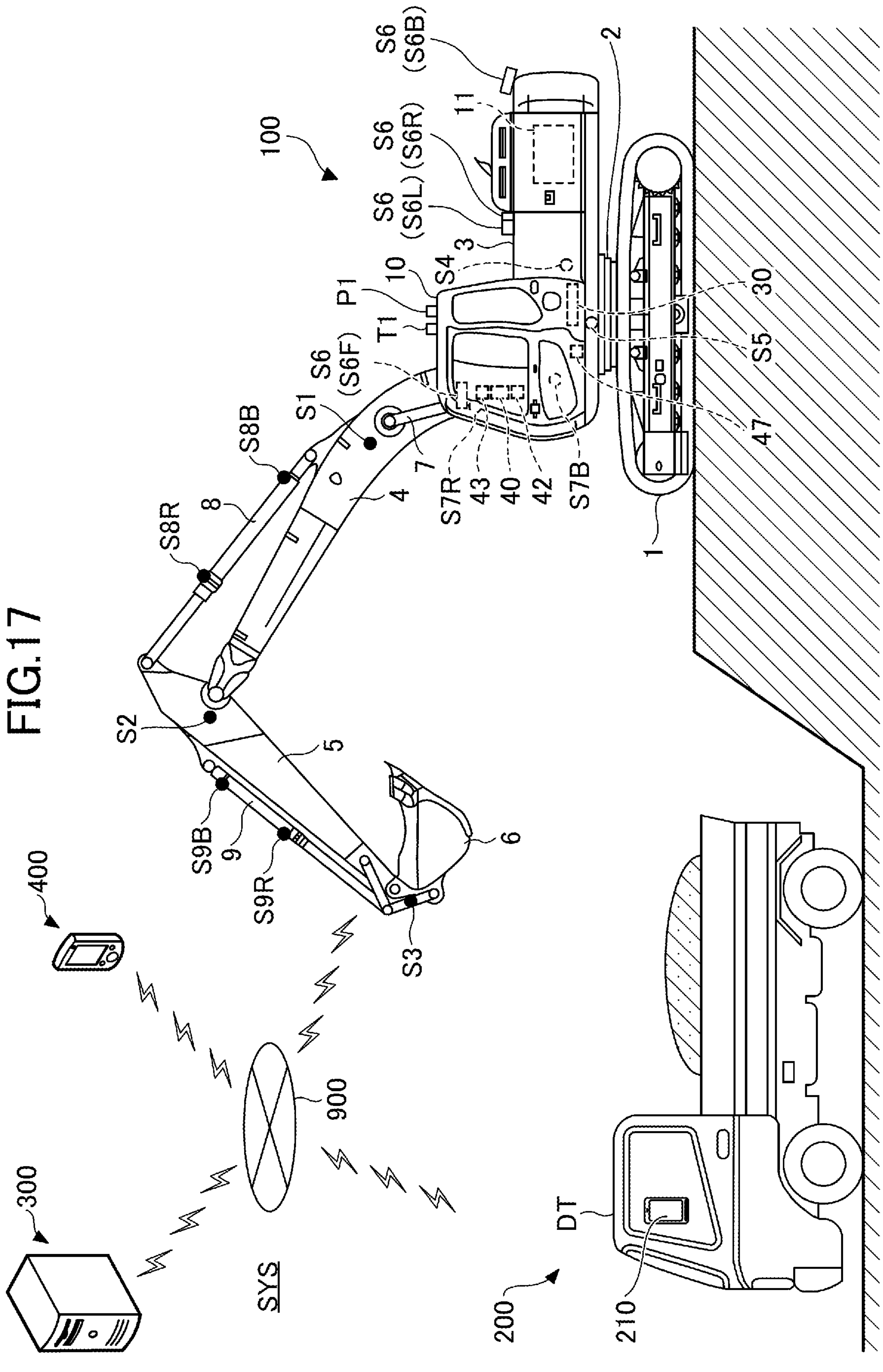
FIG. 17 is a view illustrating an example of a configuration of a loading support system.

Next, a loading support system SYS will be described with reference to FIG. 17. FIG. 17 is a view illustrating an example of the configuration of the loading support system SYS. The loading support system SYS includes a shovel 100, a mobile body 200 including a support device 210 provided on a dump truck DT, a managing device 300, and a support device 400, and may be communicable via a communication network 900.

The support device 210 is a portable terminal device, and is, for example, a computer situated on the dump truck DT, such as a laptop PC, a tablet PC, and a smartphone.

The managing device 300 is a fixed terminal device, and is, for example, a computer installed in, for example, a managing center outside a construction site. The managing device 300 may be a portable computer (e.g., a portable terminal device such as a laptop PC, a tablet PC, and a smartphone).

The support device 400 is a portable terminal device, and is, for example, a computer such as a laptop PC, a tablet PC, and a smartphone carried by, for example, a worker in the construction site.

The controller 30 of the shovel 100 may transmit, for example, a calculated weight of soil to the managing device 300 via the communication device T1 and the communication network 900. Hence, the managing device 300 can manage the weight of a load such as soil that is loaded onto the dump truck DT by the shovel 100. The controller of the shovel 100 may transmit the information to the support device 210 provided on the dump truck DT via the communication device T1 and the communication network 900.

The shovel 100 may be remotely operated via the communication network 900.

It should be understood that the invention is not limited to the above-described embodiment, but may be modified into various forms on the basis of the spirit of the invention. Additionally, the modifications are included in the scope of the invention.

What is claimed is:

1. A work machine, comprising:

an attachment attached on an upper rotating body and including at least a boom, an arm attached on an end of the boom, and an end attachment attached on an end of the arm;

a posture sensor configured to detect an attitude of the work machine; and a hardware processor configured to calculate either or both of an arm centrifugal force torque and an arm inertial force torque based on an output of the posture sensor, the arm centrifugal force torque being a torque about a foot pin of the boom due to a centrifugal force on the arm when the arm is being opened or closed, the arm inertial force torque being a torque about the foot pin of the boom due to an inertial force on the arm when the arm is being opened or closed, compensate for a torque, which causes the boom to rotate, based on said calculated either or both of the arm centrifugal force torque and the arm inertial force torque, and calculate a weight of a conveyance object conveyed by the attachment based on the torque compensated for.

2. The work machine according to claim 1, wherein the torque, which causes the boom to rotate, is a torque about the foot pin of the boom.

3. The work machine according to claim 1, wherein the hardware processor is configured to compensate for the calculated weight of the conveyance object based on an attitude of the work machine.

4. The work machine according to claim 1, wherein the hardware processor is configured to calculate the weight of the conveyance object based on the torque during work in which the boom is raised and the arm is opened or closed.

5. The work machine according to claim 1, wherein the end attachment is a bucket, a lifting magnet, a grapple, a fork, or a harvester including a chainsaw.

6. The work machine according to claim 1, further comprising:

a boom cylinder configured to drive the boom, wherein the hardware processor is further configured to calculate a detection-target torque that is a torque about the foot pin of the boom calculated based on a pressure of operating oil in the boom cylinder;

calculate an inertial term torque that is a torque about the foot pin of the boom calculated based on an angular acceleration about the foot pin of the boom and a moment of inertia of the boom;

calculate a centrifugal term torque that is a torque about the foot pin of the boom calculated based on an angular velocity about the foot pin of the boom and a weight of the boom;

calculate a stall torque that is a torque about the foot pin of the boom during a stall period of the attachment by subtracting the calculated inertial term torque, the calculated centrifugal term torque, and said calculated either or both of the arm centrifugal force torque and the arm inertial force torque from the calculated detection-target torque; and calculate the weight of the conveyance object based on the calculated stall torque.

7. The work machine according to claim 6, further comprising:

a boom angle sensor configured to detect a boom angle that is an angle of depression or elevation of the boom with respect to the upper rotating body, wherein the hardware processor is configured to compensate for the calculated weight of the conveyance object by correcting the detected boom angle based on a pitch angle of the work machine.

8. The work machine according to claim 6, wherein the hardware processor is configured to compensate for the calculated weight of the conveyance object by correcting a thrust on the boom cylinder based on a roll angle of the work machine.

9. A work machine, comprising:

an attachment attached on an upper rotating body and including at least a boom, an arm attached on an end of the boom, and an end attachment attached on an end of the arm;

a posture sensor configured to detect an attitude of the work machine; and a hardware processor configured to calculate either or both of an end attachment centrifugal force torque and an end attachment inertial force torque based on an output of the posture sensor, the end attachment centrifugal force torque being a torque about a foot pin of the boom due to a centrifugal force on the end attachment when the end attachment is being opened or closed, or rotated, the end attachment inertial force torque being a torque about the foot pin of the boom due to an inertial force on the end attachment when the end attachment is being opened or closed, or rotated, compensate for a torque, which causes the boom to rotate, based on said calculated either or both of the end attachment centrifugal force torque and the end attachment inertial force torque, and calculate a weight of a conveyance object conveyed by the attachment based on the torque compensated for.

10. The work machine according to claim 9, wherein the end attachment is pivotally attached on the end of the arm to be opened or closed, and the hardware processor is configured to compensate for the torque, which causes the boom to rotate, based on either or both of the centrifugal force on the end attachment and the inertial force on the end attachment, the centrifugal force and the inertial force being due to opening or closing of the end attachment on the arm.

11. The work machine according to claim 9, wherein the end attachment includes a grappling portion that grapples the conveyance object, and a grappling portion rotating mechanism that rotates the grappling portion, and the hardware processor is configured to compensate for the torque, which causes the boom to rotate, based on either or both of the centrifugal force on the end attachment and the inertial force on the end attachment, the centrifugal force and the inertial force being due to an operation of rotating the grappling portion.

12. The work machine according to claim 9, wherein the torque, which causes the boom to rotate, is a torque about the foot pin of the boom.

13. The work machine according to claim 9, wherein the hardware processor is configured to compensate for the calculated weight of the conveyance object based on an attitude of the work machine.

14. The work machine according to claim 9, wherein the hardware processor is configured to calculate the weight of the conveyance object based on the torque during work in which the boom is raised and the end attachment is rotated.

15. The work machine according to claim 9, further comprising:

a boom cylinder configured to drive the boom, wherein the hardware processor is further configured to calculate a detection-target torque that is a torque about the foot pin of the boom calculated based on a pressure of operating oil in the boom cylinder;

calculate an inertial term torque that is a torque about the foot pin of the boom calculated based on an angular acceleration about the foot pin of the boom and a moment of inertia of the boom;

calculate a centrifugal term torque that is a torque about the foot pin of the boom calculated based on an angular velocity about the foot pin of the boom and a weight of the boom;

calculate either or both of an arm centrifugal force torque and an arm inertial force torque, the arm centrifugal force torque being a torque about the foot pin of the boom due to a centrifugal force on the arm when the arm is being opened or closed, the arm inertial force torque being a torque about the foot pin of the boom due to an inertial force on the arm when the arm is being opened or closed;

calculate a stall torque that is a torque about the foot pin of the boom during a stall period of the attachment by subtracting the calculated inertial term torque, the calculated centrifugal term torque, said calculated either or both of the arm centrifugal force torque and the arm inertial force torque, and said calculated either or both of the end attachment centrifugal force torque and the end attachment inertial force torque from the calculated detection-target torque; and calculate the weight of the conveyance object based on the calculated stall torque.

16. The work machine according to claim 15, further comprising:

a boom angle sensor configured to detect a boom angle that is an angle of depression or elevation of the boom with respect to the upper rotating body, wherein the hardware processor is configured to compensate for the calculated weight of the conveyance object by correcting the detected boom angle based on a pitch angle of the work machine.

17. The work machine according to claim 15, wherein the hardware processor is configured to compensate for the calculated weight of the conveyance object by correcting a thrust on the boom cylinder based on a roll angle of the work machine.

* * * * *